(12) United States Patent
Willner et al.

(10) Patent No.: US 6,915,040 B2
(45) Date of Patent: *Jul. 5, 2005

(54) DEVICES AND APPLICATIONS BASED ON TUNABLE WAVE-GUIDING BRAGG GRATINGS WITH NONLINEAR GROUP DELAYS

(75) Inventors: Alan E. Willner, Los Angeles, CA (US); Yong-Won Song, Los Angeles, CA (US); S.M. Reza Motaghian Nezam, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 10/172,832

(22) Filed: Jun. 13, 2002

(65) Prior Publication Data

US 2003/0086647 A1 May 8, 2003

Related U.S. Application Data

(63) Continuation-in-part of application No. 09/827,819, filed on Apr. 6, 2001, now Pat. No. 6,453,095, and a continuation-in-part of application No. 09/826,294, filed on Apr. 3, 2001, now Pat. No. 6,647,180, and a continuation-in-part of application No. 09/757,414, filed on Jan. 8, 2001, now Pat. No. 6,453,093, which is a continuation of application No. 09/253,645, filed on Feb. 19, 1999, now Pat. No. 6,330,383, which is a continuation-in-part of application No. 09/027,345, filed on Feb. 20, 1998, now Pat. No. 5,982,963.

(60) Provisional application No. 60/305,967, filed on Jul. 16, 2001, provisional application No. 60/175,146, filed on Jan. 7, 2000, provisional application No. 60/234,465, filed on Sep. 21, 2000, and provisional application No. 60/069,498, filed on Dec. 15, 1997.

(51) Int. Cl.[7] .............................................. G20B 6/34
(52) U.S. Cl. ........................... 385/37; 385/24; 385/122
(58) Field of Search ................................ 385/1–12, 24, 385/122, 37–43; 372/6, 27, 64, 96, 102; 398/113, FOR 179; 359/290

(56) References Cited

U.S. PATENT DOCUMENTS

| | | |
|---|---|---|
| 5,450,427 A | 9/1995 | Fermann et al. |
| 5,499,134 A | 3/1996 | Galvanauskas et al. |
| 5,511,083 A | 4/1996 | D'Amato et al. |
| 5,532,868 A | 7/1996 | Gnauck et al. |
| 5,541,947 A | 7/1996 | Mourou et al. |
| 5,633,885 A | 5/1997 | Galvanauskas et al. |
| 5,675,674 A | 10/1997 | Weis |
| 5,808,779 A | 9/1998 | Weis |
| 5,978,131 A | 11/1999 | Lauzon et al. |
| 5,982,963 A | 11/1999 | Feng et al. |
| 5,999,546 A | 12/1999 | Espindola et al. |
| 5,999,671 A | 12/1999 | Jin et al. |
| 6,014,480 A | 1/2000 | Baney |
| 6,081,640 A | 6/2000 | Ouellette et al. |
| 6,330,383 B1 | 12/2001 | Cai et al. |
| 6,363,187 B1 | 3/2002 | Fells et al. |
| 6,381,388 B1 | 4/2002 | Epworth et al. |
| 6,453,093 B2 * | 9/2002 | Xie et al. .................. 385/37 |
| 6,647,180 B2 * | 11/2003 | Rothenberg .............. 385/37 |

FOREIGN PATENT DOCUMENTS

GB        WO 99/22255        5/1999

OTHER PUBLICATIONS

J.L. Cruz et al., *Fibre Bragg gratings tuned and chirped using magnetic fields*, Electronic Letters, Jan. 30th, 1997, vol. 33, No. 3, pp. 235–236.

(Continued)

Primary Examiner—Phan T. H. Palmer
(74) Attorney, Agent, or Firm—Fish & Richardson P.C.

(57) ABSTRACT

Techniques, devices, and systems for generating tunable dispersions to control or compensate for dispersions in optical signals by using wave-guiding grating elements with nonlinear group delays.

23 Claims, 39 Drawing Sheets

OTHER PUBLICATIONS

Ronald D. Esman, *Microwave/ Analog Technology*, CLEO '97 Technical Digest, paper CWN1, pp. 293, 1997.

J.L. Arce–Diego et al., *Fiber Bragg grating as an optical filter tuned by a magnetic field*, Optics Letters, May 1, 1997, vol. 22, No. 9, pp. 603–605.

R. J. Nuyts, *Performance Improvement of 10 Gb/s Standard Fiber Transmission System by Using the SPM Effect in the Dispersion Compensating Fiber*, IEEE Photonics Technology Letters, Oct., 1996. vol. 8, No. 10, 1406–1408.

Morten Ibsen et al., *Sinc–Sampled Fiber Bragg Gratings for Identical Multiple Wavelength Operation*, IEEE Photonics Technology Letters, Jun. 1998, vol. 10, No. 6, pp. 842–844.

M. Tomizawa et al., *Nonlinear influence on PM–AM conversion measurement of group velocity dispersion in optical fibres*, Electronic Letters, Aug. $18^{th}$ 1994, vol. 30, No. 17, pp. 1434–1435.

W.F. Liu and P.St. J. Russel et al., *Improved Efficiency Narrow–Band Acoustooptic Tunable Reflector using Fibre Bragg Grating*, Optoelectronics (1997).

"Tunable fiber grating dispersion using a plezoelectric stack"; M.M. Ohn, et al.; OFC'97 Technical Digest, pp. 155–156.

Ibsen et al., "Sinc–Sampled Fiber Bragg Gratings for Identical Multiple Wavelength Operation," IEEE Photonics Technology Letters, vol. 10, No. 6, pp. 842–844, Jun. 1998.

Cruz et al., "Fibre Bragg gratings tuned and chirped using magnetic fields," Electronics Letters, vol. 33, No. 3, pp. 235–236, Jan. 30, 1997.

Tomizawa et al., "Nonlinear influence on PM–AM conversion measurement of group velocity dispersion in optical fibres," Electronics Letters, vol. 30, No. 17, pp. 1434–1435, Aug. 18, 1994.

Ronald D. Estman, "High bandwidth traveling wave polymeric in–line fiber modulator"CLEO'97 Microvave/Analog Technology, p. 293, May 21, 1997.

Arce–Diego et al., "Fiber Bragg grating as an optical filter tuned by a magnetic field," Optics Letters, vol. 22, No. 9, pp. 603–605, May 1, 1997.

Nuyts et al., "Performance Improvement of 10 Gb/s Standard Fiber Transmission Systems by Using the SPM Effect in the Dispersion Compensating Fiber," IEEE Photonics Technology Letters, vol. 8, No. 10, pp. 1406–1408, Oct. 1996.

Liu et al., "Improved Efficiency Narrow–Band Acoustooptic Tunable Reflector using Fibre Bragg Grating", publisher: Optical Society of America, Washington, DC, USA, pp. 338–341, Conference Location: Williamsburg, VA, USA, post deadline paper PDP4, Oct. 26–28, 1997.

Williams, et al., Fiber grating for higher order dispersion compensation fabricated using a double–scan phase–mask technique, 1996, OFC '96 Technical Digest.

Imai et al., Second– and third–order dispersion compensation of picosecond pulses achieved by combining two nonolinearly chirped fibre Bragg gratings, Dec. 10, 1998, Electronics Letters, vol. 34, No. 25.

Taga, Technologies for hundreds of Gb/s capacities in undersea lightwave systems, Feb. 23, 1999, OFC '99 Technical Digest.

Berkey et al., Negative Slope Dispersion Compensating Fibers, Feb. 23, 1999, OFC '99 Technical Digest.

Cai, et al., Simultaneous Tunable Dispersion Compensation of Many WDM Channels Using a Sampled Nonlinearly Chirped Fiber Bragg Grating, Nov. 1999, IEEE Photonics Technology Letters, vol. 11, No. 11.

Kuznetsov, et al., Power Penalty for Optical Signals Due to Dispersion Slope in WDM Filter Cascades, Nov. 1999, IEEE Photonics Technology Letters, vol. 11, No. 11.

Madsen, et al., Integrated All–Pass Filters for Tunable Dispersion and Dispersion Slope Compensation; Dec. 1999; IEEE Photonics Technology Letters, vol. 11, No. 12.

Grüner–Nielson, et al., New dispersion compensating fibres for simultaneous compensation of dispersion and dispersion slope of non–zero dispersion shifter fibres in the C or L band, Mar. 7, 2000, OFC 2000 Technical Digest Postconference Edition.

Brennan et al., Dispersion and dispersion–slope correction with a fiber Bragg grating over the full C–band, 2001, OFC 2001 Technical Digest.

Takenouchi et al., 2×40–channel dispersion–slope compensator for 40 Gbit/s WDM transmission systems covering entire C– and L–bands, Mar. 2001, OFC 2001 Technical Digest.

Jablonski et al., Adjustable dispersion–slope compensator using entirely thin–filmed coupled–cavity allpass filters in a multi–reflection parallel configuration, Mar. 2001, OFC 2001 Technical Digest.

Shirasaki, Compensation of chromatic dispersion and dispersion slope using a virtually imaged phased array, Mar. 2001, OFC 2001 Technical Digest.

Yamamoto et al., Third– and fourth–order active dispersion compensation using a phase modulator in a terabit/s OTDM transmission.

* cited by examiner

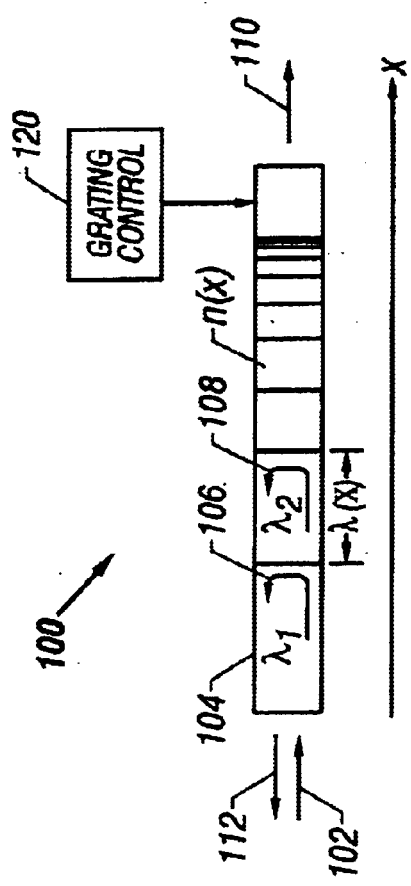
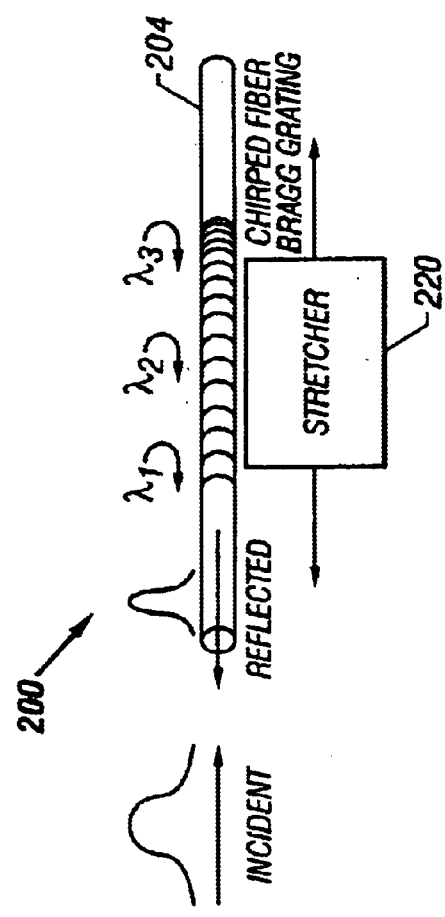
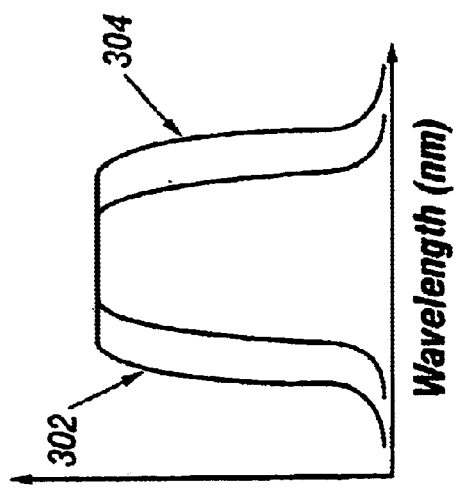
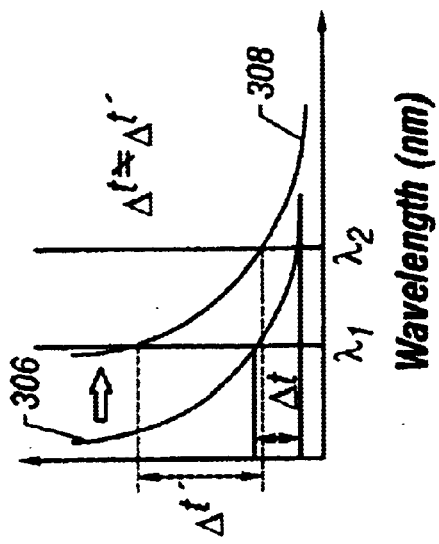

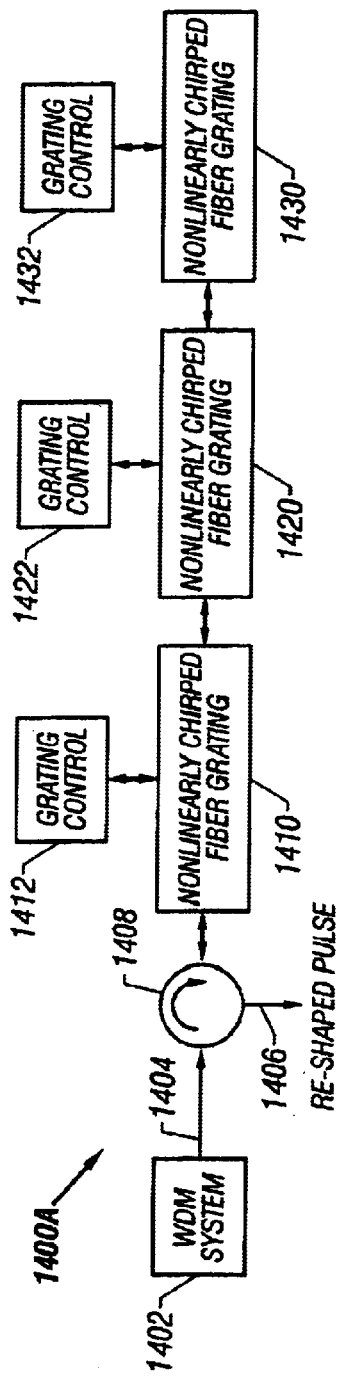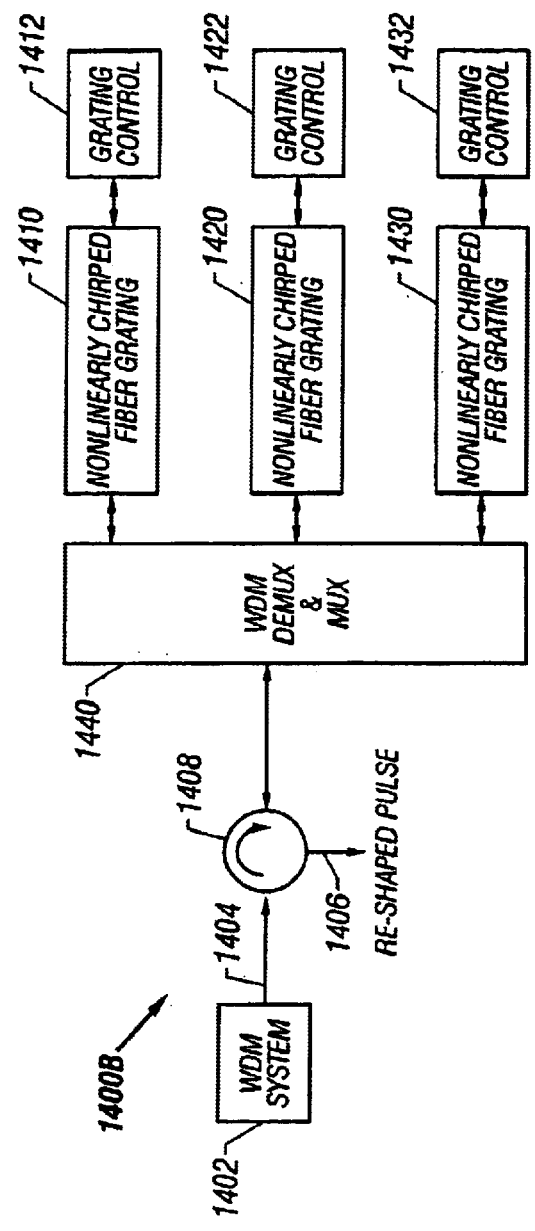

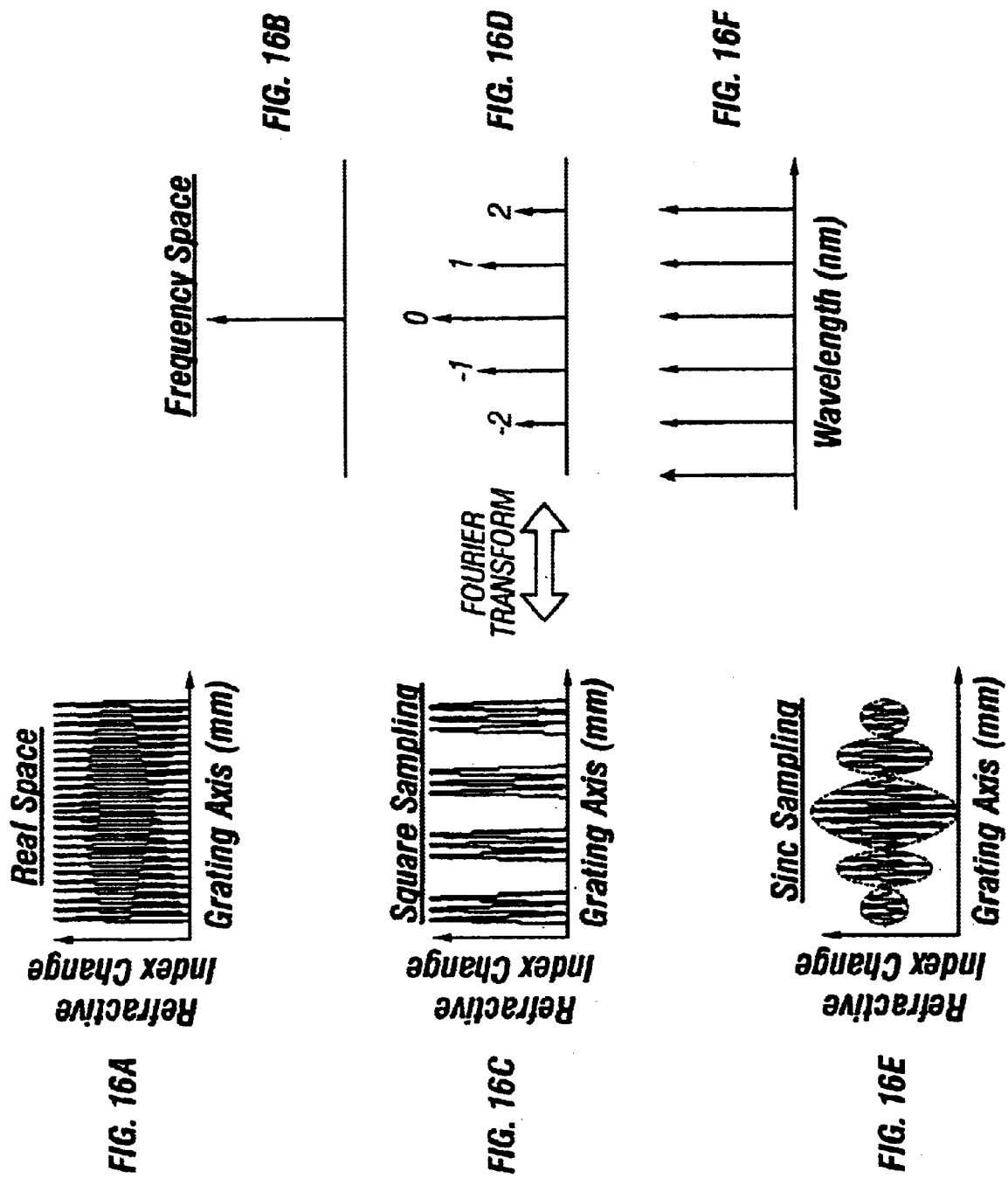

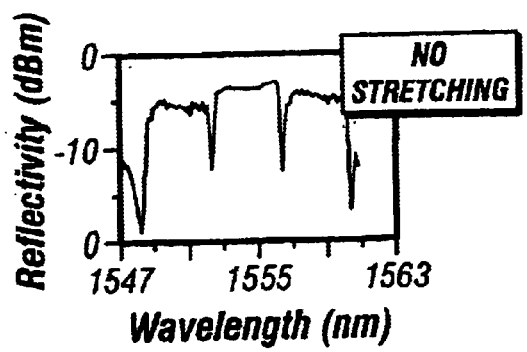
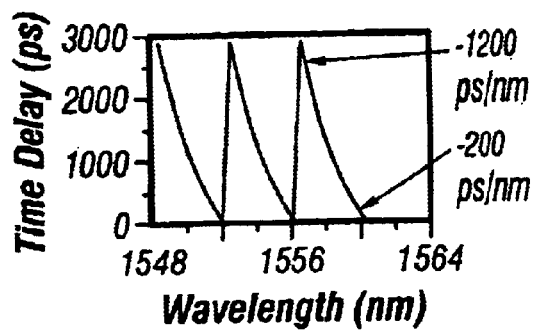
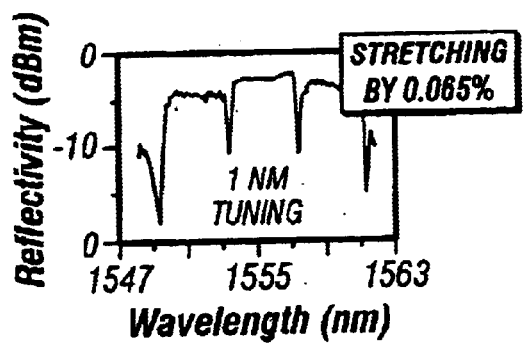
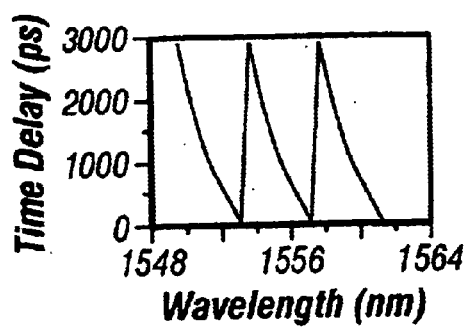
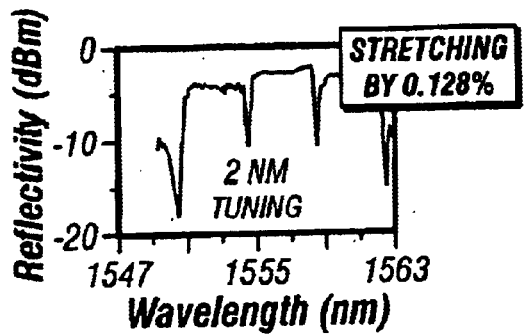
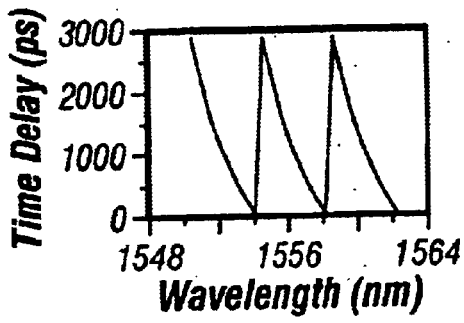
FIG. 17A
FIG. 17B
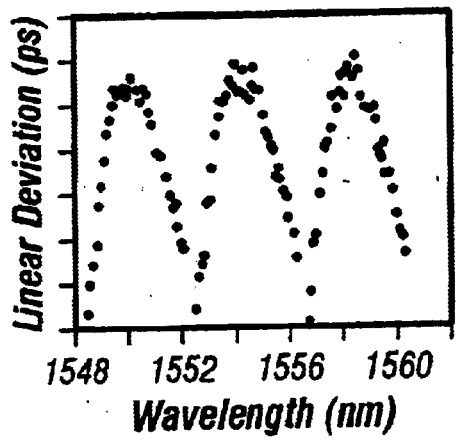
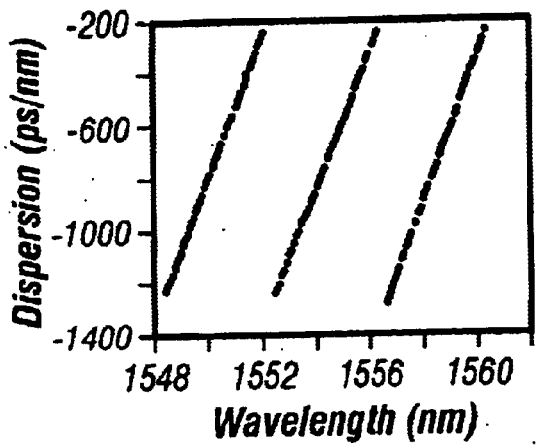
FIG. 17C
FIG. 17D

FIG. 28
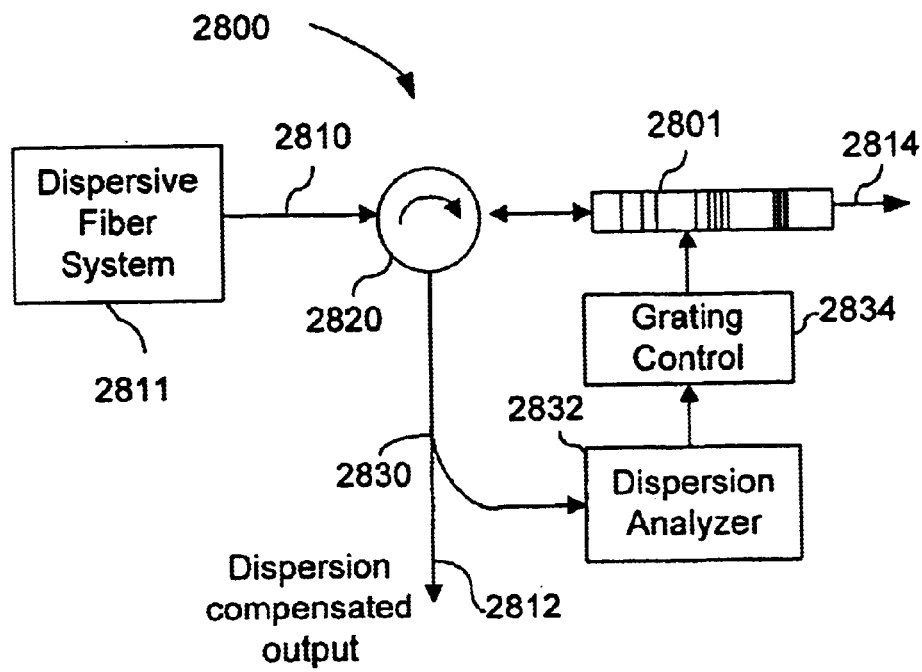
FIG. 29A
FIG. 29B
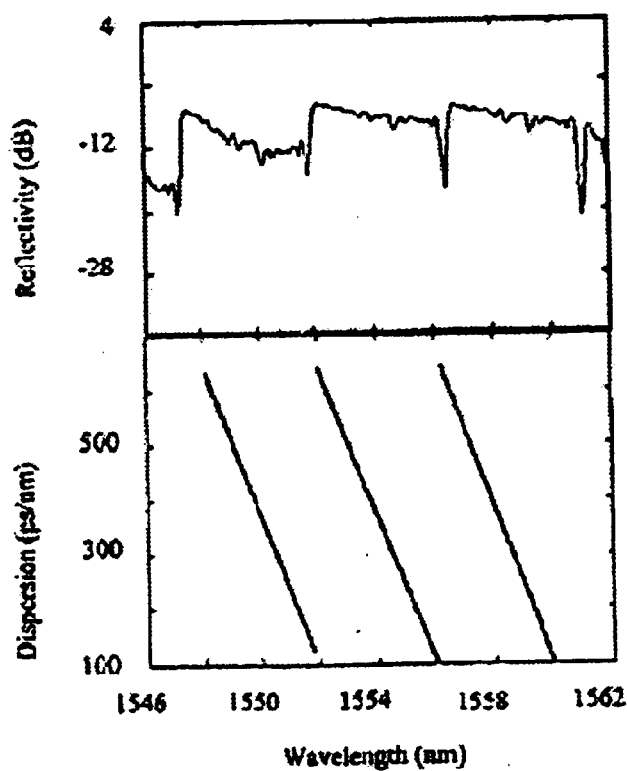

FIG. 30
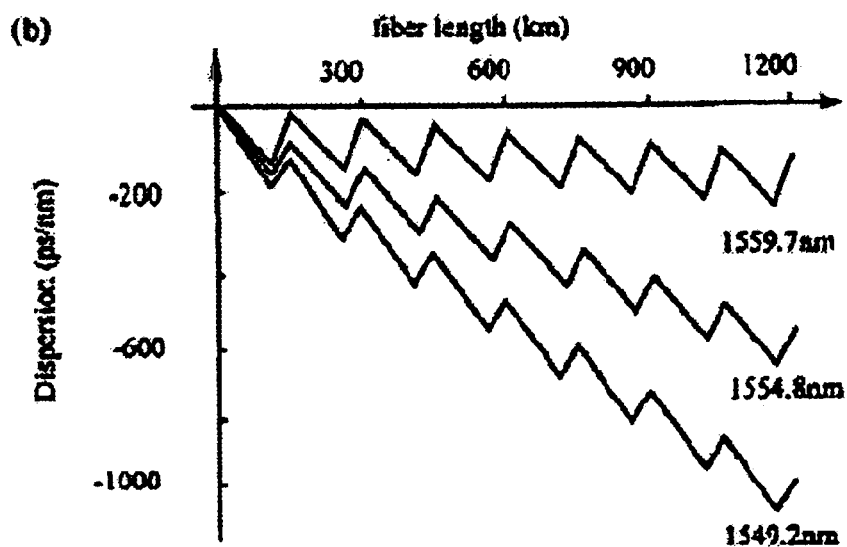
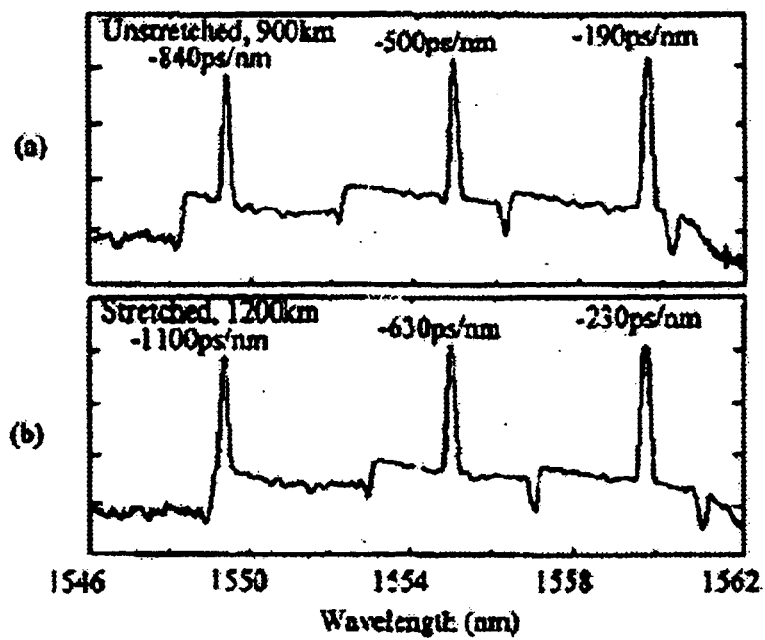
FIG. 31A
FIG. 31B

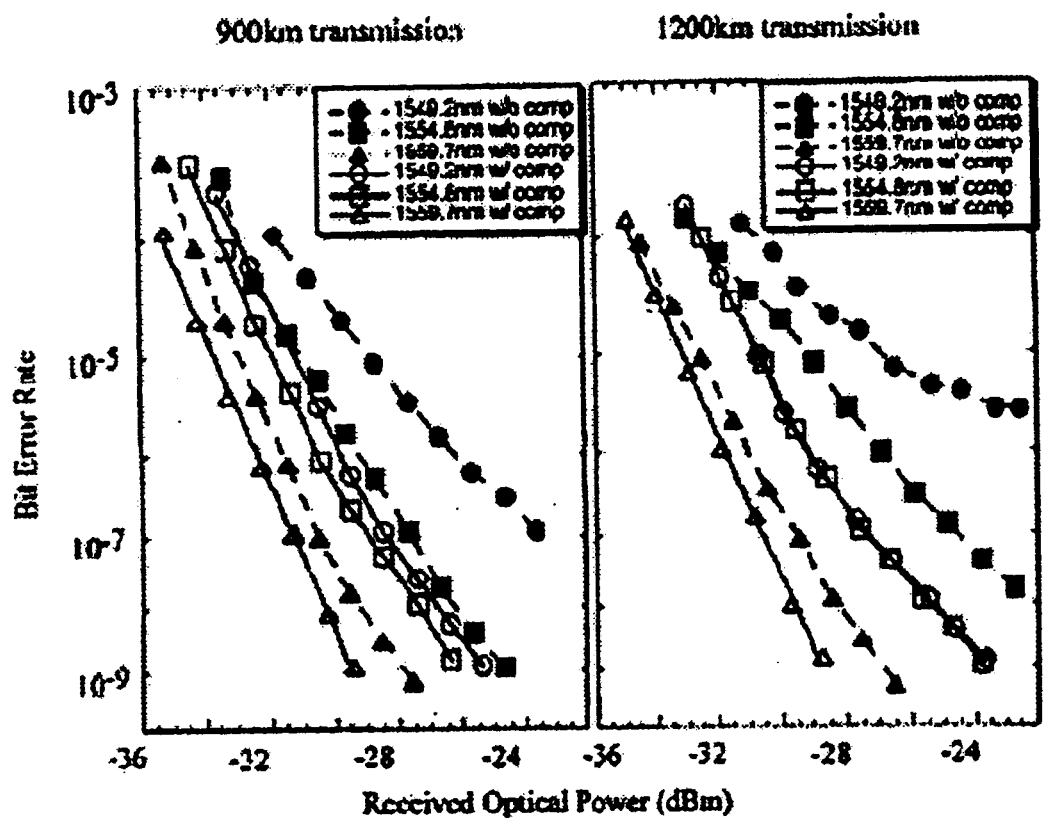

Stretch "+" FBG
Opposite to
Stretch of "−" FBG

The total D tunes, yet $D^{(3)}$ of two FBGs cancels yielding a constant dispersion over the band $\Delta D_1 < \Delta D_2 < \Delta D_3 \rightarrow$ Slope Changes $\Delta D_1 = \Delta D_2 = \Delta D_3$ $$S_+(\lambda) = D_1^{(3)} + D^{(4)} (\lambda + \lambda_{tune})$$

$$S_-(\lambda) = D_2^{(3)} - D^{(4)} (\lambda - \lambda_{tune})$$

$$S_{Total}(\lambda) = \Sigma D^{(3)} + 2D^{(4)} \lambda_{tune}$$

DEVICES AND APPLICATIONS BASED ON TUNABLE WAVE-GUIDING BRAGG GRATINGS WITH NONLINEAR GROUP DELAYS

This application claims the benefit of U.S. Provisional Application No. 60/305,967 entitled "A TUNABLE CHROMATIC DISPERSION SLOPE COMPENSATOR USING A THIRD-ORDER NONLINEARLY-CHIRPED FBG" and filed on Jul. 16, 2001, which is incorporated herein by reference as part of this application.

This application is a continuation-in-part application of application Ser. No. 09/757,414 entitled "TUNABLE OPTICAL DISPERSION-SLOPE COMPENSATION BASED ON A NONLINEARLY-CHIRPED BRAGG GRATING" which was filed on Jan. 8, 2001 now U.S. Pat. No. 6,453,093 and claims the benefit of U.S. Provisional Application No. 60/175,146 entitled "TUNABLE OPTICAL FIBER DISPERSION-SLOPE COMPENSATOR" and filed on Jan. 7, 2000.

This application is also a continuation-in-part application of application Ser. No. 09/826,294 entitled "TUNABLE OPTICAL DISPERSION COMPENSATION BY USING TWO FIBER BRAGG GRATINGS WITH NONLINEARLY GROUP DELAYS" which was filed on Apr. 3, 2001 now U.S. Pat. No. 6,647,180 and claims the benefit of U.S. Provisional Application No. 60/234,465 entitled "HIGH ORDER DISPERSION IN NONLINEARLY CHIRPED GRATINGS AND TUNABLE DISPERSION COMPENSATORS WITH DUAL NONLINEARLY CHIRPED GRATINGS" and filed on Sep. 21, 2000.

Furthermore, this application is a continuation-in-part application of U.S. application Ser. No. 09/827,819 entitled "TUNING OF OPTICAL DISPERSION BY USING A TUNABLE FIBER BRAGG GRATING" and filed on Apr. 6, 2001 now U.S. Pat. No. 6,453,095 which is a continuation application of U.S. application Ser. No. 09/253,645 entitled "DISPERSION COMPENSATION BY USING TUNABLE NONLINEARLY-CHIRPED GRATINGS" which was filed on Feb. 19, 1999 and was issued as U.S. Pat. No. 6,330,383 on Dec. 11, 2001. The U.S. application Ser. No. 09/253,645, in turn, is a continuation-in-part application of U.S. patent application Ser. No. 09/027,345 entitled "TUNABLE NONLINEARLY CHIRPED GRATING" and filed on Feb. 20, 1998 which claims the benefit of the U.S. Provisional Application No. 60/069,498, filed on Dec. 15, 1997 and which was issued as U.S. Pat. No. 5,982,963 on Nov. 9, 1999.

The entire disclosures of the above-cited applications and provisional applications are incorporated herein as part of the specification of this application.

BACKGROUND

This application relates to techniques, devices, and systems for controlling and compensating for optical dispersions in optical media such as optic fiber links in various systems including wavelength-division multiplexed (WDM) optical systems.

Many optical fibers and other optical transmission media can exhibit chromatic dispersion where different spectral components at different wavelengths in an optical signal travel at different speeds. One parameter for characterizing the dispersion is the group velocity which is related to the derivative of the propagation constant of an optical wave with respect to frequency. The first-order group velocity dispersion is typically expressed as a change in light propagation time over a unit length of fiber with respect to a change in light wavelength. An optical pulse comprised of different optical spectral components, therefore, can be broadened or distorted in shape after propagation through a distance in such a dispersive optical medium. This chromatic dispersion effect can be undesirable and even adverse for certain applications such as optical communication systems where information is encoded, processed, and transmitted through optical pulses. The pulse broadening caused by the dispersion can limit the transmission bit rate, the transmission bandwidth, and other performance factors of the optical communication systems.

In addition to chromatic dispersion, some optical transmission media including optical fibers may be optically birefringent to cause polarization-mode dispersion ("PMD") in which the media exhibit different refractive indices for light with different polarizations along two orthogonal principal directions. Therefore, an optical signal, that comprises two polarization components along the two orthogonal principal directions for each frequency, can be distorted after propagation through the transmission medium since the two components propagate in different group velocities. This polarization-mode dispersion is generally independent of the chromatic dispersion and may cause signal distortions even when the chromatic dispersion is fully or substantially compensated, or is sufficiently small to cause pronounced effects.

The degree of PMD may be approximately characterized by the average differential group delay ("DGD") between two principal states of polarization. Typical causes for such birefringence in fibers include, among others, imperfect circular core and unbalanced stress in a fiber along different transverse directions. The axis of birefringence of the optical fiber may change randomly depending on the external conditions. Thus, the DGD in an actual PMD fiber is not a fixed value but a random variable that generally has a Maxwellian probability density function.

One way to mitigate dispersion effects in dispersive optical fibers and other optical transmission media is dispersion compensation by introducing dispersions in an optical signal to negate the dispersions accumulated in that optical signal. Dispersion devices may be used to add artificially-controlled dispersion to the dispersion in the optical signal caused by the transmission medium to modify or control the total dispersion in an optical signal. In dispersion compensation applications, for example, a dispersion device may be designed to produce dispersion that substantially cancels the dispersion caused by the transmission medium. At a given location in an optical link, however, the dispersion in an optical signal may change over time due to factors such as fluctuations in the dispersion caused by variations in temperature or stress in a given optical path of the signal and changes in the physical path of the signal due to switching or routing operations of the nodes. Therefore, it may be desirable to dynamically tune such dispersion compensation or control in response to those and other changes in the dispersion.

Notably, in WDM systems, multiple WDM optical channels at different wavelengths are simultaneously transmitted through a single fiber. Since the dispersions in different WDM channels may be different, it may be desirable to provide different amounts of dispersion compensation to different WDM channels at the same time. In addition, since the dispersion in the WDM channels may vary over time, it may also be desirable to adjust the dispersion compensation in time for different WDM channels.

SUMMARY

This application includes techniques, devices, and systems for generating tunable dispersions to control or compensate for dispersions in optical signals by using waveguiding grating elements with nonlinear group delays.

In one embodiment, a device for processing two or more optical WDM channels may include a fiber grating formed in a fiber having an optic axis along said fiber to guide two or more WDM channels, and a grating control unit coupled to interact with the fiber grating to adjust and tune the fiber grating. The fiber grating is configured to have a spatial grating pattern that has a Bragg reflection band that spectrally covers at least two adjacent WDM channels and reflects received optical spectral components within the Bragg reflection band to produce time delays in different reflected optical spectral components in the two adjacent WDM channels as a nonlinear function of the wavelength. The grating control unit is tunable to change at least relative time delays of the different reflected optical spectral components nonlinearly with respect to wavelength.

The fiber grating may be implemented as a nonlinearly-chirped fiber grating or a non-chirped fiber grating. The spatial grating pattern may be configured to produce a time delay which includes a dependence on a cubic function of the wavelength to tune both the dispersion and the dispersion slope in a reflected optical signal.

BRIEF DESCRIPTION OF THE DRAWINGS

FIG. 1 is a diagram illustrating a nonlinear chirped grating in a wave-guiding element.

FIG. 2 is a diagram showing a grating having a nonlinearly chirped grating period.

FIG. 3A is a chart showing shift of reflective spectrum of a nonlinearly chirped fiber grating due to fiber stretching.

FIG. 3B is a chart showing relative time delay of reflected signals at two different wavelengths due to fiber stretching.

FIGS. 14A and 14B schematically show two implementations of dispersion compensation in a WDM system by using multiple nonlinearly-chirped fiber gratings.

FIGS. 16A and 16B show a periodic modulation on the refractive index n(x) with a constant effective refractive index in a fiber grating and the associated Bragg reflection peak in the frequency space.

FIGS. 16C through 16F illustrate multiple reflection spectral windows generated by modulating the refractive index n(x) to produce two sets of gratings in two different modulation schemes.

FIGS. 17A and 17B show measured shifts of the reflected spectrum and the grating-induced time delay curves, respectively, for an exemplary three-channel sampled nonlinearly-chirped fiber grating under different stretching conditions.

FIGS. 17C and 17D are plots of the deviation of the grating-induced nonlinear time delay from a linear time delay and the dispersion as a function of wavelength for the same three-channel sampled nonlinearly-chirped fiber grating of FIGS. 17A and 17B.

FIG. 28 shows one embodiment of a tunable dispersion slope compensator.

FIGS. 29A, 29B, 30, 31A, 31B, 32A, and 32B show measured data from a 3-channel sampled nonlinearly-chirped fiber grating.

DETAILED DESCRIPTION

Figure 4:
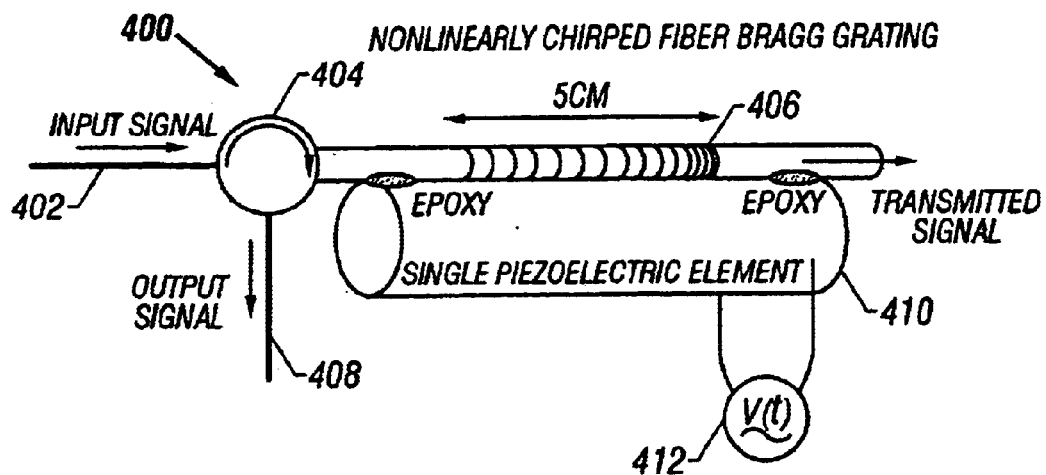
FIG. 4 is a diagram of one implementation of the system in FIG. 2 using a piezoelectric element.

The techniques, devices, and systems described in this application use tunable optical dispersion devices to generate tunable dispersions to control or compensate for dispersions in optical signals. In one embodiment, such a tunable dispersion device includes a wave-guiding grating element with a nonlinear group delay (e.g., a fiber grating formed in a fiber) and a control unit interacting with the wave-guiding element to tune the wave-guiding element. The wave-guiding grating element has (1) an optic axis to transport optical energy along the optic axis and (2) a spatial grating pattern which is an oscillatory variation along the optic axis to reflect optical signals that satisfy the Bragg condition. The wave-guiding grating element is configured to receive an input optical signal and to produce an output optical signal by reflection within a Bragg reflection band produced by the spatial grating pattern. The spatial grating pattern is patterned to produce time delays for different reflected spectral components as a nonlinear function of the wavelength.

In one implementation, the spatial grating pattern may be a nonlinearly chirped spatial grating pattern along the optic axis. The pattern may be formed by a variation in the refractive index of the fiber core along the fiber. In certain applications, the spatial grating pattern may be designed to exhibit at least a third-order nonlinear dispersion effect to produce a tunable dispersion slope so that a grating parameter of the grating may be adjusted to tune both dispersion and dispersion slope.

The control unit is used to change a property of the spatial grating pattern along the optic axis of the wave-guiding element to tune at least relative time delays of the different reflected spectral components nonlinearly with respect to wavelength. When the wave-guiding grating element is implemented as a nonlinearly-chirped fiber grating in a fiber, the control unit may be engaged to the fiber grating to uniformly change the length of the fiber grating, e.g., by stretching the fiber or controlling the temperature of the fiber based on thermal expansion, to tune the fiber grating. The control unit may also be used to change a refractive index of the wave-guiding element for tuning, or to control both the length and the refractive index for tuning. Control of the temperature of the entire fiber grating generally controls both the total length of the fiber grating and the refractive index of the grating.

In a nonlinearly-chirped grating, the underlying fiber may include a grating that has an effective index $n_{eff}(x)$ and the grating period $\Lambda(x)$ are configured to produce a grating parameter $n_{eff}(x)\Lambda(x)$ as a nonlinear function of the position along the fiber optic axis. Such a grating reflects optical waves satisfying a Bragg condition of $\lambda(x)=2n_{eff}(x)\Lambda(x)$. A single Bragg reflection band is generated where the bandwidth is determined by the chirping range of the grating parameter $n_{eff}(x)\Lambda(x)$. The control unit as a grating tuning mechanism may be implemented by using a grating control unit to control the effective index $n_{eff}(x)$, or the grating period $\Lambda(x)$, or a combination of both. This allows for adjustment of the grating parameter $n_{eff}(x)\Lambda(x)$ and thus to the relative delays for signals at different wavelengths within the bandwidth of the reflection. A transducer, e.g., a piezoelectric element, may be used as the control unit to compress or stretch the overall length of the grating in order to produce a tunable dispersion profile. A magnetostrictive element may also be used to change the grating length according to an external control magnetic field. If the grating material is responsive to a spatially-varying external control field such as an electric field, an electromagnetic radiation field, or a temperature field along the grating direction, a control unit capable of producing such conditions can be used to change effective index of refraction and to produce a tunable dispersion profile. In addition, the frequency response of a nonlinearly chirped grating may be tuned by using an acoustic wave propagating along the grating direction, where an adjustable dispersion can be achieved by tuning the frequency of the acoustic wave.

The spatial grating pattern in the wave-guiding element for producing time delays for different reflected spectral components as a nonlinear function of the reflected wavelength produces a single Bragg reflection band with a bandwidth. The bandwidth is essentially determined by the varying range of the spatial grating pattern. For nonlinearly-chirped gratings, the varying range is determined by the difference between the minimum grating period and the maximum grating period. In practical fiber gratings, this varying range generally increases with the length of the fiber gratings. The bandwidth of the Bragg reflection band, therefore, may be designed to meet specific requirements of an application. In a WDM system, for example, the bandwidth of the Bragg reflection band may be set to include only one WDM channel to control or compensate for the dispersion in only that one WDM channel. Two or more such fiber gratings may be combined to control or compensate for dispersions in two or more WDM channels. Alternatively, the bandwidth of the Bragg reflection band may be set to cover two or more WDM channels to simultaneously control or compensate for the dispersions in all reflected channels with the same control mechanism. In the latter implementation, the third-order or higher order nonlinear terms may be included in the spatial grating pattern to produce different tunable dispersion slopes for different channels within the same Bragg reflection band.

This application also describes sampled nonlinearly-chirped gratings to produce two or more substantially identical Bragg reflection bands centered at different wavelengths. In one implementation, a sampled nonlinearly-chirped grating includes a wave-guiding element having a refractive index that varies along its optic axis according to a multiplication of a first spatial modulation and a second spatial modulation. The first spatial modulation is an oscillatory variation with a nonlinearly-chirped period along the optic axis. The second spatial modulation is a periodic modulation with a period different from the nonlinearly-changing period. The first and second modulations effectuate first and second gratings that spatially overlap each other in the wave-guiding element along its optic axis. The first grating may be a nonlinearly-chirped grating. The second grating may have a grating period greater than the first grating. The first grating and second gratings couple with each other and operate in combination to produce a plurality of Bragg reflection bands at different wavelengths and with a bandwidth determined by the first grating. In WDM applications, different Bragg reflection bands may be used to respectively reflect WDM channels. The frequency spacing between two adjacent Bragg reflection bands may be different from the spacing between two adjacent WDM channels to produce different amounts of dispersion for different channels.

The wave-guiding elements such as fibers of this application may be further configured to change relative time delays of two different polarization states in an optical signal and thus, to control the PMD. One embodiment of such a grating comprises a wave-guiding element formed of a birefringent material that exhibits different refractive indices for the two polarization states A nonlinearly-chirped grating is formed in the wave-guiding element along its optic axis and has a varying grating period that changes as a monotonic nonlinear function of a position. The grating operates to reflect two polarization states of an input optical signal at different locations along the optic axis to cause a delay between said two polarization states. This polarization-dependent delay is tunable by using the control unit engaged to the wave-guiding element.

The nonlinearity in the artificially-generated chromatic dispersions provides the tunability for optical dispersion devices based on this application. The nonlinearity in dispersion in the output signal, however, may be eliminated or substantially reduced to achieve a tunable linear dispersion in the output. In this aspect, this application further describes techniques and fiber systems that use two fiber Bragg gratings as a pair to produce a tunable grating dispersion in an input optical signal. Each fiber Bragg grating is designed to have a spatial grating pattern that produces a nonlinear group delay with respect to the frequency detuning of the input optical signal from the center wavelength of a Bragg reflection band. At least one of the two gratings is tunable. In one implementation, such a pair of tunable fiber Bragg gratings may be arranged in various configurations to produce a tunable grating dispersion based on nonlinear dispersion effects from the two gratings without exhibiting a net nonlinear dispersion effect. In another implementation, the spatial grating patterns of the two fiber Bragg gratings, e.g., nonlinear spatial chirps in nonlinearly-chirped gratings, may also be configured so that the grating dispersion and grating dispersion slope may be separately adjusted in a nearly independent manner.

One aspect of this application is the tunability of the optical dispersion devices. In applications for dispersion compensation, varying dispersion in a fiber link may be compensated by using a dispersion analyzer and a feedback control to form a dynamic dispersion control loop. This tunability can be advantageously used in a dynamic fiber network in which communication traffic patterns may change over time. For example, a given channel may be originated at different locations in the network from time to time so that the accumulated dispersion of that given channel in a specific fiber link is a variable. In addition, such tunable optical dispersion devices may be used for, among others, tunable dispersion slope compensation, tunable polarization mode dispersion, chirp reduction in directly modulated diode lasers, and optical pulse manipulation.

Optical dispersion devices according to one embodiment include a wave-guiding element with a spatial grating pattern that is an oscillatory variation along its optic axis to produce nonlinear group delays in a reflected signal, and a control element unit that interacts with the wave-guiding element to tune the optical dispersion generated on a reflected optical signal. The wave-guiding element may be an optical fiber, a planar waveguide formed on a substrate, or in other configurations. The time delays of different reflected spectral components depend directly on spatial positions along the optic axis at which different reflected spectral components are respectively reflected. The grating is designed to produce relative time delays of the different reflected spectral components as a nonlinear function of the wavelength or frequency.

The nonlinear group delay T in the wavelength domain produced by the above grating in a reflected optical signal at $\lambda$ may be generally expressed in the following polynomial expansion:

$$T=D_0^{(2)}(\lambda_0)(\lambda-\lambda_0)+D_0^{(3)}(\lambda_0)(\lambda-\lambda_0)^2/2+D_0^{(4)}(\lambda_0)(\lambda-\lambda_0)^3/6+ \quad (1)$$

where $\lambda_0$ is the center wavelength of the Bragg reflection band of the grating, $D_0^{(2)}(\lambda_0)$ is a coefficient representing the second-order dispersion for which the group delay varies as a linear function of wavelength, $D_0^{(3)}(\lambda_0)$ is a coefficient representing the third-order dispersion for which the group delay varies as a quadratic function of wavelength, and $D_0^{(4)}(\lambda_0)$ is a coefficient representing the fourth-order dispersion for which the group delay varies as a cubic function of wavelength, and so on. The dispersion effects of the third order and higher orders are caused by the nonlinearity of the group delay generated by the spatial grating pattern. For simplicity, only the first two nonlinear terms are shown. Note that the naming of the orders of the nonlinear dispersion terms may be inconsistent in related applications so that the same underlying physical effect may be referred to with different definitions. In this application, the definitions used in Eq. (1) are consistently used throughout this application and can be reconciled with other definitions by the underlying physical effects.

The induced dispersion, D, produced by this grating can be represented by $$D = \frac{dT}{d\lambda} = D_0^{(2)}(\lambda_0) + D_0^{(3)}(\lambda_0)(\lambda - \lambda_0) + D_0^{(4)}(\lambda - \lambda_0)^2/2 + \ldots \quad (2)$$

where the $2^{nd}$, $3^{rd}$, and $4^{th}$ order dispersion terms lead to constant, linear, and quadratic variation in the dispersion with respect to the detuning in wavelength from the center of the Bragg reflection band, respectively. The corresponding rate of change in the induced dispersion in Eq. (2), i.e., the dispersion slope, of this grating can be written as $$\text{Dispersion Slope} = \frac{dD}{d\lambda} = D_0^{(3)}(\lambda_0) + D_0^{(4)}(\lambda - \lambda_0) + \ldots \quad (3)$$

Hence, the grating dispersion D is a function of the frequency detuning, i.e., the relative spectral position of the wavelength $\lambda$ of the input optical signal with respect to the center wavelength $\lambda_0$ of the Bragg reflection band.

The spatial grating pattern of the grating formed in the wave-guiding element may be designed to exhibit one or more selected dispersion terms in Eq. (2). As described below, some gratings may be designed to have at least the third-order dispersion term to achieve a tunable dispersion slope. In operation, the control element unit that interacts with the wave-guiding element changes a selected property of the wave-guiding element to tune the optical dispersion, the dispersion slope, or both. For example, at least one of the refractive index and the total length of the grating may be adjusted by the control element for tuning. The change in the selected property of the wave-guiding element causes a shift in the center wavelength $\lambda_0$ of the Bragg reflection band and thus a change in the dispersion or even the dispersion slope at the wavelength of the input signal. This capability in tuning the grating dispersion or the dispersion slope may be used, for example, to control or compensate for dispersion in an optical signal after transmitting through an optical link with a time-varying dispersion.

In one implementation, the spatial grating pattern of the grating may be nonlinearly chirped along the optic axis of the wave-guiding element to achieve the tunable dispersion or even the tunable dispersion slope. Various embodiments described below use nonlinearly-chirped fiber gratings to illustrate the techniques and devices of this application. However, other spatial grating patterns may also be used to achieve the tunable dispersion or the tunable dispersion slope as long as the spatial grating pattern is patterned to produce time delays for different reflected spectral components as a nonlinear function of the wavelength of the reflected spectral components. The fourth order dispersion term $D_0^{(4)}(\lambda_0)$ may be achieved in a fiber grating without the chirping by using a spatial-varying amplitude profile with discrete phase shifts. The grating chirping and a spatial-varying amplitude profile with discrete phase shifts may be combined to achieve desired nonlinear dispersion terms. In the following sections, nonlinearly-chirped fiber Bragg gratings are used as examples to illustrate the techniques and implementations of various embodiments and, therefore, should not be construed as limitations of various embodiments. It should be understood that, wave-guiding gratings with nonlinear group delays without the nonlinearly-chirped grating profile may also be used in these and other embodiments.

FIG. 1 shows a grating 100 in accordance with one embodiment. See, U.S. Pat. No. 5,982,963 to Feng et al. on Nov. 9, 1999. The grating 100 is formed of an optical wave-guiding element 104 such as a fiber or a planar waveguide. A spatial grating pattern is patterned in the wave-guiding element 104 to produce time delays for different reflected spectral components as a nonlinear function of spatial positions along the optic axis at which the different reflected spectral components are respectively reflected. As illustrated, the spatial grating pattern has a nonlinearly chirped pattern in this exemplary implementation. The grating period, $\Lambda(x)$, and the effective index of refraction in the grating, $n_{eff}(x)$, are at least partly dependent on the position, x, along the wave-guiding element 104. The grating is effected by a modulation on the refractive index n(x) of the wave-guiding element. The effective index $n_{eff}(x)$ is a spatial average of n(x) and can be either a constant value or a function of the position x depending on the n(x). An input optical signal 102 enters the grating 104 at a nearly normal incidence to produce a reflected signal 112 and a transmitted signal 110.

A spectral component of a wavelength $\lambda$ in the input optical signal 102 is reflected back at position x when the wavelength $\lambda$, the grating period $\Lambda(x)$, and the effective index of refraction $n_{eff}(x)$ satisfy a Bragg phase-matching condition:

$$2n_{eff}(x)\Lambda(x)=\lambda. \quad (4)$$

Therefore, the wavelength $\lambda$ of the reflected wave varies with the position x according to the grating parameter $n_{eff}(x)\Lambda(x)$. Different spectral components of different wavelengths, e.g., the reflection 106 at $\lambda_1$ and the reflection 108 at $\lambda_2$, are reflected at different locations and have different phase delays. For example, when the grating parameter $n_{eff}(x)\Lambda(x)$ increases with x, spectral components at short wavelengths satisfying the phase-matching condition are reflected back at locations before the components at long wavelengths. A spectral component in the input signal 102 that does not meet the above Bragg phase-matching condition transmits through the wave-guiding element 104 as indicated by a signal 110. The grating parameter $n_{eff}(x)\Lambda(x)$ determines the spectral range of the reflected signal from the grating 100. This forms the basis for applications such as dispersion compensation and pulse shaping.

The grating 100 is generally configured to have a nonlinearly chirped grating parameter $n_{eff}(x)\Lambda(x)$, i.e., $n_{eff}(x)\Lambda(x)$ changes nonlinearly with the position x. This may be achieved by a nonlinearly chirped $n_{eff}(x)$, $\Lambda(x)$ or a combination of both.

The grating 100 can be adjusted to change the reflection spectrum and the relative delays in the different reflected spectral components. A grating control 120 is implemented to control the grating parameter $n_{eff}(x)\Lambda(x)$ by varying at least one of $n_{eff}(x)$ and $\Lambda(x)$ of the grating 100. This provides a dynamically tunable reflection spectral range and relative delays of different reflected spectral components. The grating control 120 as a grating tuning mechanism may be implemented in various configurations. A transducer, e.g., a piezoelectric element, may be used as the control 120 to compress or stretch the overall length of the grating in order to produce a tunable dispersion profile. The grating control 120 may also be a thermal control unit such as a temperature controlled house enclosing the grating 100 to control the temperature of the entire grating 100 to uniformly change the length of the grating 100 to thermally expand or contract the length of the grating for tuning. A magnetostrictive element may also be used to change the grating length according to an external control magnetic field. If the grating material is responsive to a spatially-varying external control field such as an electric field, an electromagnetic radiation field, or a temperature field along the grating direction, a control unit capable of producing such conditions can be used to change effective index of refraction and to produce a tunable dispersion profile. In addition, the frequency response of a nonlinearly chirped grating may be tuned by using an acoustic wave propagating along the grating direction, where an adjustable dispersion can be achieved by tuning the frequency of the acoustic wave.

FIG. 2 shows one implementation 200 of the nonlinearly chirped grating 100. A fiber grating 204 has a constant effective index of refraction $n_{eff}(x)=n$ and a nonlinearly chirped grating period $\Lambda(x)$. Thus, a phase-matched wavelength changes with the position x according to $\Lambda(x)$ only. A fiber stretcher 220 is engaged to the fiber grating 204 to change the overall length of the grating 204. This provides a control in the reflection spectrum and the relative delays in different spectral components.

When the fiber grating 204 is stretched, each grating pitch increases. Accordingly, a phase-matched wavelength at each grating position increases. Therefore, the reflection spectrum shifts towards longer wavelengths. This effect is illustrated in FIG. 3A in which curves 302 and 304 respectively represent the reflection spectral profiles before and after the fiber stretching.

Since the grating period $\Lambda(x)$ is nonlinearly chirped, the delay of the reflected spectral components also has a nonlinear dependence on the position x. In addition, a change in the overall fiber length produces different changes in $\Lambda(x)$ at different positions along the fiber grating 204. This produces different relative delays for different wavelengths that satisfy the Bragg phase-matching condition. Such an effect can be used to produce tunable dispersion compensation profiles.

FIG. 3B is a chart of the relative time delays of two wavelengths before and after the fiber stretching. Curve 306 represents the time delay as a function of wavelength before the fiber stretching. Two different wavelengths $\lambda_1$ and $\lambda_2$ have a relative time delay $\Delta t$ with respect to each other. After the fiber grating is stretched, the time delays of both wavelengths increase (curve 308) and the relative time delay $\Delta t'$ is in general different from $\Delta t$. In the example shown, the relative time delay $\Delta t'$ increases.

Referring to FIG. 2, any device capable of stretching the grating 204 may be used as the stretcher 220. For example, a piezoelectric element or a magnetostrictive element may be used to produce a control over the length of the grating 204 according to an external electrical voltage or a magnetic field. Piezoelectric and magnetostrictive transducers are well known and will not be described here.

A technique of using a magnetostrictive rod to stretch a fiber in a non-uniform magnetic field is disclosed by Cruz et al. in "Fibre Bragg gratings tuned and chirped using magnetic fields," Electronics Letters, Vol. 33(3), pp. 235–236 (1997). This technique can be used in the embodiment 200 of FIG. 2 to adjust the grating length. In particular, since the fiber grating 204 is nonlinearly chirped, a uniform magnetic field, rather than a gradient magnetic field, can be used to uniformly stretch the fiber grating 204 for tuning the dispersion response.

FIG. 4 shows an implementation of the embodiment 200 by using a piezoelectric element. Two ends of a piezo element 410 are respectively fixed at two sides of a nonlinearly chirped fiber grating 406 by, for example, using an adhesive such as epoxy. A voltage source 412 supplies a control voltage to the piezo element 410 to change the length of the piezo which in turn couples the strain to the fiber grating 204. An optical circulator 404 is used to couple an input optical signal 402 to the fiber grating 406 and to route the reflected signal 408. An optional optical isolator may be placed at the other end of the fiber grating 406 to reject any optical feedback signal.

The nonlinearly-chirped fiber grating 204 may be made by a near-UV technology that uses an interference pattern produced by a phase mask with a light beam at 300 nm. The absorption of light in the fiber core at the wavelength of 300 nm is sufficiently small to avoid damage to the core-cladding interface in the fiber. A photosensitive fiber (e.g., the type manufactured by QPS Technology) is first soaked in a high-pressure molecular hydrogen chamber under about 250 atm pressure at ~60° C. for approximately 2 days to give the core an estimated hydrogen concentration of about 2.5 mol. %.

Figure 5:
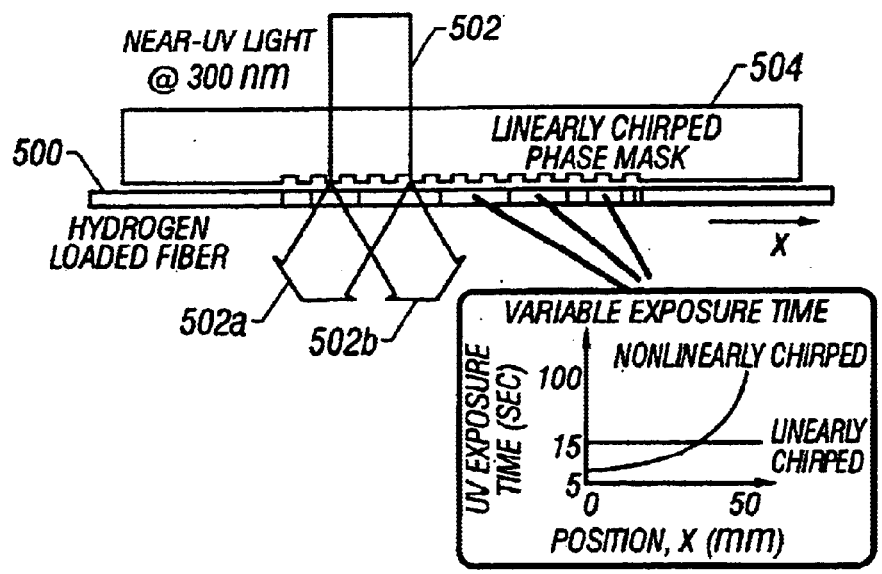
FIG. 5 is a schematic illustration of one approach to form a nonlinearly chirped grating in a photosensitive fiber.

FIG. 5 illustrates the formation of the nonlinearly-chirped grating 204 in a hydrogen-loaded photosensitive fiber 500. A light beam 502 from a UV argon laser operating on a group of spectral lines near 300 nm is focused through a 50-mm long linearly-chirped phase mask 504 onto the fiber core at an intensity of about 200 W/cm². Two first-order diffraction beams 502a and 502b interfere with each other to form an interference pattern in the immediate vicinity of the phase mask 504 where the fiber core is located. Each 1-mm spot on the fiber 500 is exposed for time periods ranging from 5 to 100 sec. After each exposure, the fiber 500 and mask 504 are translated by 1 mm relative to the UV light beam 502 and the process is repeated. The variable exposure time induces the nonlinear chirp as shown in the insert of FIG. 5.

Figure 6A:
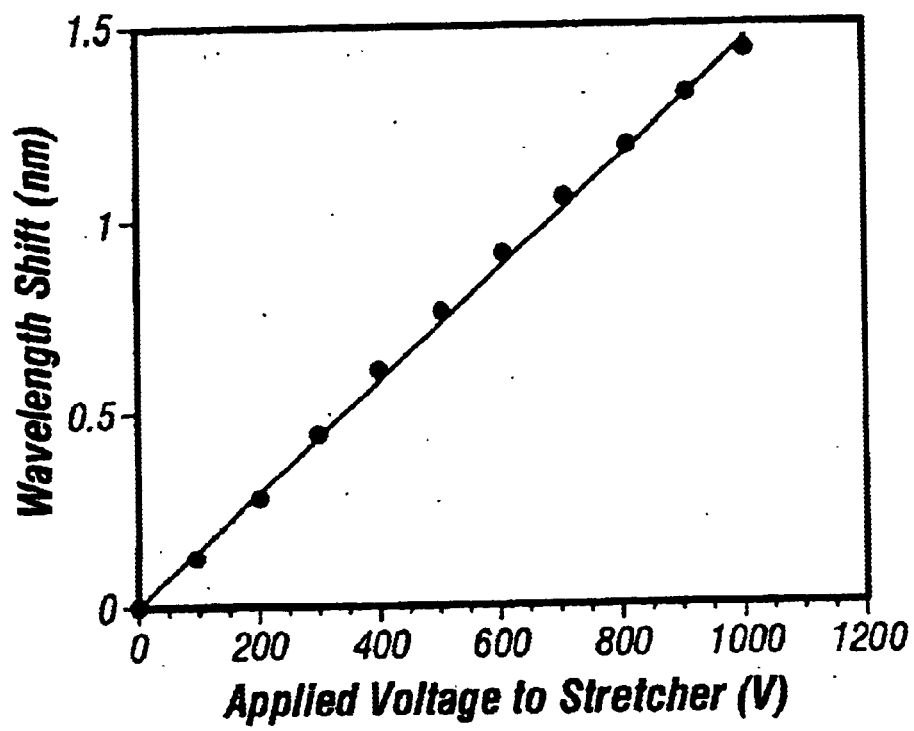
FIG. 6A is a chart showing measured wavelength shift in the reflected signals due to fiber stretching in the system of FIG. 4.
Figure 6B:
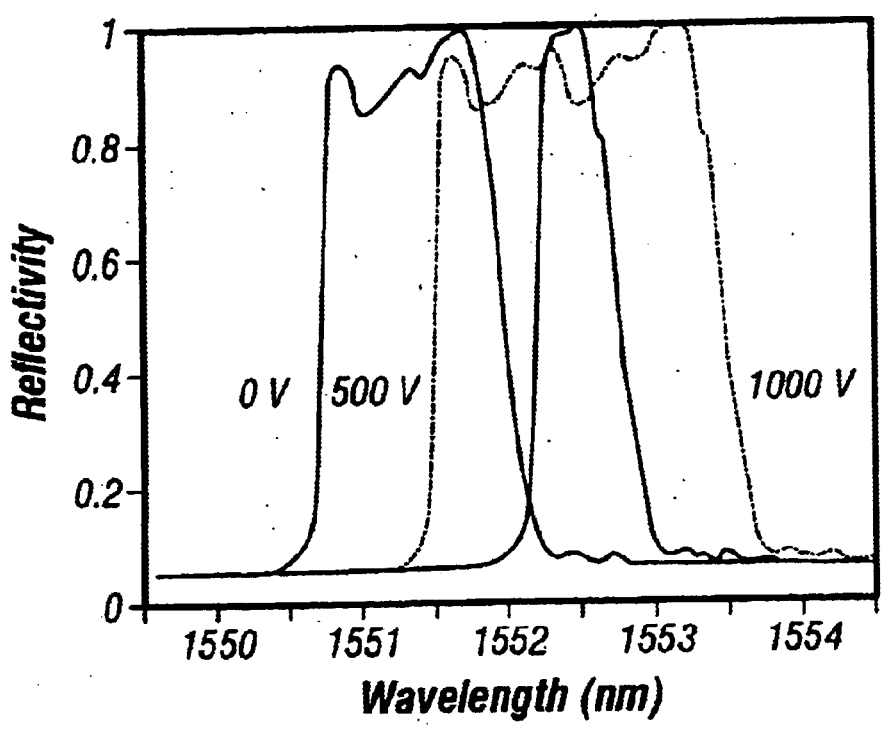
FIG. 6B is a chart showing measured shift of the reflection spectrum in the system of FIG. 4.

FIG. 6A shows the measured wavelength shift in the reflected signal 408 as a function of the control voltage applied to the piezo element 410. FIG. 6B shows the reflection spectrum shifts due to fiber stretching for voltages on the piezo element 410 at 500 V and 1000 V, respectively. When a control voltage of about 1000 V is applied to the piezo element 410, the reflected band is shifted by about 1.5 nm, and the wavelength shift is linear with respect to the voltage. The bandwidth is about 1 nm and the reflectivity varies from 85% to 100%, i.e. by approximately 0.7 dB. The dispersion varies nonlinearly and smoothly from 300 ps/nm to 1000 ps/nm. While increasing the applied voltages, the time delay curves shift to longer wavelengths without distorting the smooth shape. Therefore, for a given transmitted channel wavelength, the channel will encounter a different dispersion compensation corresponding to different stretching of the nonlinearly-chirped fiber grating.

Figure 6C:
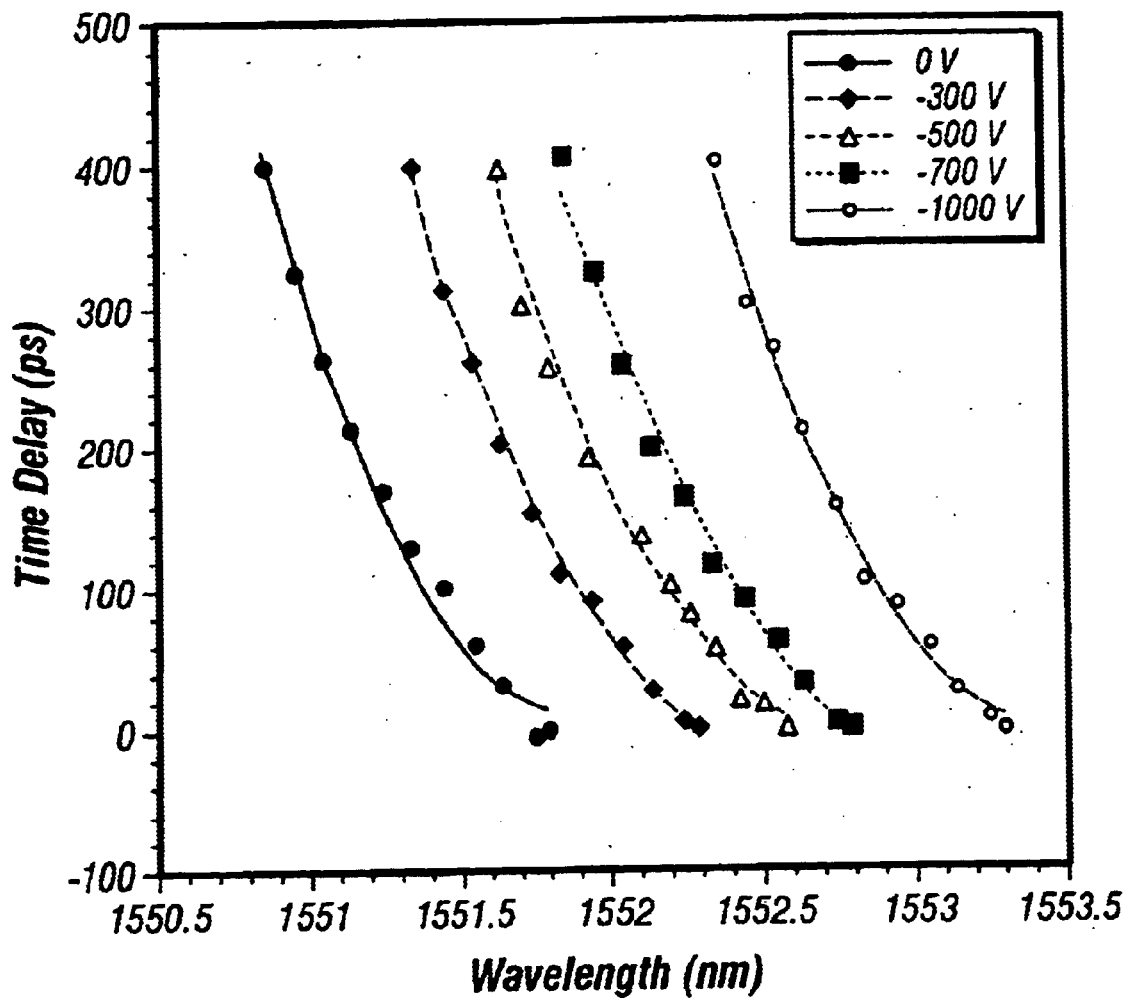
FIG. 6C is a chart showing nonlinear time delays of reflected signals as a function of wavelengths that are measured in the fiber grating of FIG. 4.

FIG. 6C further shows measured nonlinear time delays of reflected signals as a function of wavelengths when the fiber grating is stretched by different amounts under different control voltages.

Figure 6D:
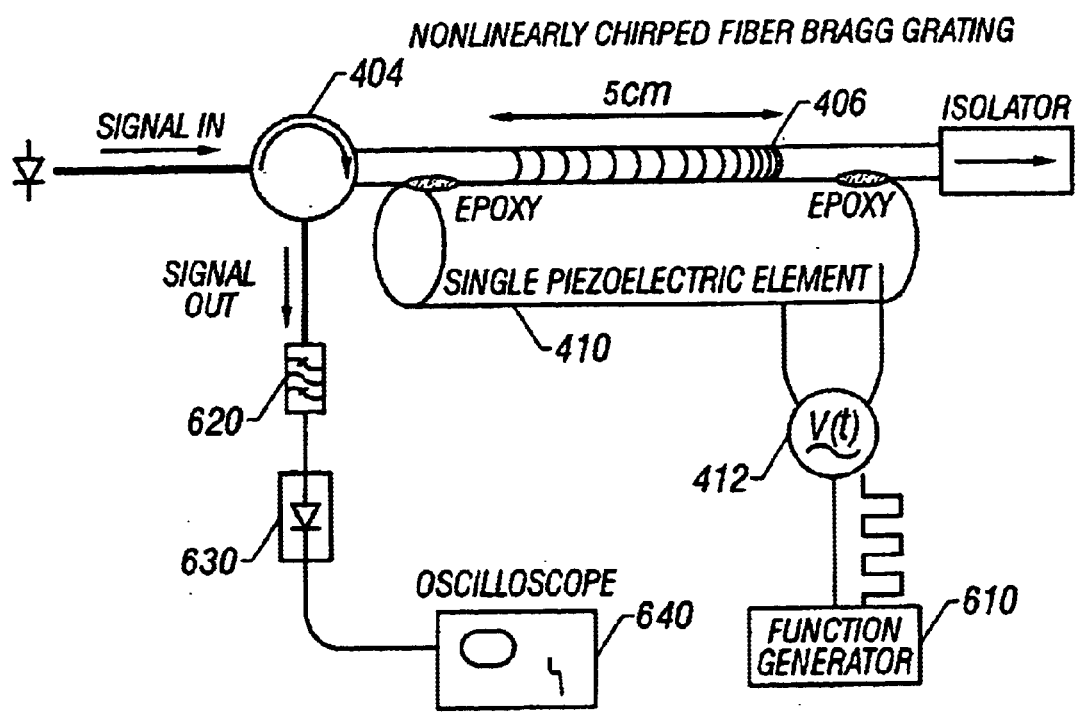
FIG. 6D is a diagram of a modulated nonlinearly chirped fiber grating.

The length of the piezoelectric element 410 can be modulated to provide dispersion switching. FIG. 6D shows a system using the fiber grating 400 to produce a signal with a modulated dispersion. A modulation signal generator 610 modulates the piezo control 412 so that the length of the fiber grating 406 is modulated. A bandpass interference filter 620 with a bandwidth of 0.3 nm is used to filter the reflected output from the fiber grating 406. A photodetector 630 receives the transmitted signal from the filter 620. An oscilloscope 640 receives and displays the time response of the signal from the photodetector 630.

Figure 6E:
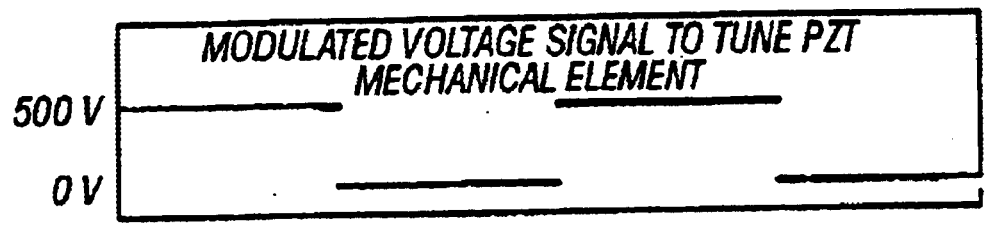
FIG. 6E is a chart showing a modulated voltage signal used in FIG. 6D.
Figure 6F:
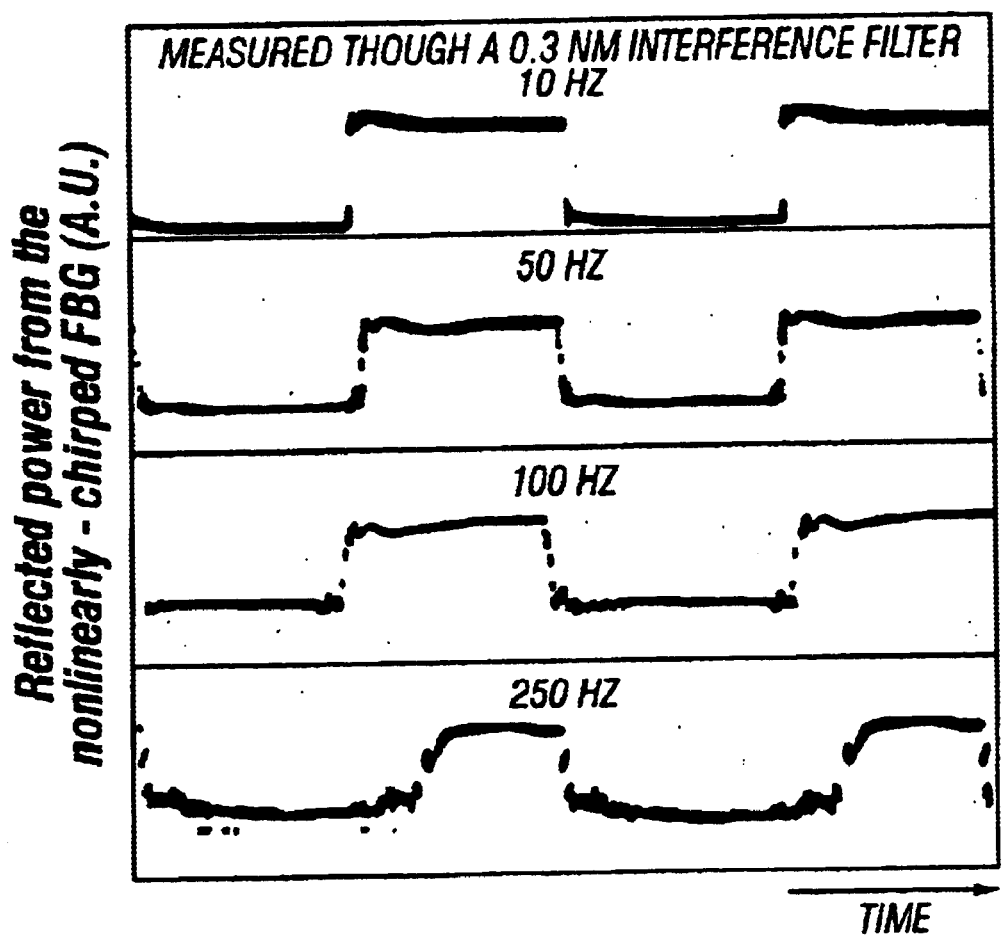
FIG. 6F is a chart showing reflected output signals as a function of time at different modulation frequencies.

FIG. 6E shows the modulated control voltage applied to the piezo element 410. Measurements at modulation frequencies at 10 Hz, 50 Hz, 100 Hz, and 250 Hz are shown in FIG. 6F. The piezoelectric element 410 may be modulated up to about 100 Hz using 0–500 Volts modulation. The upper limit of the frequency response is limited by the characteristics of the PZT. With this dynamic response, dispersion compensation in less than 10 ms can be achieved in circuit-switched optical networks.

Figure 7:
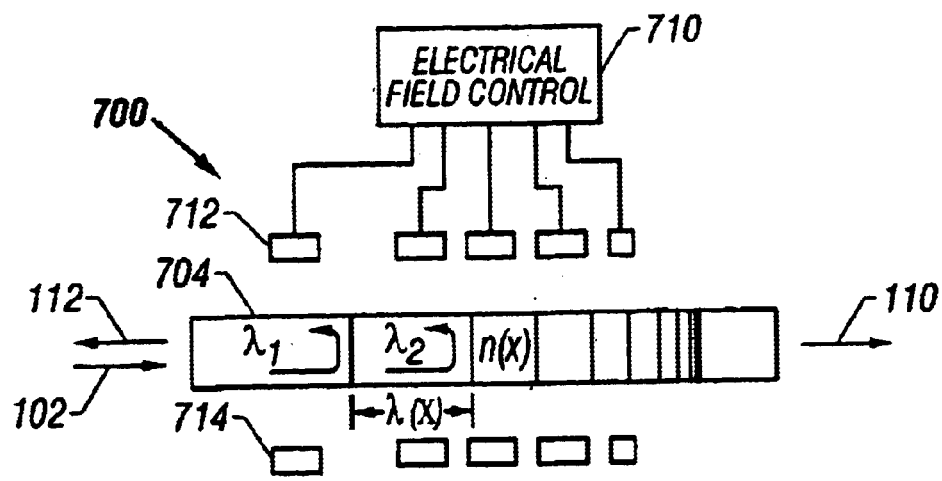
FIG. 7 is a diagram showing a nonlinearly chirped grating based on electro-optic effects.

The nonlinearly chirped grating 100 in FIG. 1 can also be implemented by using a wave-guiding element that has an index of refraction dependent on an external electrical field. One example of such wave-guiding element is a dielectric waveguide or fiber exhibiting electro-optic effects. $LiNbO_3$ is a commonly used electro-optic material. FIG. 7 shows a grating 700 with a nonlinearly chirped grating period in such a wave-guiding element 704. The effective index of refraction $n_{eff}(x)$ of the wave-guiding element 704 varies with an electrical field. A series of pairs of electrodes 712, 714 are disposed along the wave-guiding element 704 to produce adjustable local fields. An electrical-field control module 710 controls the spatial variation of the field to produce a desired nonlinear chirped $n_{eff}(x)$ and to adjust the dispersion.

Figure 8:
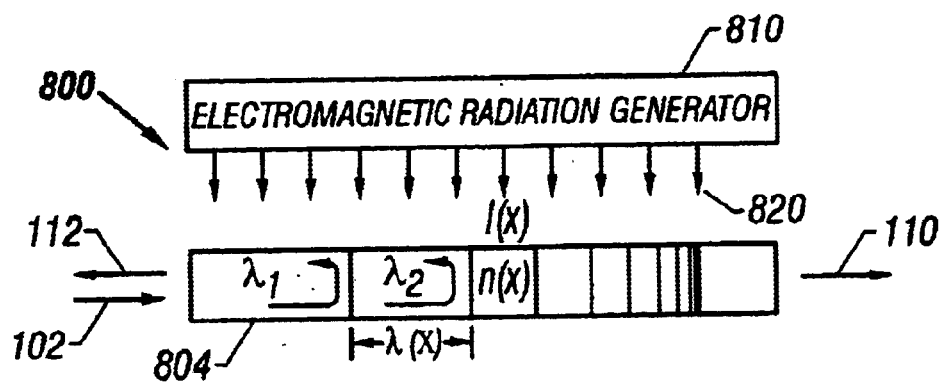
FIG. 8 is a diagram showing a photosensitive nonlinearly chirped grating.

FIG. 8 shows another embodiment 800 that uses an electromagnetic radiation to control the spatial variation of the effective index $n_{eff}(x)$ of a wave-guiding element 804. The wave-guiding element 804 responds to the radiation field 820 and has a field-dependent effective index $n_{eff}(x)$. For example, photosensitive materials such photorefractive crystals and polymers may be used to implement the present invention. The nonlinear chirping of the effective index $n_{eff}(x)$ is formed by applying an electromagnetic radiation field 820 with a nonlinear intensity distribution along the grating. A radiation generator 810 is configured to control the intensity variation $I(x)$ of the field 820. In the optical frequency range, the radiation generator 810 may be a laser.

Figure 9:
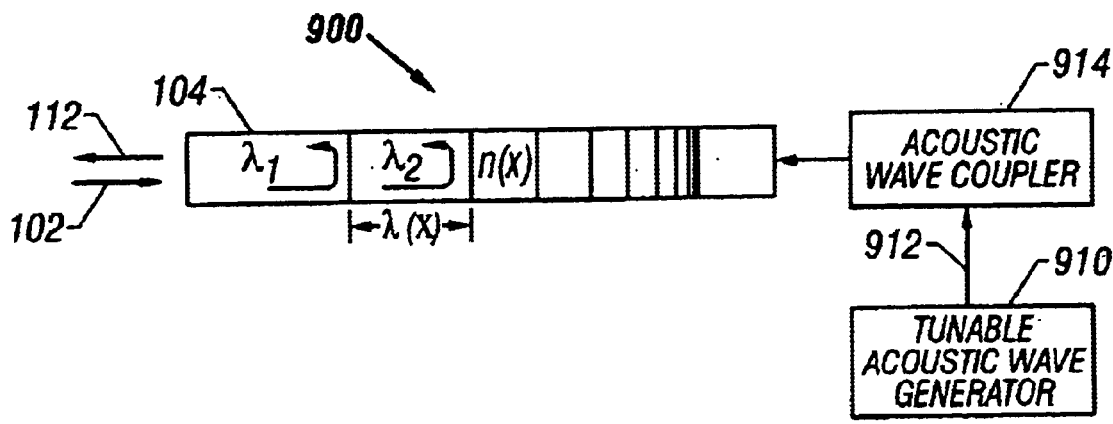
FIG. 9 is a diagram showing a nonlinearly chirped grating having an acoustic tuning element.

It is further contemplated that an acoustic wave can be used to modulate the response of any of the above nonlinearly chirped gratings for tuning the output frequency. FIG. 9 shows a nonlinearly chirped grating 900 with such an acoustic tuning mechanism. An acoustic wave generator 910 produces a tunable acoustic wave 912. An acoustic wave coupler 914, such as an acoustic focusing horn, couples the acoustic wave into the grating 104.

In operation, the acoustic wave interacts with the grating and induces two additional narrow-band peaks on either side of the base band produced by the Bragg resonance condition. The frequency components in either sideband has the same relative delays as in the baseband but are shifted from the baseband in frequency by a specified amount. This frequency shift is dependent on the frequency of the acoustic wave. Thus, the frequency of a sideband is adjustable by changing the frequency of the acoustic wave. Liu et al. disclose such a technique in "Improved Efficiency Narrow-Band Acoustooptic Tunable Reflector using Fibre Bragg grating," post deadline paper PD4, Annual Meeting of Optical Society of America, "Bragg Gratings, Photosensitivity, and Poling in Glass Fibers and Waveguides: Applications and Fundamentals," Oct. 26–28, 1997, Williamsburg, Va.

The nonlinearly chirped fiber gratings in accordance with this embodiment are tunable in two aspects. First, the frequency profile of the reflected and the transmitted signals can be shifted as desired. Second, the relative delays of different frequency components in an input pulse can be adjusted in a controllable manner. The first aspect of tunability is useful in multi-wavelength photonic systems such as wavelength-division multiplexed fiber communications systems. The second aspect of the tunability can be used for dynamic dispersion compensation in many dispersive optical systems, especially in fiber communication systems.

Figure 10A:
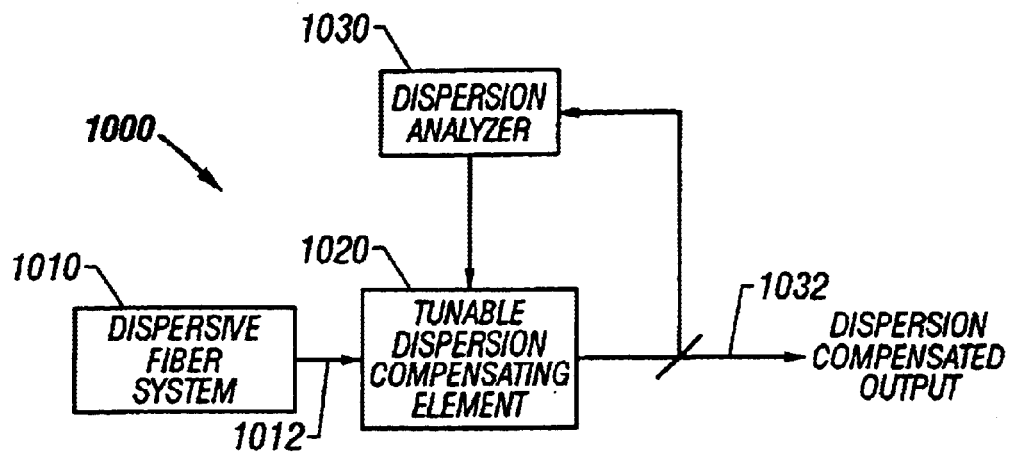
FIGS. 10A and 10B are block diagrams of two dynamically adjustable dispersion compensation systems.

FIG. 10A shows a fiber system 1000 having a tunable dispersion-compensating element 1020 in accordance with one embodiment of the invention. The tunable dispersion element 1020 may be a nonlinearly chirped grating. A dispersive fiber system 1010 produces an optical signal 1012 with a certain amount of dispersion. A dispersion analyzer 1030 measures the amount and the sign of the accumulated dispersion in the output signal from the tunable dispersion compensating element 1020. The tunable dispersion-compensating element 1020 uses this information to adjust the dispersion compensation of the element 1020 in such a way that the dispersion in the signal 112 is compensated. As the dispersion in the dispersive fiber system 1010 changes, the tunable dispersion-compensating element 1020 adjusts accordingly in response to the dispersion change to maintain the desired dispersion compensation in output 1032.

Figure 10B:
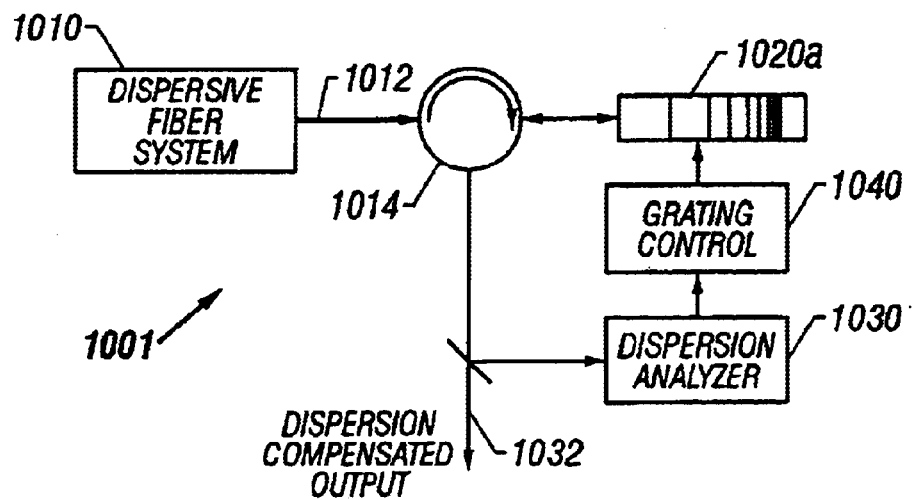

FIG. 10B is a block diagram for a fiber communication system 1001 that uses a nonlinearly chirped fiber grating 1020a to implement the system 1000 in FIG. 10A. A grating control 1040 adjusts the grating parameter $n_{eff}(x)\Lambda(x)$ in accordance with the control command from the dispersion analyzer 1030 to maintain the output 1032 properly compensated. The grating control 1040 may be any or a combination of the techniques shown in FIGS. 2, 7, and 8.

Figure 10C:
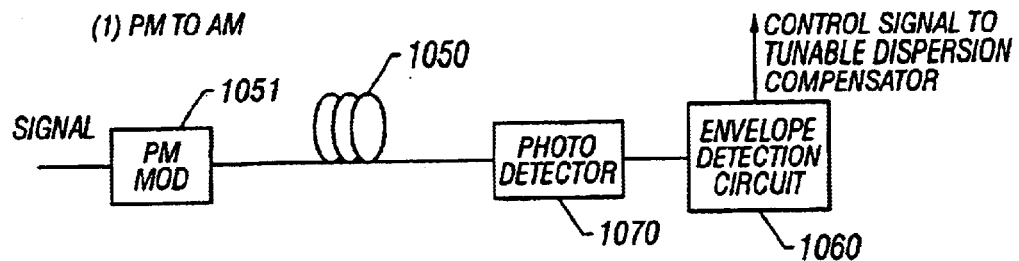
FIGS. 10C, 10D, and 10E are diagrams showing three exemplary implementations of the dispersion analyzer in FIGS. 10A and 10B.

The dispersion analyzer 1030 may be implemented in a number of ways. FIG. 10C shows a phase modulation to amplitude modulation dispersion detector. A phase modulator 1051 is disposed in the signal path to modulate the phase of the signal prior to transmission through a dispersive fiber 1050. An envelop detection circuit 1060 measures the converted amplitude modulation, whose amplitude corresponds to the relative accumulated dispersion, in the received signal by a photodetector 1070. More specifically, the polarity of dispersion can be detected by including the total dispersion of the group velocity dispersion in the fiber and the self-phase modulation caused by the fiber nonlinearity. See, Tomizawa et. al, "Nonlinear influence on PM-AM conversion measurement of group velocity dispersion in optical fiber," Electronics Letters, Vol. 30(17), pp. 1434–1435 (1994). The amplitude of the converted amplitude modulation is then used to determine the accumulated dispersion and to generate a control signal to the tunable dispersion compensation element.

Figure 10D:
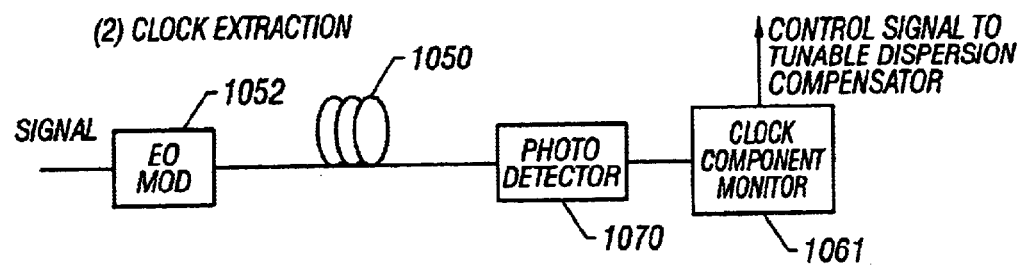

FIG. 10D shows another implementation of the dispersion analyzer 1030. An electro-optic modulator 1052 is disposed in the signal path to modulate the amplitude of the signal prior to transmission through the dispersive fiber 1050. The relative dispersion value can be determined by monitoring the amplitude of the clock component extracted from the signal after a square wave detection. This is done by a clock component monitor 1061. Since the dispersion broadens the signal pulses and reduces the amplitude of the signal, the magnitude of the clock component also decreases according to the broadening. Therefore, by adjusting the dispersion compensator to maximize the amplitude of the clock amplitude, the accumulated dispersion can be reduced or canceled.

Figure 10E:
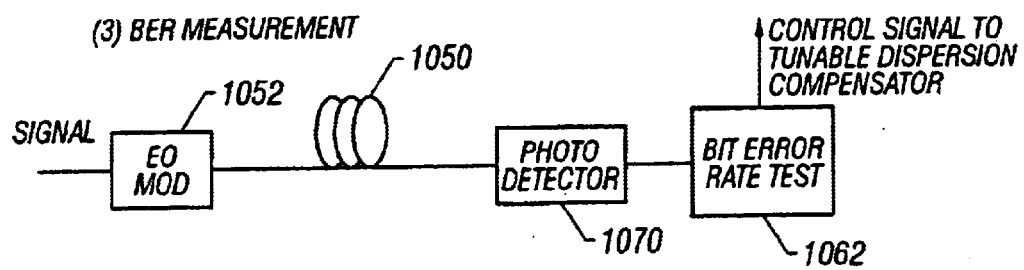

The dispersion analyzer 1030 can further be implemented by directly measuring the bit error rate of the signal passing through a dispersive fiber. This is shown in FIG. 10E. Since the dispersion can broaden the data pulses, the bit error rate ("BER") is degraded. A bit error rate testing device 1062 measures the bit error rate and extracts a relative information of the accumulated dispersion. With a feedback signal to the tunable dispersion compensator, the dispersion compensation can be adjusted to reduce or minimize the bit error rate.

Figure 11A:
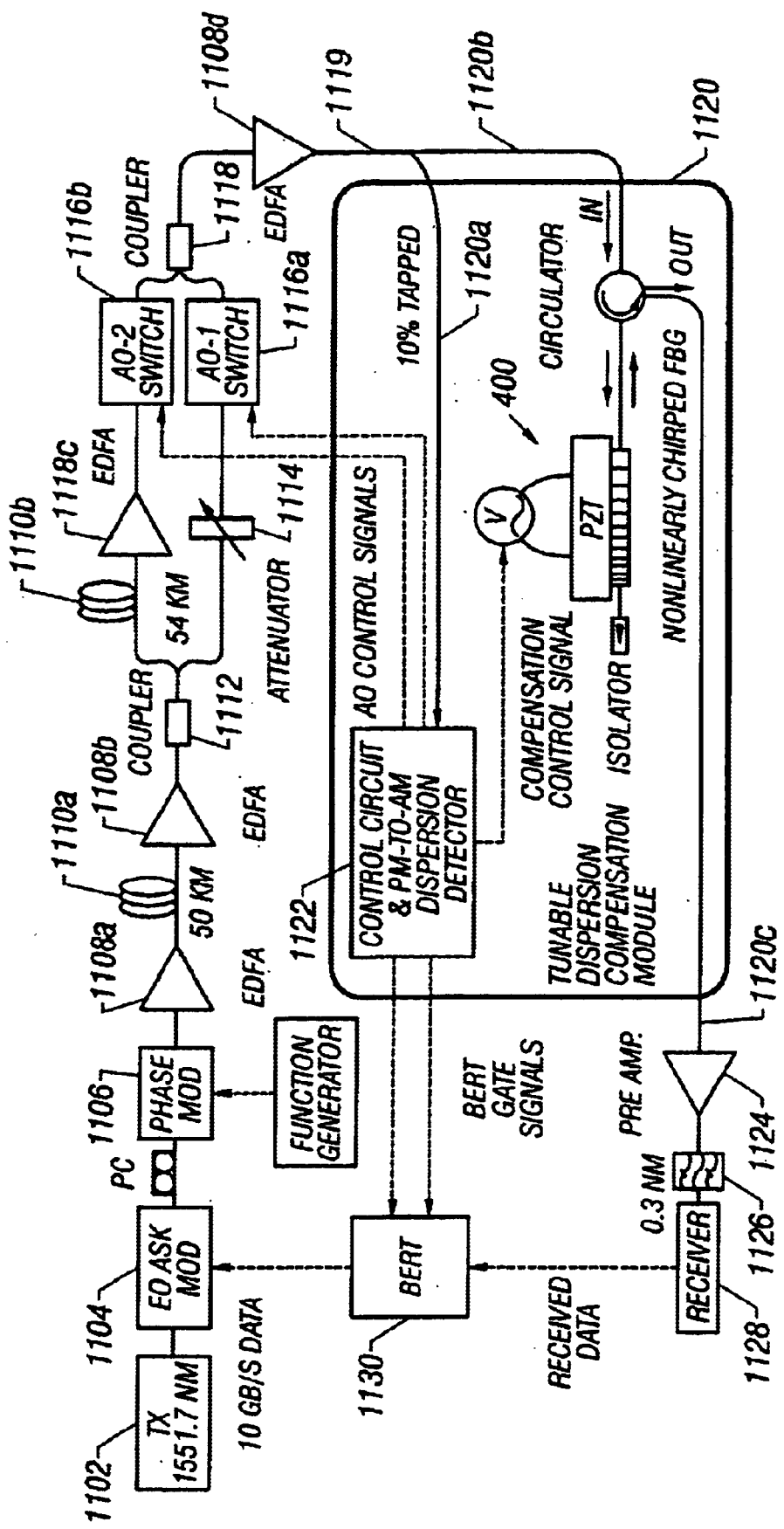
FIG. 11A is a block diagram of a fiber communication system based on the configuration in FIG. 10B using a nonlinearly chirped fiber grating.

FIG. 11A further shows a specific implementation of the dynamic fiber system 1100 in FIG. 10B. An electro-optic modulator 1104 imposes data on a laser beam generated by a laser 1102 with a data rate at 10 Gbit/s. In addition, a phase modulator 1106 modulates the phase of the optical signal prior to transmission. A tunable dispersion compensator 1120 based on a nonlinearly chirped fiber grating 400 as in FIG. 4 is implemented to perform the dispersion compensation. An optical coupler 1112 splits the signal into to different optical paths. The signal path passing through the fiber loops 1110a, 1110b and acoustooptic switch 1116b is more dispersive than the signal path passing through the fiber loop 1110a, the optical attenuator 1114, and the acoustooptic switch 1116a. Er-doped fiber amplifiers 1108a, 1108b, 1108c, and 1108d are used to maintain the signal strength above a specified level. The dispersion in the signal 1119 is detected by a dispersion analyzer 1122 by splitting a small portion 1120a of the signal 1119 (e.g., 10%). The majority 1120b of the signal 1119 is fed to the fiber grating 400 which produces a dispersion-compensated output 1120c. An EDFA 1124 is used to amplify the output 1120c. An optical receiver 1128 detects the amplified signal 1120c to produce the received data.

The dispersion analyzer 1122 uses a PM-to-AM converter for measuring the dispersion. Due to the different group velocity dispersions of the different spectral components in the signal, the phase modulation is converted to amplitude modulation after the signal has traveled through a certain distance of fiber path. The accumulated dispersion is measured by the dispersion analyzer 1122. The dispersion analyzer 1122 further generates a corresponding control signal to the tunable fiber grating 400.

A bit error rate test 1130 is used to measure the bit error rate for evaluating the performance of the dispersion compensation module 1120. The output 1120c from the module 1120 is amplified and filtered by a bandpass filter 1126 with a bandwidth of 0.3 nm.

Figure 11B:
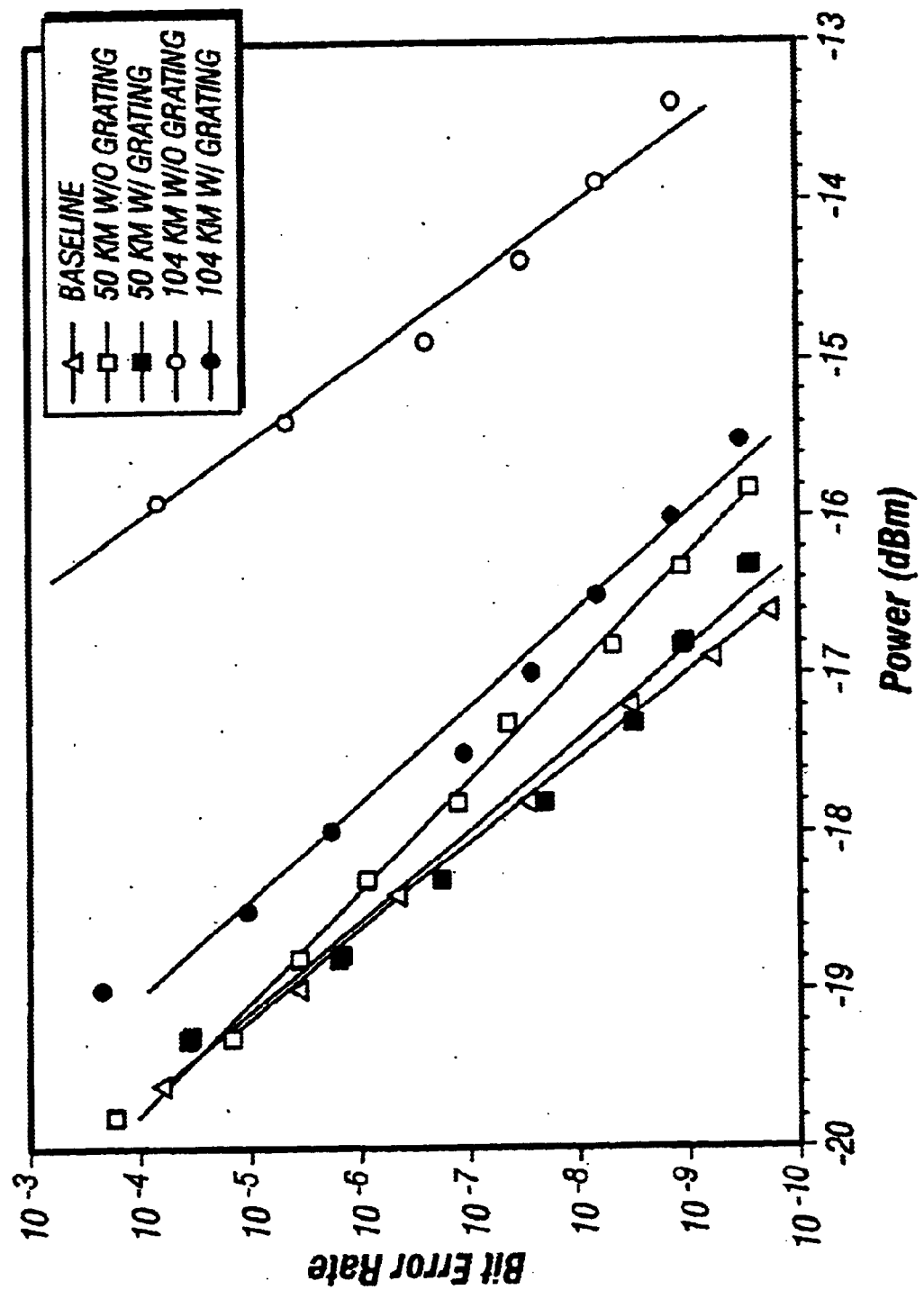
FIGS. 11B, 11C, and 11D are charts showing measured results of the system in FIG. 11A.
Figure 11C:
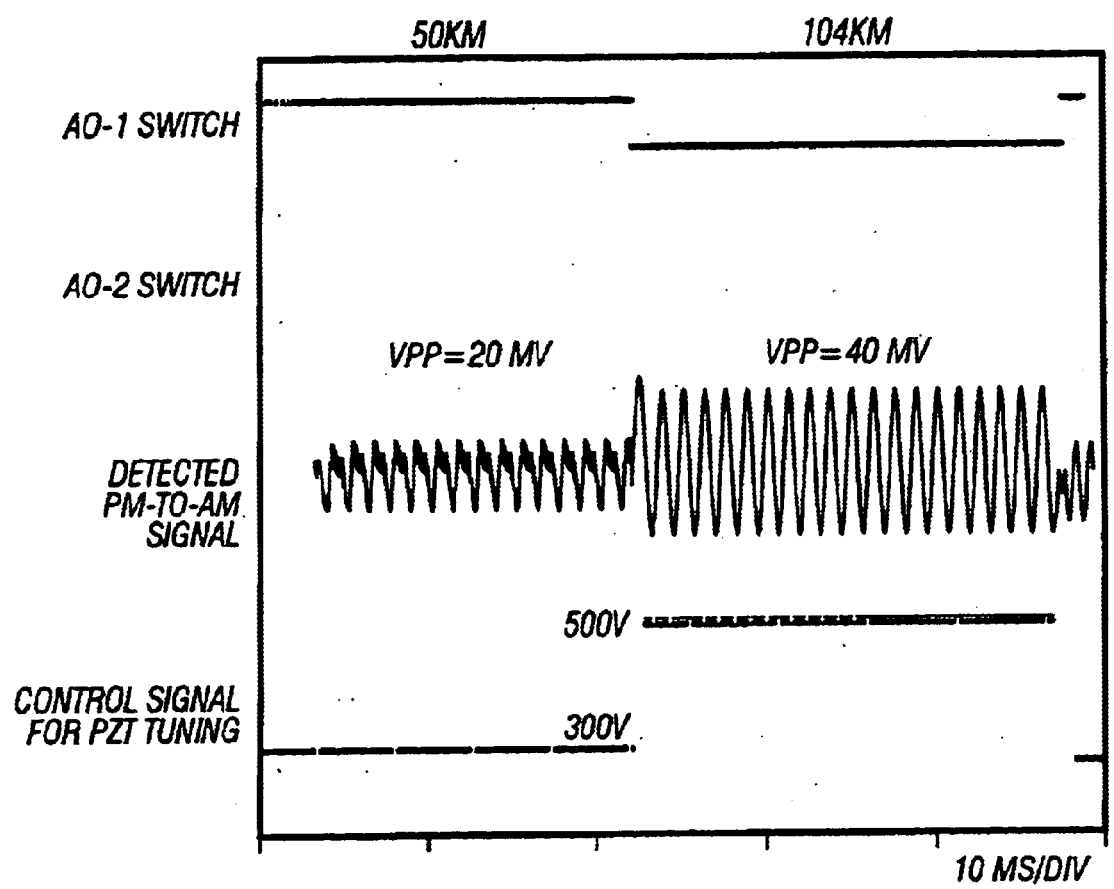
Figure 11D:
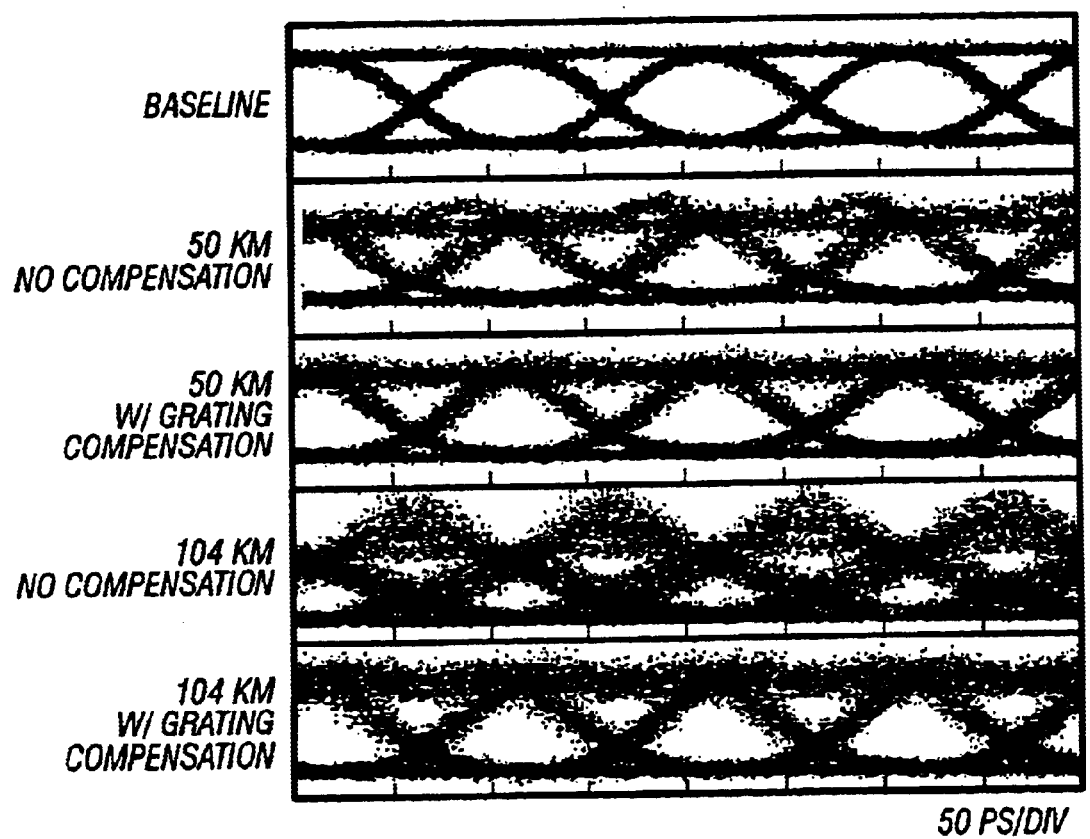

FIG. 11B shows measured results of the bit error rate as a function of the signal power in dBm. FIG. 11C shows how the control signal for the PZT tuning is generated in response to the dispersion levels of the input signals. FIG. 11D shows the measured eye diagrams indicating the significant improvements in the BER due to the dynamic dispersion compensation.

The above described nonlinearly chirped gratings may also be used in other applications such as chirp cancellation in directly modulated lasers and pulse shaping.

Figure 12:
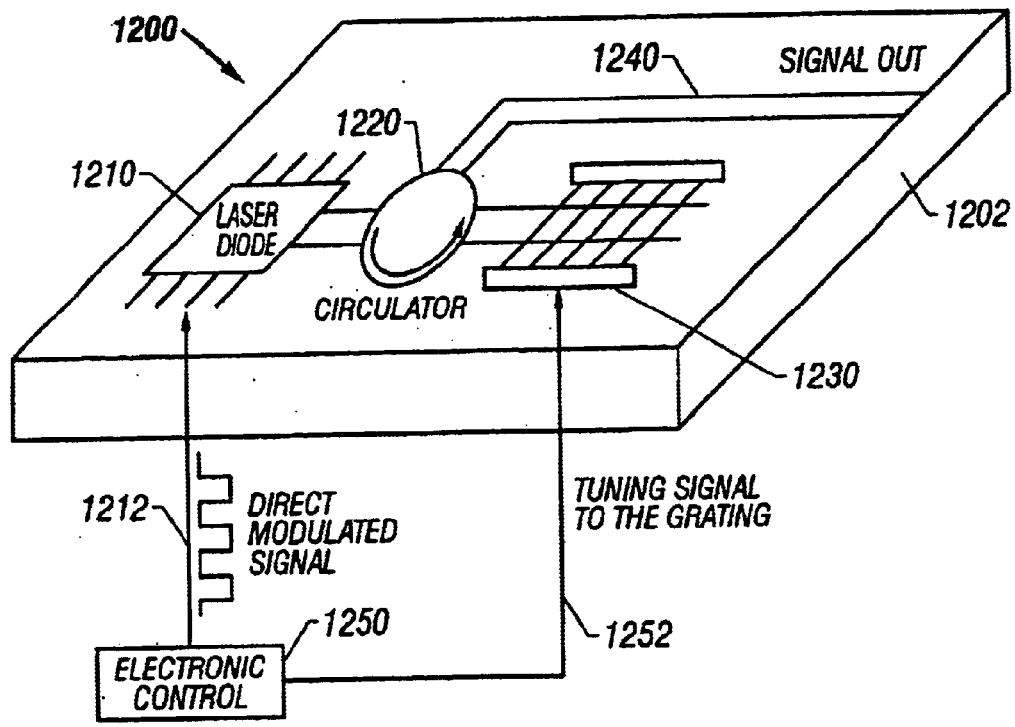
FIG. 12 is a diagram illustrating a semiconductor laser have a nonlinearly chirped waveguide grating for reducing modulation-induced frequency chirps in the laser output.

FIG. 12 shows an integrated semiconductor laser module 1200 having a nonlinearly chirped waveguide grating 1230 for reducing the modulation chirp. A laser diode 1210 is formed on a substrate 1202. A modulation signal 1212 is applied to the laser diode 1210 to modulate the driving current. Such direct modulation can cause frequency chirps in the output of the laser diode 1210. A nonlinearly chirped waveguide grating 1230 is formed on the substrate 1202 to produce a dispersion for reducing the frequency chirp.

The chirp in the laser output changes with the modulation frequency of the modulation signal 1212. The relation between the modulation frequency and the chirp in the laser output can be determined, e.g., by measurements. Based on this relation, a control circuit 1250 can be configured to generate a corresponding dispersion control signal 1252 to adjust the dispersion of the grating 1230. The control circuit 1250 may be located outside the substrate 1202 as shown or alternatively integrated on the substrate 1202. An optical circulator 1220 is located in the optical path between the laser diode 1210 and the grating 1230 to direct the reflected, chirp-reduced laser output from the grating 1230 to an output optical waveguide 1240.

Figure 13:
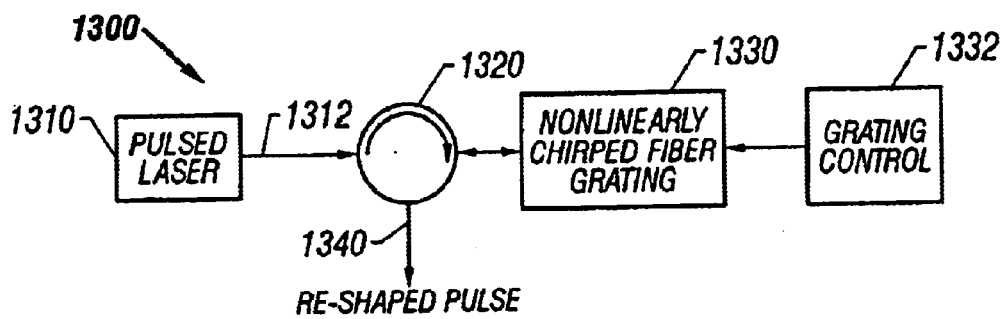
FIG. 13 is a diagram showing a pulse shaping system based on a nonlinearly chirped grating.

FIG. 13 further shows a block diagram of a system 1300 for pulse shaping. A nonlinearly chirped grating 1330 can produce a variable dispersion to an input pulse 1312 from a laser 1310 so that the output 1340 from the grating 1330 coupled to a grating control unit 1332 has a desired pulse shape. An optical circulator 1320 is optically coupled between the laser 1310 and the grating 1330 to route and separate the original laser output pulse 1312 and the reshaped output pulse 1340.

The above described nonlinearly-chirped fiber gratings are configured so that the wavelength of a reflected spectral component, $\lambda(x)=2n_{eff}(x)\Lambda(x)$, is a nonlinear and monotonic function of x. Because the length of the fiber grating is limited, the chirping range of the grating spacings in practical devices is also limited. This results in a reflection spectrum of such fiber gratings with a limited bandwidth as illustrated in FIG. 3A. Such fiber gratings may not be able to compensate for dispersion at two different wavelengths when the difference between the two wavelengths is comparable to or greater than the reflection bandwidth.

A WDM signal in a WDM fiber system has signals at different wavelengths (WDM channels) which propagate in the same fiber. These different wavelengths in the WDM signal can experience different amounts of dispersion when transmitted through a dispersive fiber link from one location to another. Such signals usually have a wavelength difference of about 0.6 nm or greater (e.g., ITU uses 0.8 nm and its multiples at 1.6 nm, 3.2 nm, and so on for WDM systems). The shortest wavelength and the longest wavelength of a WDM signal may be too great for a single fiber grating to provide proper dispersion compensation to both at the same time. For example, the nonlinearly-chirped fiber grating shown in FIG. 6B at a given bias voltage could not reflect two signals of 1551 nm and 1552 nm at the same time. Two such gratings, one with a control voltage of about 0V on the piezo stretcher and one with a control voltage of about 500V on the piezo stretcher, however, can be used together to separately provide dispersion compensation to these two signals. In the embodiments that follow, multiple nonlinearly-chirped fiber gratings may be combined to respectively compensate for dispersions of signals at different wavelengths (WDM channels) in a WDM signal.

FIGS. 14A and 14B schematically show two implementations 1400A and 1400B of using multiple nonlinearly-chirped fiber gratings 1410, 1420, and 1430 in a WDM system 1402. Each fiber grating 1410, 1420, 1430, respectively has a designated grating controller 1412, 1422, 1432 as a tuning mechanism. A grating controller may be a fiber stretcher (e.g., a piezo element and a voltage supply) or an other tuning device. Similar to the one in FIGS. 10A and 10B, a dispersion detection device may be deployed in each system to indicate dispersion information of an input WDM signal 1404 so that each grating controller can respond accordingly to provide a desired compensation in a respective fiber grating. Alternatively, when the dispersion at different wavelengths in a WDM signal is known at a given node in the WDM system 1402, the dispersion detection device may be eliminated and each fiber grating can be pre-configured to produce the desired compensation at a respective wavelength.

In FIG. 14A, multiple nonlinearly-chirped fiber gratings 1410, 1420, and 1430 are connected in series. Each provides a different compensation at a different wavelength in an input WDM signal 1404. For example, the fiber grating 1410 can be configured to compensate for dispersion within a limited spectral range around a selected wavelength $\lambda_1$. Due to the large separations of the multiplexed signals in wavelength, signals at other wavelengths such as $\lambda_2$ and $\lambda_3$ do not satisfy Bragg conditions in the fiber grating 1410 and hence transmit through the fiber grating 1410. These transmitted signals may then be reflected by other fiber gratings in the series, e.g., 1420 and 1430, to provide proper dispersion compensation. The compensated signals are then reflected back to the input of the first fiber grating 1410 and then routed by an optical circulator 1408 to generate a dispersion-compensated reshaped WDM signal 1406.

FIG. 14B uses multiple fiber gratings 1410, 1420, and 1430 in a parallel configuration. A demultiplexer unit 1440 is used to receive and separate the input WDM signal 1404 into multiple signals of different wavelengths. Each separate signal is then reflected back to the demultiplexer unit 1440 by a corresponding fiber grating in a way that compensates for the dispersion at that wavelength. The demultiplexer unit 1440 then recombines the reflected signals at different wavelengths into a dispersion-compensated WDM signal 1406 that is output by the circulator 1408.

Simultaneous compensation for dispersion at different wavelengths of a WDM system may also be achieved by using a special sampled nonlinearly-chirped fiber grating or another fiber grating with nonlinear group delays. Such a sampled fiber grating can replace the multiple fiber gratings and their associated grating controllers in FIGS. 14A and 14B.

Figure 15:
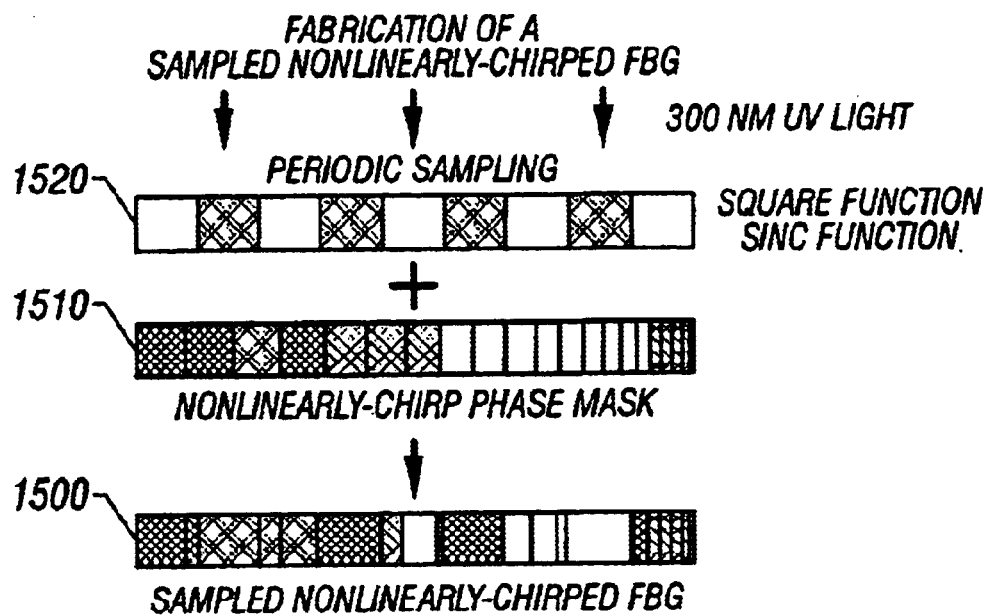
FIG. 15 illustrates the fabrication and structure of a sampled nonlinearly-chirped fiber grating according to one embodiment of the disclosure.

FIG. 15 illustrates the fabrication and structure of such a special sampled fiber grating 1500 based on a nonlinearly-chirped fiber grating according to one embodiment. The fiber grating 1500 has a nonlinearly-chirped, monotonic-valued grating period $\Lambda(x)$. As described above, this nonlinearly-chirped grating may be formed, according to one implementation, by producing a modulation on the refractive index $n(x)$ of the fiber in a nonlinearly chirped manner along the fiber. When $n(x)$ is modulated in a sinusoidal manner with a constant amplitude, the effective index of refraction $n_{eff}(x)$ is a constant along the fiber. In addition, the refractive index $n(x)$ is also modulated by a second index modulation that has a modulation period greater than the nonlinearly-chirped modulation. Hence, the reflective Bragg wavelength, $\lambda(x)$, is no longer a monotonic-valued and nonlinearly-chirped function of x but rather is a nonlinearly-chirped periodic function of x. Two or more reflection spectral windows centered at different wavelengths can be produced by the two different modulations of the index $n(x)$. Hence, a single fiber grating of this kind can function as two or more fiber gratings each having only one Bragg reflection window.

This special fiber grating 1500 may be formed by the fabrication process illustrated in FIG. 15. A nonlinearly-chirped phase mask 1510 is used to form the nonlinearly chirped index modulation which has a nonlinearly-chirped period $\Lambda_{NC}(x)$. In addition, a periodical amplitude mask 1520 is used to sample the UV light during exposure and thus cause the second index modulation of the index $n(x)$ with a period of $\Lambda_C$. The two masks 1510 and 1520 are fixed to the fiber 1500 during fabrication. An UV light source and the fiber then are moved relative to each other to expose the core of the fiber 1500 one section at a time.

The above process in effect produces two different gratings in the fiber 1500: a nonlinearly-chirped grating $\Lambda_{NC}(x)$ defined by the phase mask 1510 and a periodic grating $\Lambda_C$ defined by the amplitude mask 1520. The coupling of the two gratings forms multiple Bragg reflection windows or bands at different wavelengths. The number of bands and the band spacing are determined by the periodic modulation of the amplitude mask 1520. The bandwidth of each band is identical and is determined by the chirping range of the grating $\Lambda_{NC}(x)$ defined by the phase mask 1510. To distinguish from the nonlinearly-chirped grating shown in FIG. 1, this special fiber grating will be referred to as "sampled nonlinearly-chirped fiber grating".

The second periodic modulation of $n(x)$ has a spatial period $\Lambda_C$ greater than the grating period $\Lambda_{NC}(x)$. For example, $\Lambda_C$ may be in a range from about 0.1 mm to about 2 mm, or more preferably from about 0.2 mm to about 1 mm, while the average $\Lambda_{NC}(x)$ is about 0.5 $\mu$m for fiber systems near 1550 nm. FIGS. 16A through 16F illustrate the multiple reflection spectral windows generated by the second periodic modulation on the refractive index $n(x)$. The reflected Bragg wavelength $\lambda(x)$ is associated with the optical wavevectors that satisfy the Bragg phase-matching conditions by Fourier transforms of $n(x)$, where $n(x)$ is a function of the position x along the optic axis of the fiber, the nonlinearly-chirped period $\Lambda_{NC}(x)$, and the constant period $\Lambda_C$. FIGS. 16A, 16C, and 16E show the spatial variations of the actual refractive index along the fiber, $n(x)$, and FIGS. 16B, 16D, and 16F show respective reflection spectra satisfying the Bragg conditions.

FIG. 16A shows a case where the index $n(x)$ is only modulated by a sinusoidal modulation with a constant period. The Fourier transform of the sinusoidal function $n(x)$ is a single value in the wavevector space, i.e., only one wavevector matches the Bragg condition and gets reflected (FIG. 16B). When the period of the sinusoidal modulation is linearly or nonlinearly chirped, multiple wavevectors of a limited range in the wavevector space can be reflected at different locations along the grating. Hence, the single peak in FIG. 16B becomes a reflection spectral window as shown in FIG. 3A.

FIG. 16C represents a case where $n(x)$ is modulated by a fast sinusoidal modulation and a slow spatial square wave function with a constant period. FIG. 16D shows multiple reflection bands that are produced by the slow modulation of the index $n(x)$. These bands have different strengths due to the square-wave modulation. The reflectivity of the band at the center wavelength is the highest and reflectivities of other bands are reduced by a factor determined by a sinc-function. When the slow modulation of $n(x)$ is formed of repetitive patterns of a portion of a spatial sinc function, i.e., the amplitude of the slow index modulation is highest at the center of a selected fiber segment and decays towards both ends of the segment according to (sin x/x), the multiple bands of substantially identical reflectivities can be generated.

FIG. 16E shows one repetitive pattern of a slow modulation of $n(x)$. Each repetitive pattern includes first five lobes of a sinc function. FIG. 16F represents 6 bands produced by the slow modulation by n(x) in the frequency domain. The latter is preferred in WDM applications in order to substantially reduce or minimize signal distortion by the fiber grating. Sinc-sampled fiber gratings are disclosed by Ibsen et al. in "Sinc-sampled fiber Bragg gratings for identical multiple wavelength operation," IEEE Photonics Technology Letters, Vol. 10, No. 6, p. 842–844 (1998).

Figure 17:
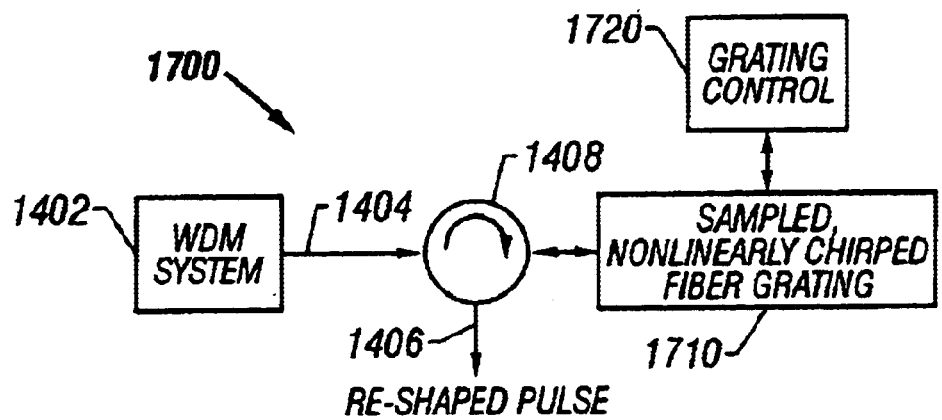
FIG. 17 schematically shows one embodiment of a tunable multi-channel dispersion compensator for a WDM system by using a single sampled nonlinearly-chirped fiber grating.

FIG. 17 shows one embodiment 1700 of a tunable multichannel dispersion compensator for a WDM system 1402 by using a single sampled nonlinearly-chirped fiber grating 1710. A grating controller 1720 provides a tuning mechanism for the grating 1710 to adjust the dispersions at different wavelengths. A dispersion detection device may be incorporated to measure the actual dispersion in the dispersive WDM signal 1404 and to provide a control signal to the grating controller 1720.

This configuration of using a single fiber grating 1710 provides a number of advantages over a multi-grating configuration shown in FIGS. 14A and 14B. For example, such a single-grating compensator is relatively easy to fabricate and package at a lower cost because only a single fiber grating and a single fiber control are needed. Since the temperature of each grating can affect the grating length and hence the dispersion caused by the grating, the temperature of each grating may need to be stabilized and controlled at a desired constant temperature. The single-grating configuration reduces complexity of such temperature stabilization. The single-fiber configuration also has less insertion loss than that of the multi-grating configuration. Furthermore, in the single-grating configuration, the desired channel spacing can be more easily and precisely set by the manufacturing process and the reflectivities of different channels can be made substantially the same.

The sampled nonlinearly-chirped fiber Bragg grating 1710 can be fabricated as shown in FIG. 15 by using a sampling slit to effectuate the periodic modulation onto the fiber's refractive index. This sampling slit produces a square-wave modulation similar to FIG. 16C with a period of 200 μm. A 300-nm light source can be used to avoid damage to the fiber's core-cladding interface. The fiber grating 1710 may be 30 cm in length and sampled by the sample slit to produce 3 principal channels separated by 4 nm. The channel separation is determined by the sampling period:

$$\Delta\lambda = \frac{\lambda_B^2}{2n_{eff} \cdot \Lambda_c}, \quad (5)$$

where $\Delta\lambda$ is the spacing between the centers of adjacent channels, $\lambda_B$ is the Bragg wavelength of the original grating without sampling, $n_{eff}$ is the effective refractive index in the grating, and $\Lambda_C$ is the sampling period of the slow modulation. By increasing the sampling period L from 200 μm to about 1 mm, the ITU standard channel spacing of 0.8 nm can be obtained.

FIGS. 17A and 17B show measured shifts of the reflected spectrum and the grating-induced time delay curves, respectively, for the above three-channel sampled nonlinearly-chirped fiber grating under different stretching conditions. All channels exhibit nearly identical optical and time-delay characteristics. The reflectivity difference among the three channels is less than 2 dB and can be reduced by using a sinc-shape modulation of the sampled grating. Within one wavelength reflection band, the dispersion changes smoothly from −200 ps/nm to −1200 ps/nm for different wavelengths. By uniformly stretching the grating, the dispersion varies nonlinearly and smoothly from about −200 ps/nm to about −1200 ps/nm for a fixed wavelength within each band. As the grating is tuned, the amplitudes and shapes of both the reflected spectrum and induced delay curve remain relatively constant for all three channels, allowing for robust operation. The grating ripple is generally less than about 40 ps.

FIG. 17C shows the deviation of the nonlinear time delay from a linear time delay, and the maximum deviation is approximately 600 ps. FIG. 17D shows the grating-induced dispersion of the three different bands as a function of wavelength.

Figure 18:
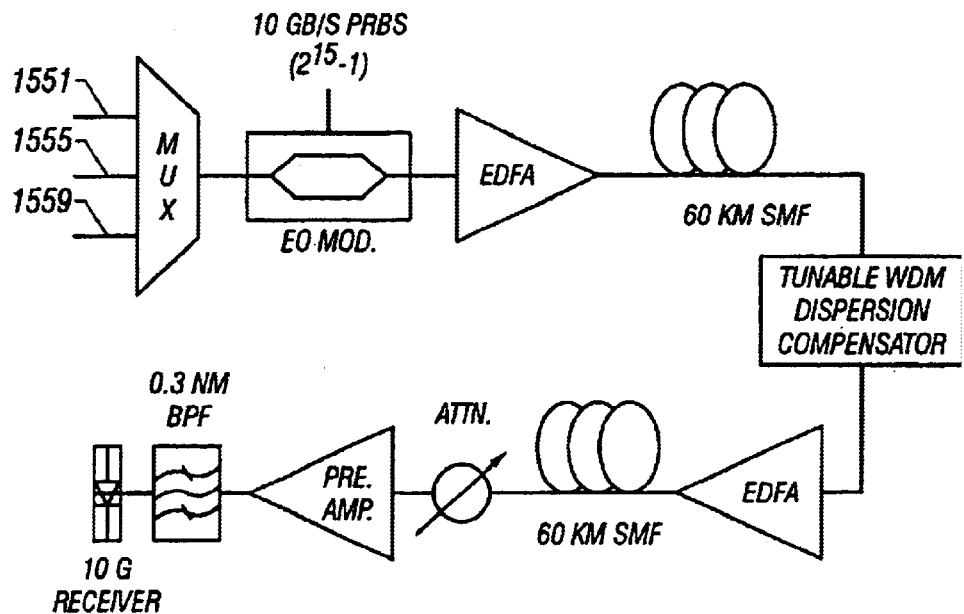
FIG. 18 schematically shows a test apparatus for experimentally simulating tunable dispersion compensation in a WDM system, where three WDM channels at 1551 nm, 1555 nm, and 1559 nm are externally modulated at 10-Gb/s with a pseudorandom bit stream (PRBS) $2^{15}-1$.

FIG. 18 shows a test apparatus for-experimentally simulating tunable dispersion compensation in a WDM system. Three WDM channels at 1551 nm, 1555 nm, and 1559 nm are externally modulated at 10-Gb/s with a pseudorandom bit stream (PRBS) $2^{15}-1$. Two different amounts of fiber dispersion are introduced in the signals by transmitting the data over distances of 60 km and 120 km in a single-mode fiber segment, respectively. A small amount of pre-chirping is applied to the signal at an electro-optic modulator in order to increase the maximum usable transmission distance to 120 km with a single-mode fiber segment. The above 3-band sampled nonlinearly-chirped fiber grating is placed at the end of the fiber link for the data approximately after 60 km and is placed at the mid-point of the link for the data approximately after 120 km.

Figure 18A:
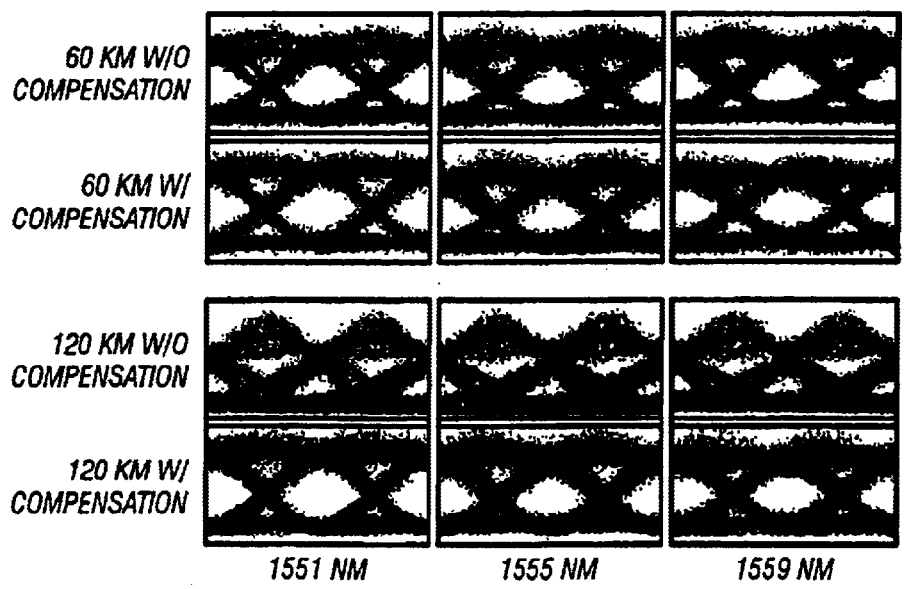
FIG. 18A are eye diagrams at −20 dBm channel input power for the three WDM channels with and without the compensating grating at different distances in the test apparatus of FIG. 18.

FIG. 18A shows the eye diagrams at about −20 dBm channel input power for the three WDM channels with and without the compensating grating at different distances. After transmission over a fiber segment by 60 km, the eye diagrams for the 3 channels are fairly open without compensation, and the grating was tuned to provide a relatively small amount of dispersion compensation. The eye diagrams of the 3 channels after about 120 km of propagation are fairly closed without compensation, and the grating was stretched to shift the resonance bands by about 2 nm to provide sufficient dispersion and open the eye diagrams.

Figure 18B:
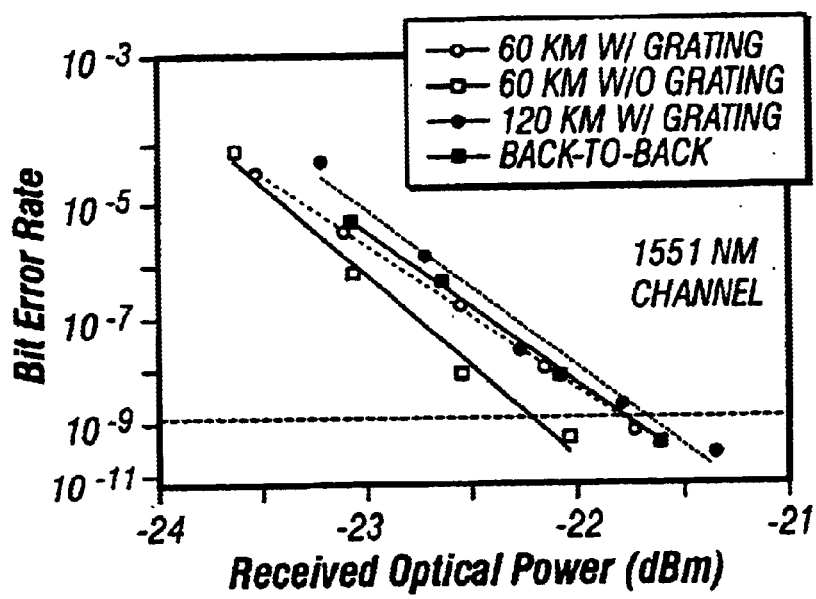
FIG. 18B shows measured bit-error-rate (BER) curves for the 1551-nm channel with and without the sampled compensating grating at the two different distances in the test apparatus of FIG. 18.

FIG. 18B shows the bit-error-rate (BER) curves for the 1551-nm channel with and without the sampled compensating grating at the two different distances. Due to the initial chirp of the WDM signal, the sensitivity at 60 km without compensation is slightly better than the back-to-back measurement. Comparing the BER curves with and without the grating after 60 km, the power penalty induced by the grating is ~0.5 dB. After 120 km, the power penalty of the sampled grating compensator is less than 0.5 dB after 120 km, compared with back-to-back BER curve. Without compensation by the fiber grating, the bit error rate was much larger than $10^{-9}$ after transmission over 120 km. The BER curves for the other two channels show similar results at both transmission distances.

A sampled fiber grating with nonlinear group delays may be configured in a way so that the frequency spacing between two adjacent bands in the reflected spectrum of the grating is different from the channel spacing in a WDM signal. Since spectral components of different wavelengths in a band experience different dispersion compensations (FIGS. 17B and 17D), the dispersions of two different signals in two different bands at different relative locations with respect to the centers of bands are different. This feature of the above sampled fiber grating can be used to provide different dispersion compensations to different channels in a WDM signal. For example, dispersion of optical fiber can vary significantly over the gain bandwidth of an Er-doped fiber amplifier (EDFA). In conventional fibers, the dispersion slope, (dD/dλ), of the dispersion (D) with respect to the wavelength (λ) is about 0.08 ps/nm². This wavelength dependence of chromatic dispersion presents special problems in long-haul WDM systems because signals of different wavelengths may undergo different dispersions. Therefore, it is desirable to provide different dispersion compensations to signals with different wavelengths.

Figure 19A:
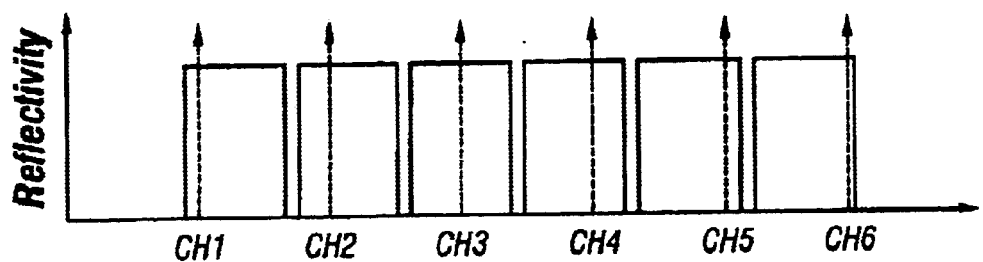
FIGS. 19A and 19B respectively show reflectivity and dispersion spectra of a tunable sampled nonlinearly-chirped fiber grating having a spacing between adjacent Bragg reflection windows that is different from the channel spacing in a WDM system.
Figure 19B:
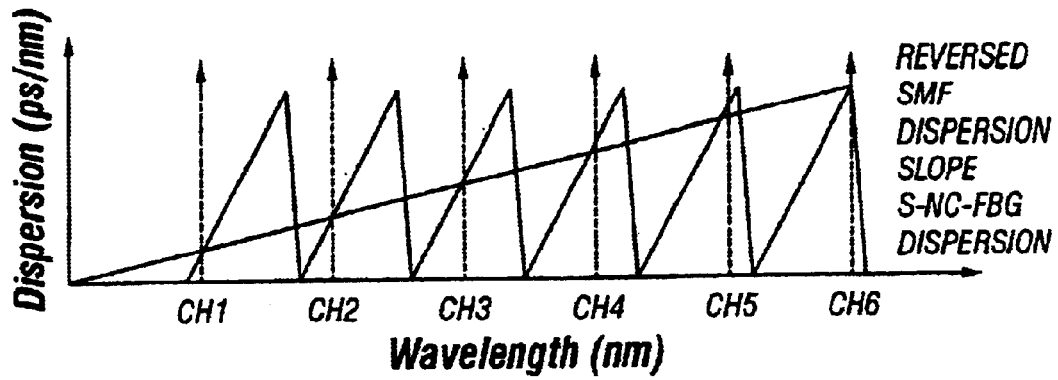

FIGS. 19A and 19B illustrate the operation of a single sampled nonlinearly-chirped fiber grating for producing a tunable dispersion slope compensation. FIG. 19A shows that the band spacing of the fiber grating is less than the channel spacing so that each channel of the WDM signal is then located at a different position in each reflected band of the fiber grating relative to the center of each band. FIG. 19B shows a different dispersion compensation is so generated for a different channel in an example where the dispersion compensation increases with wavelength.

In addition to dispersion compensation, the above sampled fiber grating may, nonlinearly-chirped or otherwise, may be used for chirp cancellation in directly modulated multi-wavelength semiconductor laser and simultaneous tunable compression of multi-channel ultra short pulses. Device implementations for such applications are similar to FIGS. 12 and 13 except that the laser source 1210 or 1310 is replaced by a source that produces a laser signal of multiple wavelengths.

A fiber grating with nonlinear group delays, such as the nonlinearly-chirped fiber, may also be modified to compensate for polarization mode dispersion (PMD) in fibers. Many fibers are known to exhibit some birefringence caused by factors such as imperfect circular core or unbalanced stress of the fiber. Optical fiber can accommodate two different states of polarization of light in a fiber. Since the effective indices of refraction of the two polarization states are not the same, the transmission speeds of the two polarization states are different. This polarization mode dispersion is undesirable and can distort the signal.

PMD can be compensated by delaying one polarization state with respect to the other by a proper amount to cancel the delay between the two polarization states in the fiber link. Since the amount of PMD at any given location in a fiber network often changes due to environmental disturbances such as vibrations and fluctuations in temperature, it is highly desirable to have a tunable PMD compensator that can dynamically adjust the relative delay between two states of polarization in a signal. Such polarization-dependent dispersion compensation can be achieved by introducing birefringence in the above fiber gratings.

One embodiment of a nonlinearly-chirped fiber grating for PMD compensation is formed by writing nonlinearly-chirped grating into a high-birefringence photosensitive fiber. The difference in the indices of refraction for the two principal polarization axes may be on the order of $10^{-4}$ or greater (e.g., $5\times 10^{-4}$) at or near 1550 nm. The high-birefringence fiber provides different time delays for different states of polarization. The nonlinear chirp allows tuning of relative delays of different spectral components in each state of polarization and a frequency shift in the reflective spectral band.

Figure 20A:
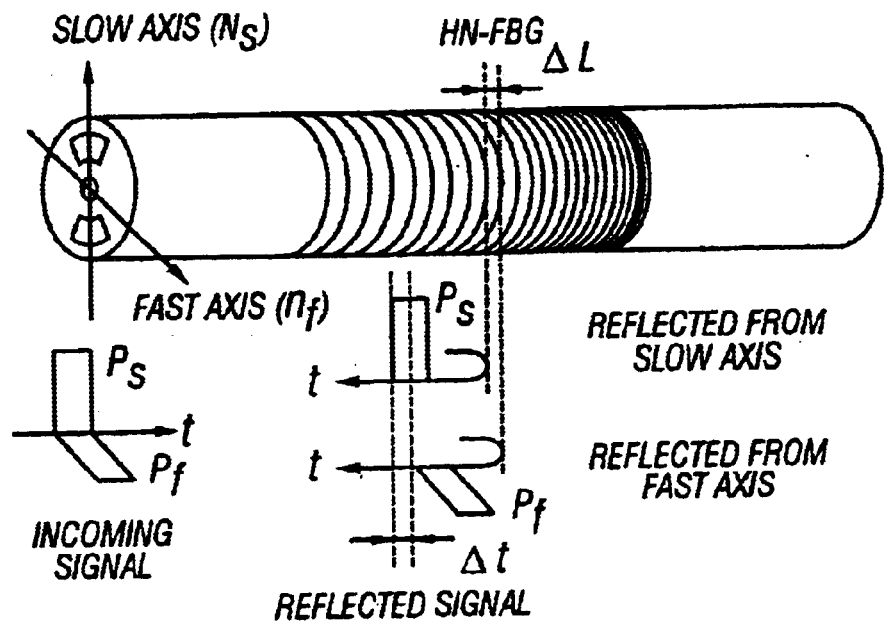
FIG. 20A is a diagram showing a birefringent nonlinearly-chirped fiber Bragg grating formed in a high-birefringence optical fiber for compensating polarization mode dispersion (PMD).
Figure 20B:
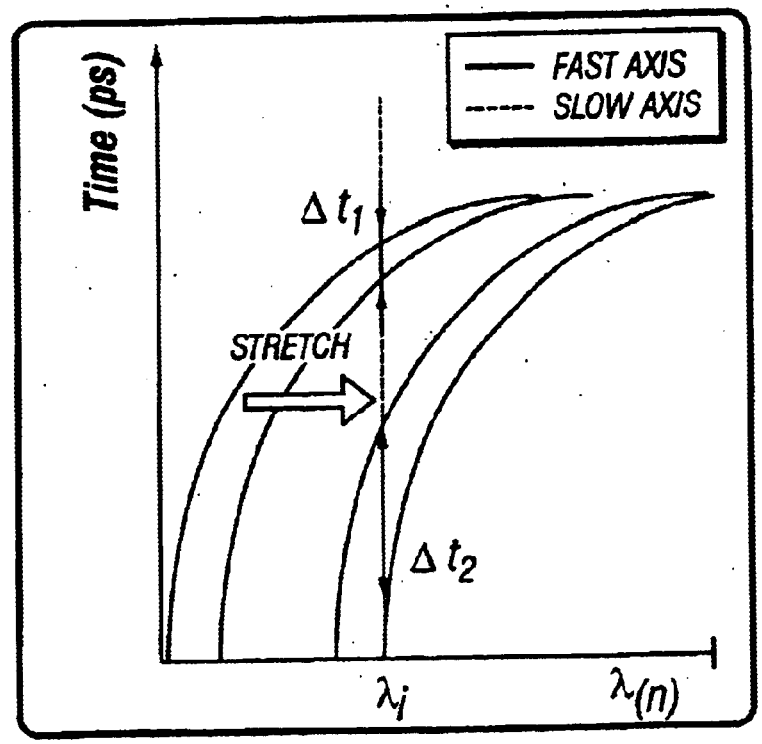
FIG. 20B shows time delays of two orthogonal states of polarization as a function of wavelength from the birefringent nonlinearly-chirped fiber Bragg grating of FIG. 20A.

FIG. 20A illustrates a birefringent nonlinearly-chirped fiber Bragg grating formed in a high-birefringence optical fiber. The high-birefringence optical fiber may be formed of a polarization-maintaining fiber. This allows a large difference in refractive indices between fast and slow polarization axes. The reflection position from the nonlinearly-chirped grating is different for each polarization of an input optical signal at one fixed wavelength within the grating bandwidth. This difference in reflection positions, ΔL, causes a differential time delay (Δt) between the two polarization states (FIG. 20B). The differential time delay is dependent of the wavelengths of different spectral components within the grating bandwidth due to the nonlinear chirping of the grating period. This combination of the birefringence of the fiber and the nonlinear chirping of the grating provides a tuning mechanism for adjusting the relative delays between two polarization states by mechanical stretching of the grating. Optical signals having two different polarization states can be combined at the output of the grating without interference because of their orthogonal polarization states. In an actual implementation, a fiber stretcher may be used to control the length of the birefringent nonlinearly-chirped fiber grating. A dispersion detection module is used to monitor the PMD and to control the fiber grating accordingly in order to produce the proper dispersion compensation.

An exemplary nonlinearly-chirped grating may be written on a photosensitive highly birefringent fiber through a nonlinearly-chirped phase mask using near-UV light at about 300 nm. The grating may be 15 cm long and nonlinearly chirped from 1547.2 nm to 1550.5 nm for two polarization directions. At a given location in the fiber grating, the reflected signals of the orthogonal polarization directions have two different wavelengths that are separated by Δλ:

$$\Delta\lambda = \frac{n_s - n_f}{n - n_{cl}}\lambda_g, \tag{6}$$

where $n_s$, $n_f$, $n$, $n_{cl}$, and $\lambda_g$ respectively represent slow axis, fast axis, core, cladding refractive indices and average of the fast and slow polarization resonant wavelengths.

Figure 21A:
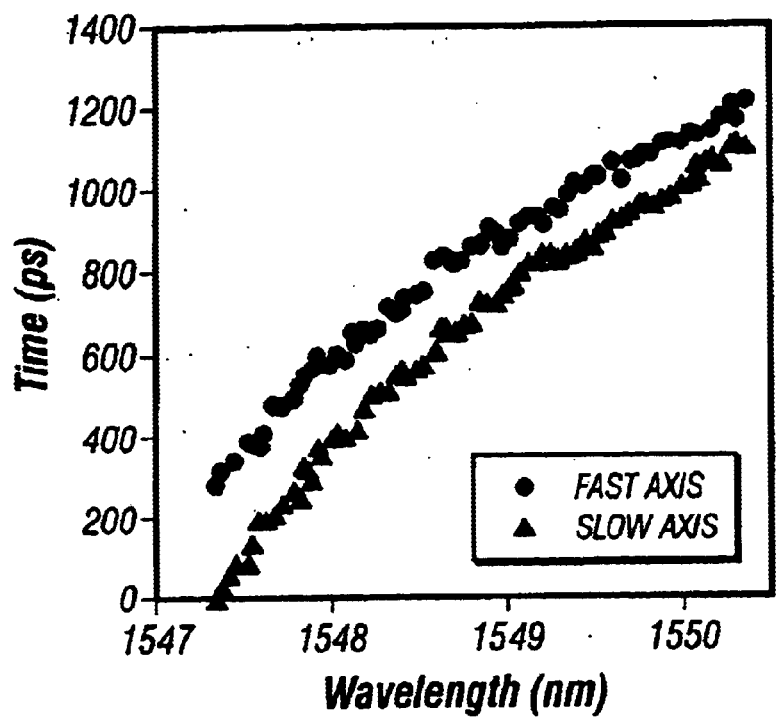
FIGS. 21A and 21B show measured time delay curves of the reflected signals as a function of wavelength and the respective nonlinear dependence of the differential time delay on the wavelength for each polarization direction from a birefringent nonlinearly-chirped fiber grating with Δλ of around 0.6 nm at 1550 nm.
Figure 21B:
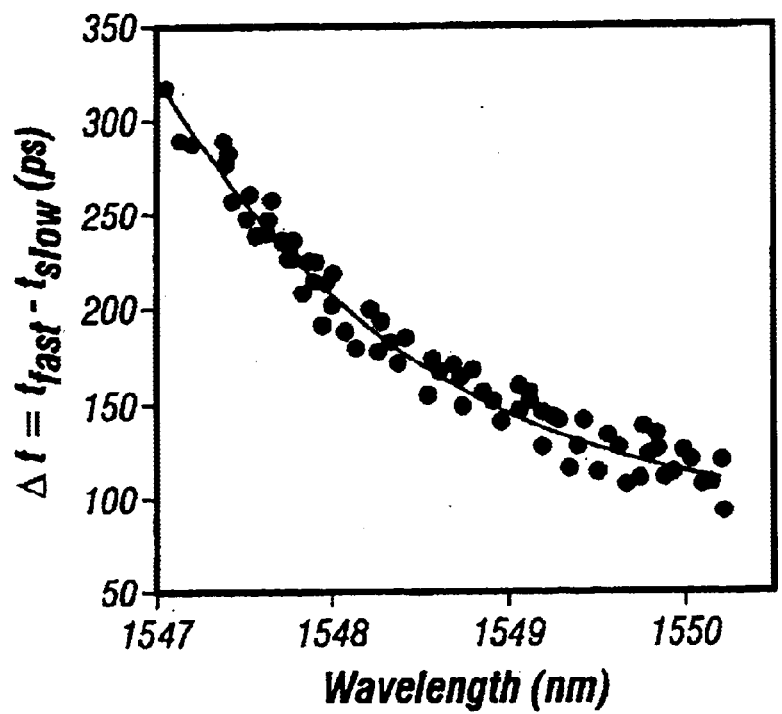

FIG. 21A shows measured time delay curves of the reflected signals as a function of wavelength for each polarization direction from a birefringent nonlinearly-chirped fiber grating with Δλ of around 0.6 nm at 1550 nm. Note that almost identically-chirped gratings are written for both polarization directions. FIG. 21B shows the respective nonlinear dependence of the differential time delay on the wavelength. The time delay Δt changes from 320 ps to 100 ps when wavelength changes from 1547.03 nm to 1550.34 nm. The solid line provides the expected time delay between the two polarization states, obtained by fitting the experimental data.

Figure 22A:
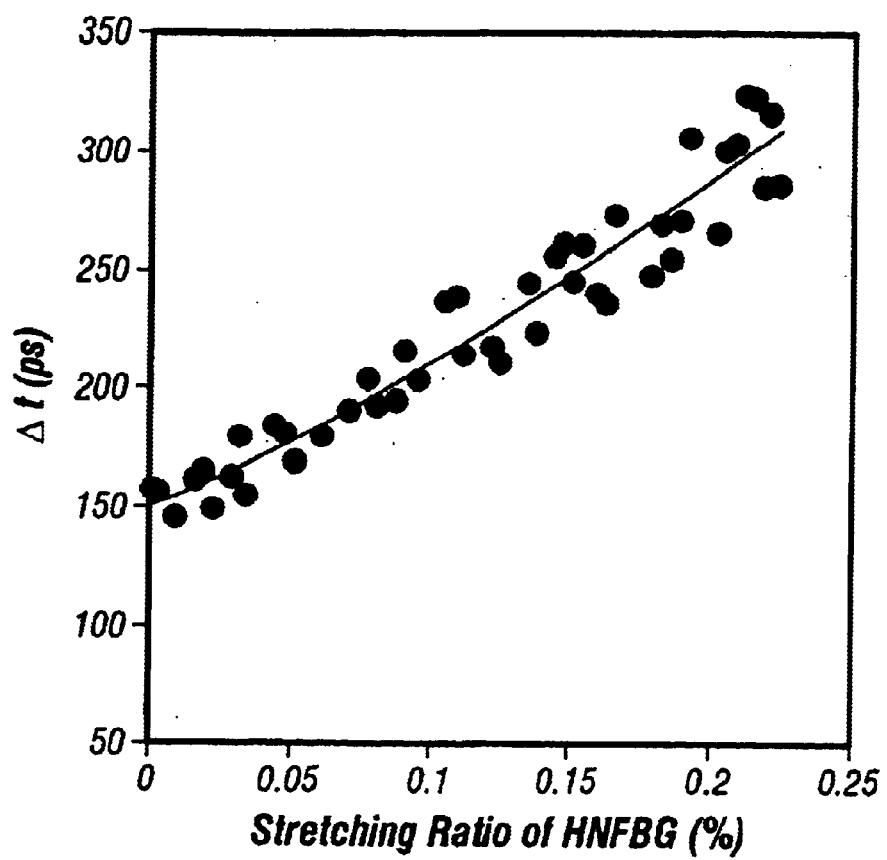
FIG. 22A shows the measured time delay as a function of the relative amount of stretching of the fiber grating characterized in FIGS. 21A and 21B.
Figure 22B:
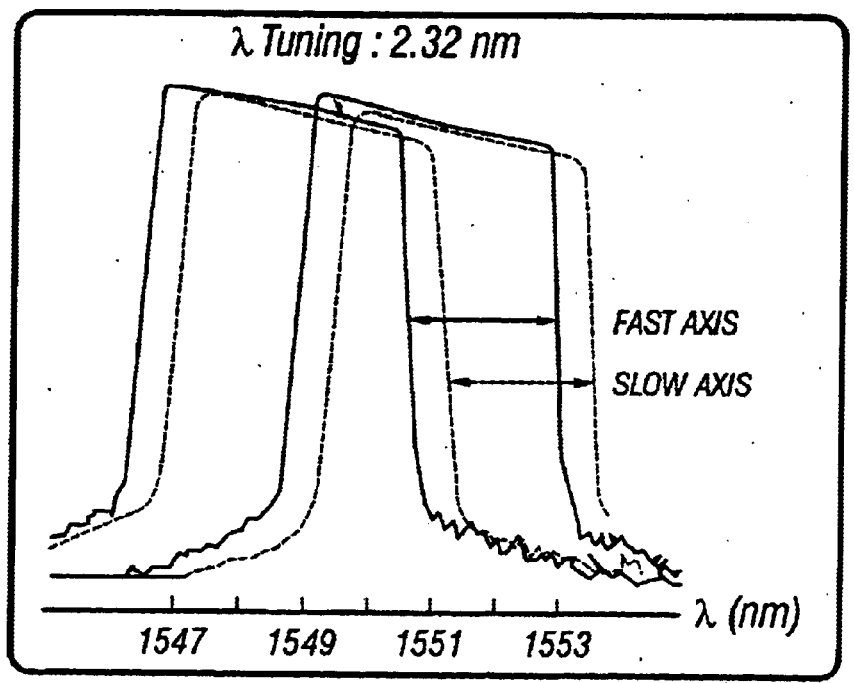
FIG. 22B shows that the shape of reflection spectrum for each polarization direction in remains substantially the same over a wavelength tuning of about 2.32 nm by stretching in the birefringent nonlinearly-chirped fiber grating with Δλ of around 0.6 nm at 1550 nm.

FIG. 22A shows measured time delay as a function of the relative amount of stretching of the same fiber grating. The measurements were performed by mounting the birefringence fiber grating on a translational stage. The time delay Δt of the two polarizations for a signal at 1549.33 nm changes due to stretching of the fiber grating. A tuning Δt of approximately 170 ps is achieved by 0.22% stretching of the grating at 1549.33 nm. FIG. 22B shows that the shape of reflection spectrum for each polarization direction does not change significantly over a wavelength tuning of about 2.32 nm by stretching.

Stretching of the fiber grating provides tunable compensation of PMD on long distance, high-speed optical data transmission. This is because Δt is tunable and the polarization does not change. To demonstrate this application, a DBR laser at 1550.2 nm is externally modulated at 10 Gb/s PRBS in a non-return-to-zero data format using a 16 GHz electro-optic intensity modulator. Delays of about 127 ps and 302 ps are respectively introduced between the two orthogonal polarizations of the signal to simulate the effect of PMD by using a PMD emulator. The PMD emulator includes two polarization beam splitters, optical delay and mechanical attenuator. The power ratio into one of the paths is adjusted to be the same for each path to simulate the worst condition of PMD. A polarization controller is used before the birefringent nonlinearly-chirped fiber grating to align the polarization directions to the grating.

Figure 23A:
FIGS. 23A, 23B, and 23C show the base-line eye diagram, the eye diagrams for the 127-ps PMD emulation with and without dispersion compensation, the eye diagrams for the 302-ps PMD emulation without and with compensation that are measured from a PMD emulation apparatus by using a birefringent nonlinearly-chirped fiber grating.
Figure 23B:
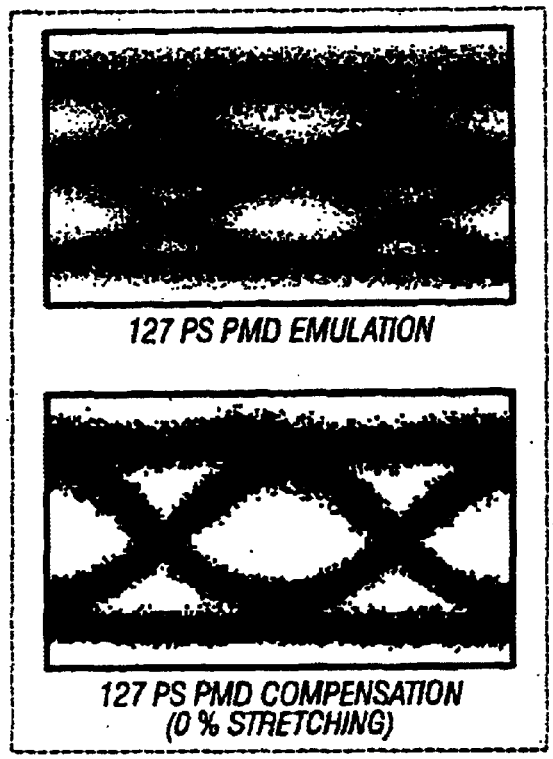

FIG. 23A shows the base-line eye diagram of the signal at the output of the intensity modulator. FIG. 23B shows the eye diagrams for the 127-ps PMD emulation with and without dispersion compensation being performed by the grating. The emulated eye is completely closed because emulation is larger than one bit period. The three-level eye comes from the fact that optical delay from the PMD emulator is almost multiple times of the bit time.

Figure 23C:
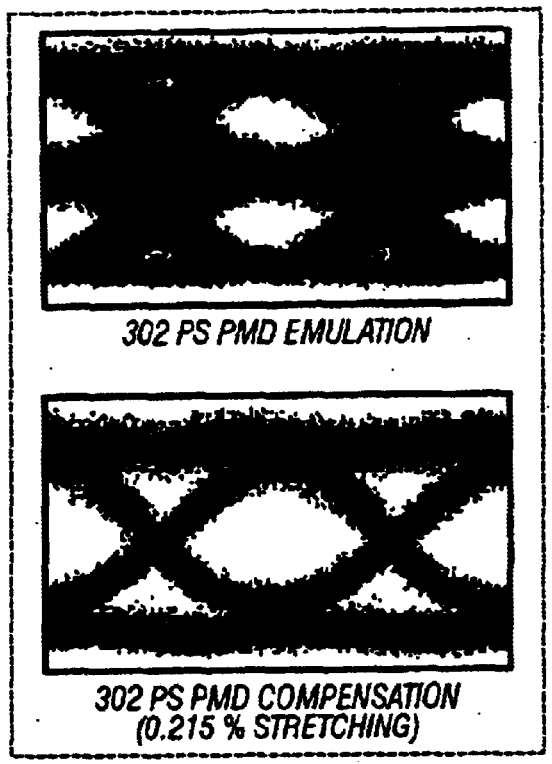

FIG. 23C shows the eye diagrams for the 302-ps PMD emulation without and with compensation of HN-FBG with tuning by 0.215% stretching. The eye is completely recovered after compensation, and bit-error-rate measurements confirm error free operation for both compensated cases.

It is also contemplated that, a sampled fiber grating may be formed in a highly birefringent fiber to combine the multiple bands of the fiber grating in FIG. 15 and the PMD compensation of the fiber grating in FIG. 20A. This hybrid fiber grating can compensate the PMD in a WDM signal and wavelength-dependent PMD in a tunable configuration. In addition, while fiber stretchers are described in the above, it should be understood that a fiber compressor or a device that changes any other characteristics of the fiber, could alternatively be used.

Referring back to Eq. (3), the third and higher order dispersion terms provide tunable dispersion slope for the reflected signals. The third-order nonlinear dispersion $D^{(3)}(\lambda_0)$ provides a constant dispersion slope for all different spectral components, the fourth-order nonlinear dispersion $D^{(4)}(\lambda_0)$ (or other high order nonlinear dispersion) provides a varying dispersion slope that changes with wavelength. The following describes techniques that use one or more such nonlinear dispersion effects to produce both tunable dispersion and tunable dispersion slope in a reflected optical signal by the grating, including WDM channels at multiple different WDM wavelengths.

Referring back to FIG. 1, the spatial grating pattern in the wave-guiding element 104 may be designed to exhibit at least the fourth-order nonlinear dispersion $D^{(4)}(\lambda_0)$ to produce a tunable dispersion slope that has different values at different wavelengths. Under this condition, the grating control 120 can be used to tune the grating 100 to adjust the dispersions at different wavelengths by different amounts and the dispersion slopes at different wavelengths by different amounts. The wave-guiding element 104 may be formed of a birefringent material with two orthogonal principal polarizations substantially perpendicular to the optic axis of the wave-guiding element 104 so that the polarization-dependent dispersion and the corresponding dispersion slope can both be tuned.

A grating with the fourth-order nonlinear dispersion $D^{(4)}(\lambda_0)$, such as a nonlinearly-chirped fiber grating, may be sampled to produce multiple Bragg reflection bands at multiple center wavelengths. In essence, a spatial sampling pattern is also formed in the fiber to overlap with the underlying nonlinearly-chirped grating structure. The sampling pattern has a sampling period greater than the varying grating period $\Lambda(z)$ and may also be spatially chirped. The coupling of the nonlinearly-chirped grating and the sampling pattern produces multiple Bragg reflection windows or bands at different wavelengths. The number of bands and the band spacing are determined by the modulation of the spatial sampling pattern. The bandwidth of each band is determined by the chirping range of the grating parameter $n_{eff}(z)\Lambda(z)$.

Figure 24:
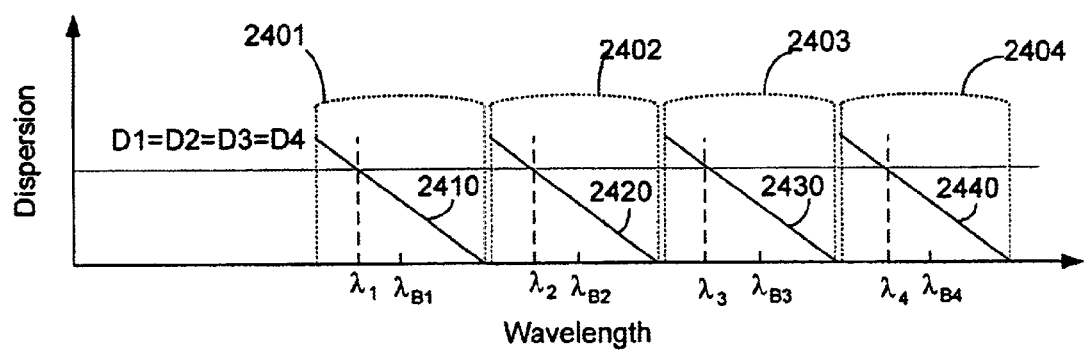
FIGS. 24 and 25 illustrate two different modes of operation in a sampled nonlinearly-chirped fiber grating.

FIG. 24 illustrates the dispersion of four adjacent Bragg reflection bands 2401, 2402, 2403, and 2404 produced by a sampled nonlinearly-chirped grating that are centered at wavelengths $\lambda_{B1}$, $\lambda_{B2}$, $\lambda_{B3}$, and $\lambda_{B4}$, respectively. Curves 2410, 2420, 2430, and 2440 are essentially identical and represent the dispersion curves of the Bragg reflection bands 2401, 2402, 2403, and 2404 according to Eq. (2). This sampled nonlinearly-chirped grating can be used to simultaneously control the dispersion at multiple WDM channels by placing different WDM channels into different Bragg reflection bands in the wavelength domain. As illustrated by the example in FIG. 24, four adjacent WDM channels $\lambda_1$, $\lambda_2$, $\lambda_3$, and $\lambda_4$ are respectively fit into the different Bragg reflection bands 2401, 2402, 2403, and 2404.

If each different WDM channel were located at the same relative spectral position from the center of the respective Bragg reflection band as with other WDM channels, then the dispersion produced at different channels would be the same (e.g., D1=D2=D3=D4) because the dispersion curves in different bands are essentially the same. When the grating is stretched or compressed or otherwise tuned by controlling the grating parameter $n_{eff}(z)\Lambda(z)$, although the dispersions of spectral components within each WDM channel are changed, the overall dispersions of different WDM channels are changed by approximately the same amount (e.g., D1'= D2'=D3'=D4'). This result may be undesirable in some applications because the dispersions of different WDM channels may be different and hence need to be compensated differently. In particular, different WDM channels, after transmission through some fiber systems, may accumulate different fiber dispersion slopes in additional to different dispersions.

A sampled nonlinearly-chirped fiber grating, when properly designed, can produce both tunable dispersion and tunable dispersion slope for different WDM channels. First, the fiber grating is designed to place different WDM channels at different spectral positions with respect to the respective centers of the different Bragg reflection bands. Secondly, the nonlinear chirp of the fiber grating is designed to produce the fourth-order dispersion $D^{(4)}(\lambda_0)$ or higher order nonlinear dispersion effects.

Figure 25:
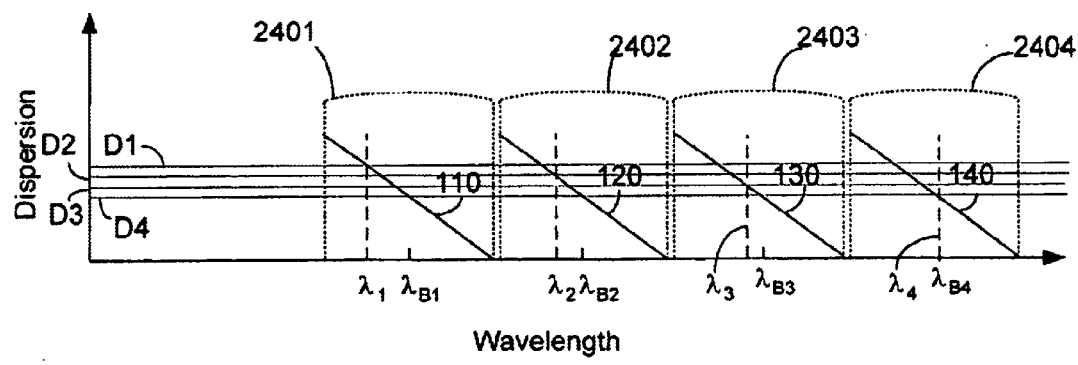

FIG. 25 shows an example of the first condition where 4 different WDM channels $\lambda_1$, $\lambda_2$, $\lambda_3$, and $\lambda_4$ are at four different positions relative to the respective band centers to produce different dispersions: D1≠D2≠D3≠D4. When the input WDM channels are evenly spaced in the wavelength domain, this condition can be achieved by using sampled nonlinearly-chirped grating with evenly-spaced Bragg reflection bands that has a band spacing $\Delta\lambda_{FBG}$ different from the channel spacing $\Delta\lambda_{Ch}$. Alternatively, the sampling pattern of the grating may be designed to produce Bragg reflection bands that are not uniformly spaced in the wavelength domain to have a varying band spacing that change from channel to channel.

Figure 26:
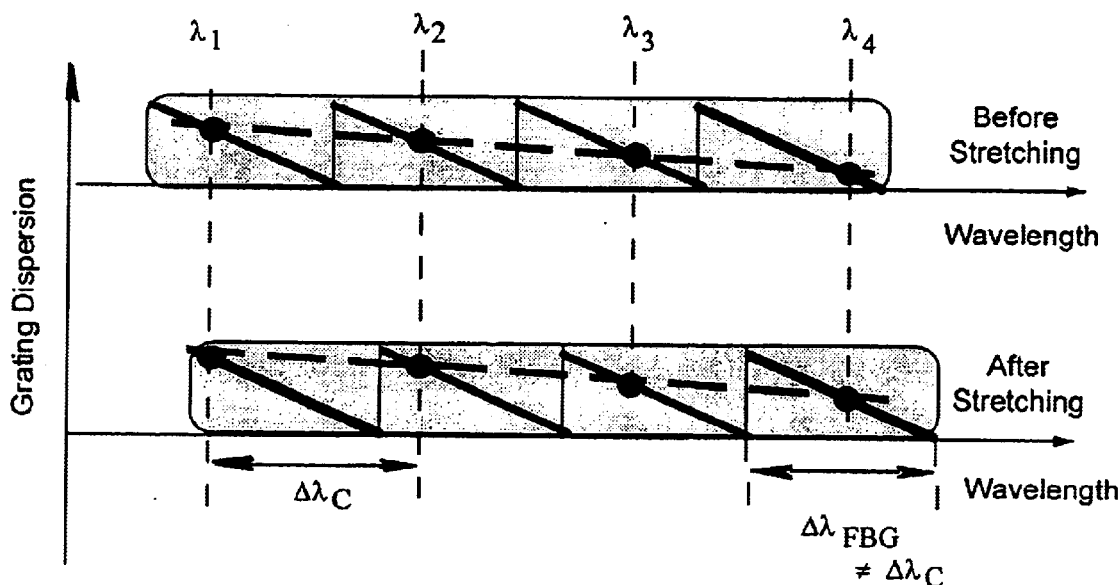
FIG. 26 illustrates dispersion slope compensation with a fixed dispersion slope but tunable amount of dispersion based on the second order nonlinear chirp effect.
Figure 27:
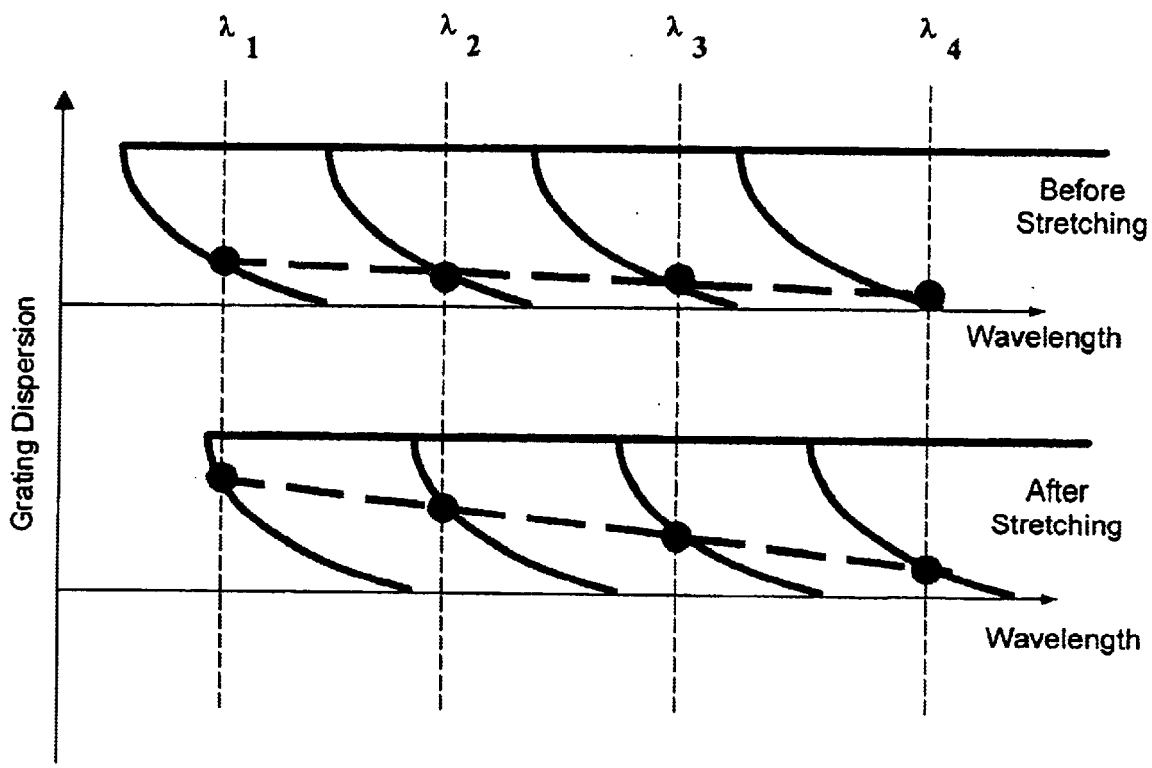
FIG. 27 illustrates tunable dispersion slope compensation based on the fourth or higher order nonlinear chirp effect.

The second condition is illustrated by FIGS. 26 and 27 where different nonlinearly-chirped dispersion terms in the above sampled fiber grating are shown to produce different effects on the tunability of dispersion.

The first nonlinear term, the third-order nonlinear dispersion $D^{(3)}(\lambda_0)$ represents a constant dispersion slope for all wavelengths. When the nonlinear chirp of the fiber grating is specifically designed to primarily exhibit the $D^{(3)}(\lambda_0)$ effect and the higher nonlinear dispersion effects are negligible, the dispersion curve in the wavelength domain represented by Eq. (2) is a liner curve with a constant dispersion slope. Hence, as illustrated in FIG. 26, when the fiber grating is stretched or compressed, the Bragg reflection band positions are shifted in the wavelength domain. This shifts the dispersion produced on each channel. When the relative positions of different channels with respect to respective band centers are different, the total dispersions at different channels are different. The dispersion slope for different channels, however, remains as a constant. Therefore, the $D^{(3)}(\lambda_o)$ effect can be used to produce a tunable dispersion with a constant dispersion slope. The dispersion slope is independent of the stretch or compression and is not tunable.

In contrast, the $D^{(4)}(\lambda_o)$ effect or higher nonlinear effects can provide not only a tunable dispersion as by the $D^{(3)}(\lambda_o)$ effect but also a tunable dispersion slope as indicated by Eq. (3). FIG. 27 illustrates the operation of the tunable dispersion slope by the fourth order or higher order nonlinear effect. Notably, the grating dispersion is now a nonlinear curve due to the $D^{(4)}(\lambda_o)$ effect or higher nonlinear chirp effects. As a result, when the fiber grating is stretched or compressed, the dispersion at each channel changes due to the shifts of the reflection bands. In addition, the dispersion slope changes with the fiber stretching or compression. The $D^{(4)}(\lambda_o)$ effect or higher nonlinear chirp effects hence can be used to adjust the dispersion slope produced by the fiber grating to negate the varying dispersion slope accumulated in a received WDM channel after transmission through a dispersive fiber system.

FIG. 28 shows one example of a dispersion-slope compensator 2800 for a WDM system based on a sampled nonlinearly-chirped fiber grating 2801. The input port 1 of the circulator 2820 is coupled to receive an input signal 2810 of multiple WDM channels from a dispersive WDM fiber system 2811. An optical coupler or a beam splitter 2830 is used to tap a small fraction of the reflected signal 2812 with multiple channels for dispersion measurements in a dispersion monitor device 2832. The device 2832 measures the dispersion and the dispersion slope in the reflected channels and produces a dispersion indicator. A grating control 2834 is coupled to control the nonlinearly-chirped grating parameter nΛ as a function of the position z. In addition, the control 2834 is operable to control the grating parameter nΛ according to the dispersion monitor from the device 2832. A number of implementations of the grating control 2834 are described in previous sections of this application, including a fiber stretcher engaged to the fiber grating and a control circuit that supplies a control signal to the fiber stretcher to vary the total length of the fiber, and a thermal control unit for controlling the temperature of the entire fiber grating. As the dispersion in the input signal 2810 varies, the device 2800 can respond to the changing dispersion in the fiber system 2811 by dynamically adjusting the nonlinearly-chirped sampled grating 2801 accordingly to change the amount of dispersion and associated dispersion slope for each reflected WDM channel.

A 3-channel sampled nonlinearly-chirped grating was used to demonstrate the above dispersion slope compensation. FIGS. 29A and 29B show the measured reflection bands and dispersion of the grating, respectively. The band spacing $\Delta\lambda_{FBG}$ of the three Bragg reflection bands is about 4 nm. Three dispersive optical channels at 1559.7 nm, 1554.8 nm, and 1549.2 nm with a channel spacing $\Delta\lambda_{Ch}$ of about 5 nm were generated with a pseudorandom bit stream (PRBS) $2^{15}-1$ and modulated at a bit rate of 10 Gb/s. FIG. 30 shows the dispersion map of the optical channels at different travel distances in a dispersive fiber line.

FIG. 31A show compensated output channels from the fiber grating after the channels transmitted through a 900-km dispersive fiber line. When the transmission fiber line was increased to 1200 km to add additional dispersion to the transmitted channels, the fiber grating was stretched to increase the grating dispersion by shifting each Bragg reflection band by about 0.8 nm. FIG. 31B shows the compensated output channels. FIGS. 32A and 32B respectively show the measured bit error rates. The measurements show that the 3-channel grating is used to produce a high dispersion compensation for the most severely dispersed channel at 1549.2 nm and a low dispersion for the 1559.7 nm channel close to the zero-dispersion wavelength for the fiber line.

Therefore, sampled nonlinearly-chirped fiber gratings may be designed to have desired nonlinear chirp and band spacing to allow sensitive dispersion tuning of dispersion at different channels. The fourth or higher order nonlinear effects of such gratings can be used to further improve the tuning sensitivity. In real fiber systems where the zero dispersion wavelength is usually allocated near the center of the transmission band, two sampled nonlinearly-chirped gratings with opposite dispersions may be used to compensate for channels below and above the zero dispersion wavelength, respectively. Hence, an optical filter may be used to separate the input channels and direct the proper channels to proper gratings for compensation.

As described above, the techniques, devices, and systems described in this application use reflective wave-guiding Bragg gratings with spatial grating patterns to produce a group delay as a nonlinear function of the wavelength of light. Nonlinear chirping in the grating parameter $n_{eff}(z)\Lambda(z)$ provides one example of such Bragg gratings. The nonlinearity in the group delay may be used to produce the desirable and beneficial tunable dispersion. In addition, the nonlinearity in the group delay may also be used to tune the dispersion slope produced by a sampled grating with multichannel Bragg reflection bands, i.e., a change in the induced dispersion from one channel to an adjacent channel in WDM systems.

However, it is recognized that such nonlinearity may also lead to pulse distortion in the optical pulses reflected by the grating. One consequence of this pulse distortion is a power penalty at an optical receiver. This pulse distortion and associated power penalty generally increase with the bit rate of the data stream.

Figure 33A:
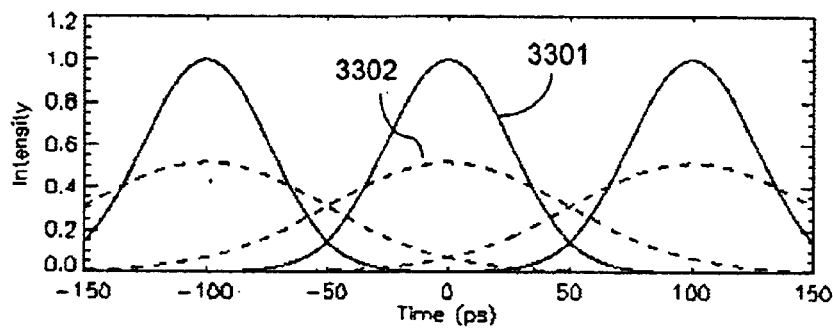
FIGS. 33A, 33B, and 33C show simulated effects of the nonlinear grating dispersion by a tunable fiber Bragg grating in dispersive fiber links.
Figure 33B:
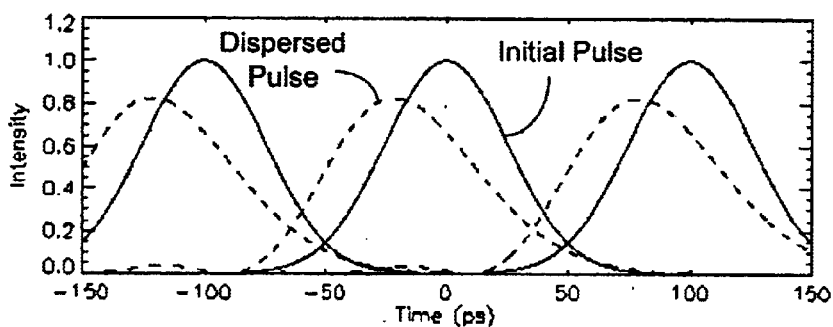
Figure 33C:
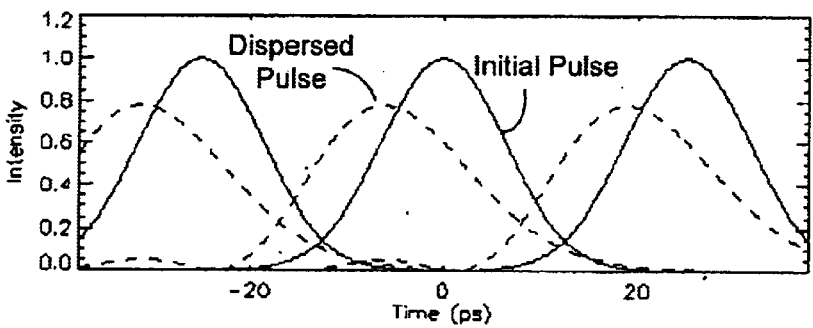

FIGS. 33A, 33B, and 33C show simulated effects of such nonlinear dispersion on a single Gaussian pulse reflected by a nonlinearly-chirped fiber Bragg grating. The nonlinear chirp of the fiber Bragg grating is designed to have the third-order nonlinear dispersion $D_0^{(3)}(\lambda_o)$ but no other higher order effects. The single pulse results at different times based on a linear dispersion calculation are shifted in time and plotted together to give the appearance of an eye diagram plot. The simulation assumes that, the pulse propagates through a 100-km fiber link with a dispersion of 17 ps/nm, and that the pulse is a transform-limited Gaussian pulse in the return-to-zero (RZ) format with intensity FWHM of 60 ps for OC-192 (10 Gb/s) and 15 ps for OC-768 (40 Gb/s), respectively. The dispersion for the nonlinearly-chirped grating is assumed to be $$D(\lambda)=-1000 \text{ ps/nm}+D^{(3)}(\lambda-\lambda_o), \tag{7}$$

where $D^{(3)}$ is assumed to be 1000 ps/nm². Hence, the value of $D^{(3)}(\lambda-\lambda_o)$ should vary over ±1000 ps/nm in order to produce a tunable grating dispersion from 0 to −2000 ps/nm. Assuming the nominal dispersion value for standard communication fibers is about +17 ps/nm-km, this fiber grating can be used to compensate for dispersion in a fiber link of up to about 118 km in length.

In FIG. 33A, the solid curve 3301 represents the OC-192 pulse at the beginning of the dispersive link, the dashed curve 3302 represents the pulse shape after transmitting through the dispersive link with a total dispersion of $D^{(2)}=$ 1700 ps/nm, without the dispersion compensation. When the fiber grating is used to compensate for the dispersion, the pulse shape after compensation essentially overlaps with the solid curve 3301. Hence, at bit rates below 10 Gb/s (OC-192), this pulse distortion is relatively small for a single fiber link of about 100 km but can become significantly large over a longer fiber link.

FIG. 33B shows the distorted pulse shape at 10 Gb/s (OC-192) after transmitting through a fiber link of 5000 km in length. The distortion of the pulses in FIG. 33B is primarily a result of the fact that the dispersion of the pulse is compensated by using the above grating every 100 km in the fiber link. Since the third-order dispersion by the grating is about 1000 ps/nm² per link, a total of 50000 ps/nm² in the third-order dispersion is accumulated. FIG. 33C further shows that, a pulse at 40 Gb/s (OC-768) can be significantly distorted after transmitting through a single 100-km fiber link even with the dispersion compensation of a single fiber grating with a third-order dispersion of 1000 ps/nm². Hence, the third-order dispersion produced by the nonlinear-chirped fiber grating may be problematic for optical links at high bit rates.

One aspect of the techniques, devices, and systems of this application is to use two specially-designed tunable fiber Bragg gratings as a pair to mitigate the above pulse distortion and power penalty by minimizing the net third-order dispersion in the optical signal after being reflected by both of the gratings. Each fiber Bragg grating is designed to have a spatial grating pattern that produces a nonlinear group delay with respect to the frequency detuning of the input optical signal from the center wavelength of a Bragg reflection band. One implementation of such gratings, for example, is the aforementioned nonlinearly-chirped fiber Bragg gratings. When the two gratings are configured under proper conditions, the operation of the grating pair can produce a total delay as a linear function of the input wavelength over the bandwidth of the Bragg reflection band. The nonlinear group delay in each individual grating, including the third-order dispersion, is still desirable for providing the tunability of the total grating dispersion produced by the grating pair so that either or both of the gratings in the grating pair may be tuned to adjust the total grating dispersion.

Consider a grating pair in which each nonlinearly-chirped fiber Bragg grating exhibits the constant dispersion term $D_0^{(2)}(\lambda_0)$ and only the first higher-order dispersion term, the third order $D_0^{(3)}(\lambda_0)(\lambda-\lambda_0)$ which is a linear function of wavelength. The nonlinear chirp patterns in the grating parameter $n_{eff}(z)\Lambda(z)$ of the two gratings are designed to make their third-order dispersion coefficients $D_0^{(3)}(\lambda_0)$ to have opposite signs: the grating with a positive $D_0^{(3)}(\lambda_0)$ is designated as "+" and the other grating with a negative $D_0^{(3)}(\lambda_0)$ is designated as "−". Assuming the respective center wavelengths of the Bragg reflection bands of the two gratings are $\lambda_{o+}$ and $\lambda_{o-}$, the grating dispersions of the gratings can be respectively expressed as $$D_+ = D_+^{(2)}(\lambda_0) + D_+^{(3)}(\lambda_0)\Delta\lambda_+, \quad (8)$$

$$D_- = D_-^{(2)}(\lambda_0) + D_-^{(3)}(\lambda_0)\Delta\lambda_-, \quad (9)$$

where $\Delta\lambda_+=\lambda-\lambda_{o+}$ and $\Delta\lambda_-=\lambda-\lambda_{o-}$ are detuning values from the center wavelength for each of the two gratings. These center wavelengths can be independently adjusted by, for example, stretching or compressing each grating. In one implementation, the third-order dispersion coefficients can be chosen to have opposite values: $D_+^{(3)}(\lambda_0)=-D_-^{(3)}(\lambda_0)$. Under this condition, the total grating dispersion produced by the grating pair is $$\begin{aligned}D = D_+ + D_- &= D_+^{(2)}(\lambda_0) + D_-^{(2)}(\lambda_0) + D_+^{(3)}(\lambda_0)(\Delta\lambda_+ - \Delta\lambda_-), \quad (10)\\&= D_+^{(2)}(\lambda_0) + D_-^{(2)}(\lambda_0) + D_+^{(3)}(\lambda_0)(\lambda_{0-} - \lambda_{0+}) +\\&\quad D_+^{(3)}(\lambda_0)(\lambda - \lambda).\end{aligned}$$

Therefore, the last term, representing the third-order dispersion term in the total combined dispersion of the two gratings, is identically zero; whereas the stretching or compression of the two gratings can tune the dispersion values of the gratings at their center wavelengths, $\lambda_{o+}$ and $\lambda_{o-}$. Thus, this can change the dispersion D through the term $D_+^{(3)}(\lambda_0)(\lambda_{0-}-\lambda_{0+})$. Notably, under the above conditions, the two grating center wavelengths should be tuned in opposite directions from their initial values to achieve the full dispersion range. When only one of the two gratings is tunable, the total induced dispersion by the grating pair is still tunable but the tuning range is one half of the tuning range achievable when both gratings are tunable.

Figure 34A:
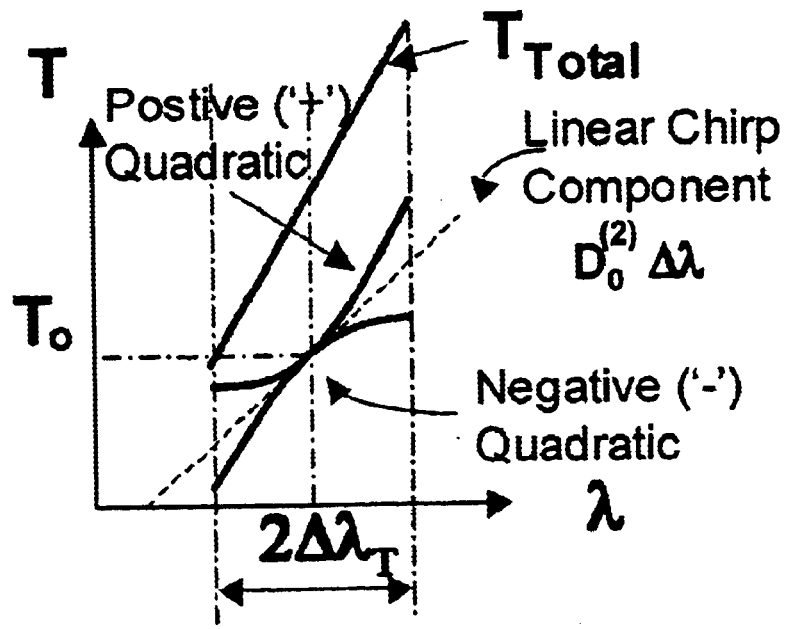
FIGS. 34A, 34B, 34C, and 34D illustrate the design and operation of a grating pair with two tunable fiber Bragg gratings for producing tunable grating dispersion with substantially canceled nonlinear grating dispersion.
Figure 34B:
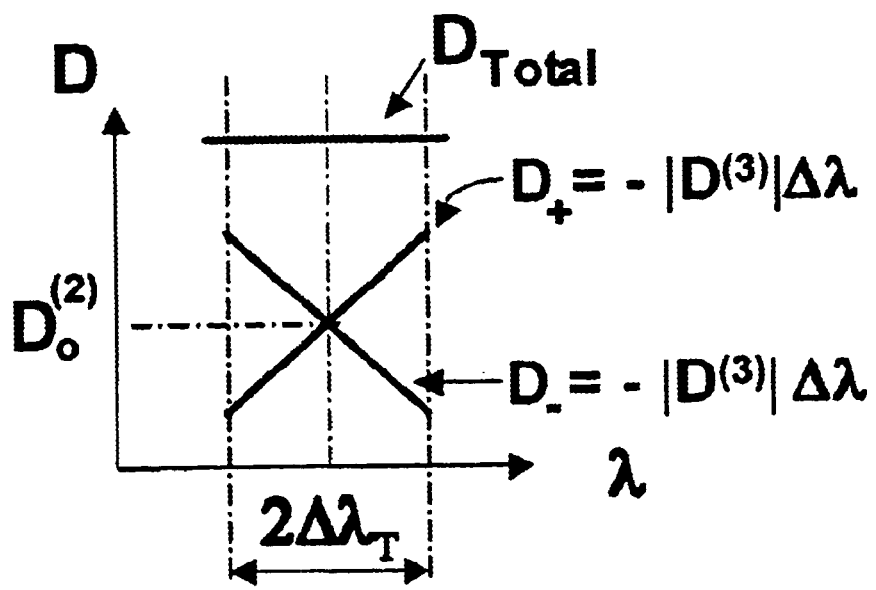
Figure 34C:
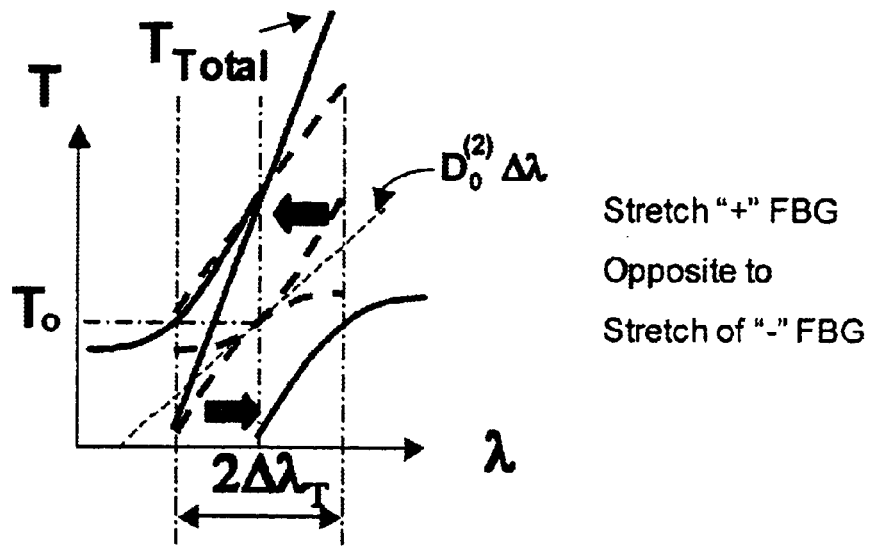
Figure 34D:
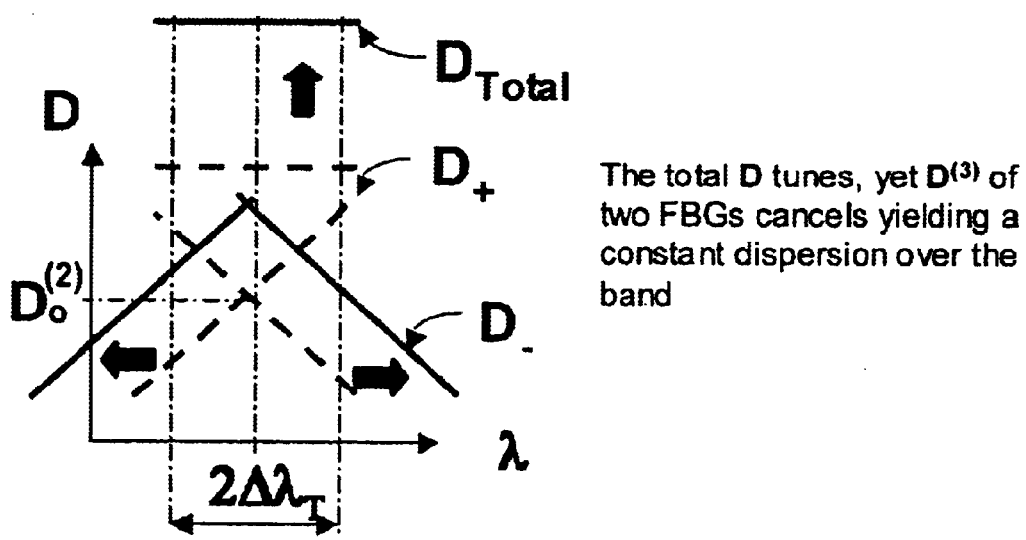

FIGS. 34A, 34B, 34C, and 34D illustrate the design and operation of the above grating pair where $D_+^{(3)}(\lambda_0)=-D_-^{(3)}(\lambda_0)$. FIG. 34A shows the delays produced by the two gratings and the total delay as a function of the relative wavelength λ of the input wavelength with respect to the center wavelength of the Bragg reflection band. FIG. 34B shows the grating dispersions and the total dispersion of the grating pair. FIGS. 34C and 34D illustrate the changes in delays and dispersions when the "+" grating is compressed and the "−" grating is stretched by the same amount to increase the total relative delay between different wavelengths and the total dispersion. Conversely, the "+" grating can be stretched and the "−" grating can be compressed by the same amount to reduce the total relative delay between different wavelengths and the total dispersion.

Alternatively, the two gratings may be designed to have unequal magnitudes of $D_+^{(3)}(\lambda_0)$ and $D_-^{(3)}(\lambda_0)$. Under this condition, the two gratings may also be stretched or compressed by different amounts to produce a desired, tunable amount of the constant dispersion term represented by the dispersion coefficients $(D_+^{(2)}(\lambda_0)+D_-^{(2)}(\lambda_0))$ in Eq. (10). In addition, $D_+^{(3)}(\lambda_0)$ and $D_-^{(3)}(\lambda_0)$ may be selected so that the total dispersion includes a residual, fixed third-order nonlinear dispersion which may be used to compensate for the intrinsic third-order dispersion of the fiber, typically at about 5–10 ps/nm² for a 100-km link. It may also be desirable to tune the third-order dispersion for dispersion slope compensation by designing the gratings to have the fourth-order dispersion term in Eq. (1) as discussed further below.

Figure 35:
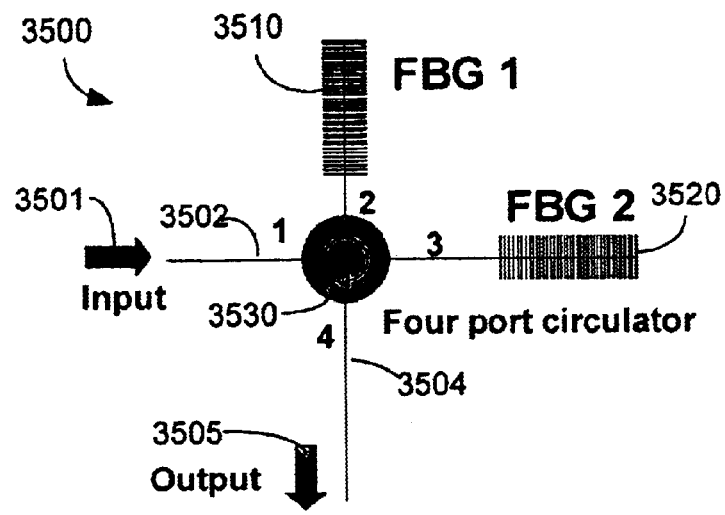
FIGS. 35, 36, 37, and 38 show exemplary configurations of grating pairs according to the present invention.

FIG. 35 shows a cascade grating pair 3500 with two fiber Bragg gratings 3510 and 3520 operable to produce nonlinear group delays according to one embodiment. The gratings 3510 and 3520 may be nonlinearly-chirped gratings. As described above, the sign of the third-order nonlinear dispersion coefficient $D_0^{(3)}(\lambda_0)$ of the first grating 3510 is opposite to that of the second grating 3520. A four-port optical circulator 3530 is used to couple light from an input fiber 3502 to the first grating 3510, from the first grating 3510 to the second grating 3520, and from the second grating 3520 to an output fiber 3504. Each grating is oriented to have the long-wavelength end, where the grating spacing is greatest, to receive the light from the circulator 3530. An input signal 3501 enters the grating pair 3500 by first being reflected by the grating 3510 and then by the grating 3520 to produce an output signal 3505.

In one implementation, each of the gratings 3510 and 3520 in the grating pair 3500 may be coupled to a designated grating stretcher so that both gratings 3510 and 3520 are independently tunable. Assume the grating 3510 has the positive third-order dispersion coefficient $D_+^{(3)}(\lambda_0)$ and the grating 320 has the negative coefficient $D_-^{(3)}(\lambda_0)$. When $D_+^{(3)}(\lambda_0) = -D_-^{(3)}(\lambda_0)$, both gratings 3510 and 3520 can be stretched by an amount to produce dispersion at the midpoint of their tuning range. This sets the initial setting of the grating pair 3500, and the net $3^{rd}$ order dispersion is zero. In operation, the total grating dispersion on the output signal 3505 can be increased by stretching the grating 3510 while relaxing the grating 3520 by the same amount. When the total grating dispersion is to be reduced, the grating 3520 is stretched and the grating 3510 is relaxed, both by the same amount. Such tuning operations allow the grating pair 300 to operate at its full dispersion range, while maintaining zero net $3^{rd}$ order dispersion.

Alternatively, the grating pair 3500 may be tuned by tuning only one of the gratings 3510 and 3520 while the other grating is fixed at a selected length. This configuration can be used to reduce the mechanical complexity of the system, since only one stretching device is required, while still maintaining cancellation of the third-order dispersion terms between the two gratings so that the net grating dispersion is constant and independent of wavelength. Assuming only the grating 3510 is tunable, $D_+^{(3)}(\lambda_0) = -D_-^{(3)}(\lambda_0)$, the grating 3510 can be initially stretched to produce a grating dispersion at the midpoint of its tuning range. In operation, the grating 3510 is stretched to increase the total grating dispersion and is relaxed to reduce the total grating dispersion.

The grating pair 3500 may be periodically deployed in a fiber line to compensate for chromatic dispersion. The spacing between two adjacent grating pairs is selected such as the dispersion accumulated in the fiber link over the selected spacing is within the compensation range of each grating pair. In this configuration, the two gratings in each pair are coupled to a common point in the fiber link and the dispersion in the output signal of each grating pair is essentially fully compensated.

Figure 36:
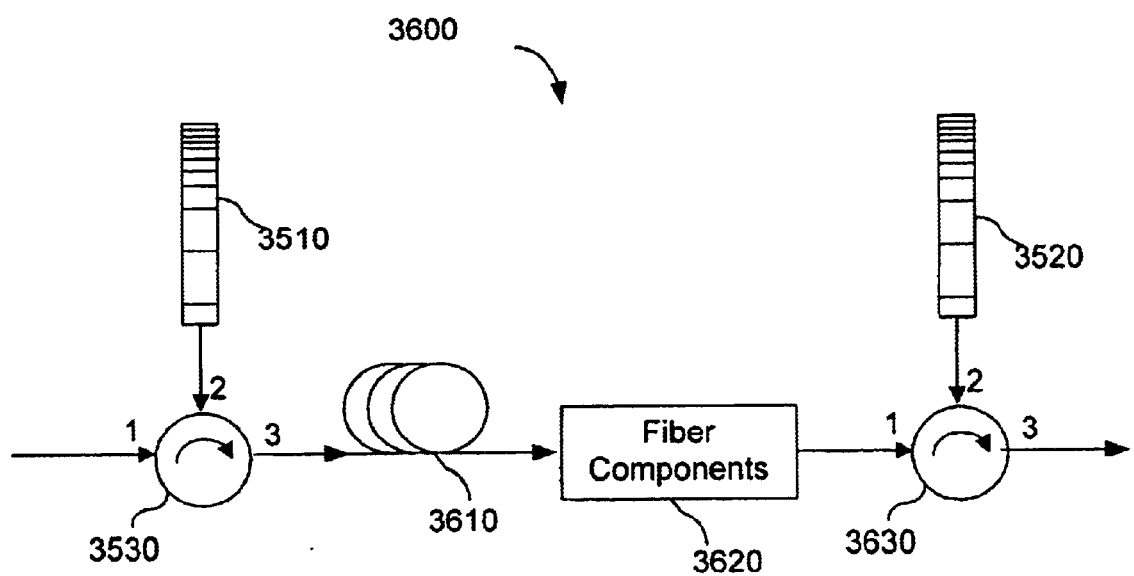

FIG. 36 shows another configuration 3600 for implementing two fiber Bragg gratings 3510 and 3520 with nonlinear group delays as a grating pair in two different locations in a fiber. The first grating 3510 is disposed at one end of a dispersive fiber link 3610 and the second fiber grating 3520 is disposed at the opposite end. Optical circulators 3530 and 3630 are used to respectively couple the fiber gratings 310 and 320 to the fiber link 3610. The fiber link 3610 may include one or more fiber components 3620 between the two gratings 3510 and 3520. This configuration, like the cascade configuration shown in FIG. 35, can substantially cancel the third-order nonlinear dispersion. Unlike the system 3500 in FIG. 35 where the signal is fully compensated at the beginning of each link, the signal in the system 3600 can be fully compensated at the beginning of every other link.

This configuration has the advantage that only one grating is introduced for each link. The total number of the gratings is less than that of the cascaded scheme shown in FIG. 35 and hence the accumulated power loss introduced by the gratings throughout the transmission system can be reduced. Assuming that the gratings in FIG. 36 have similar loss to those used in FIG. 35, the grating loss would be reduced by a factor of two per link in the configuration of FIG. 36, while still operable to cancel out the accumulated higher-order dispersion in the transmission system.

Figure 37:
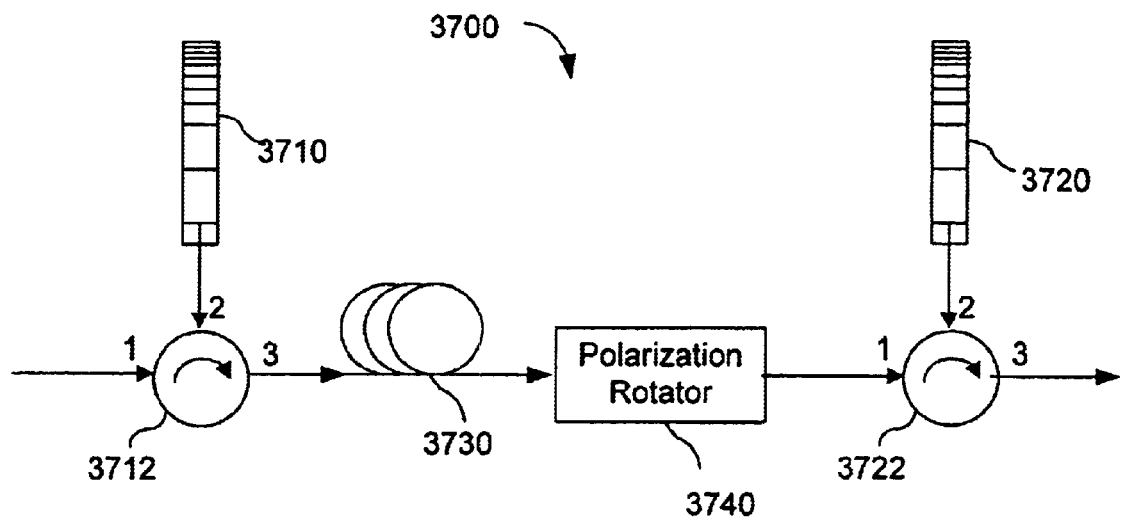
Figure 38:
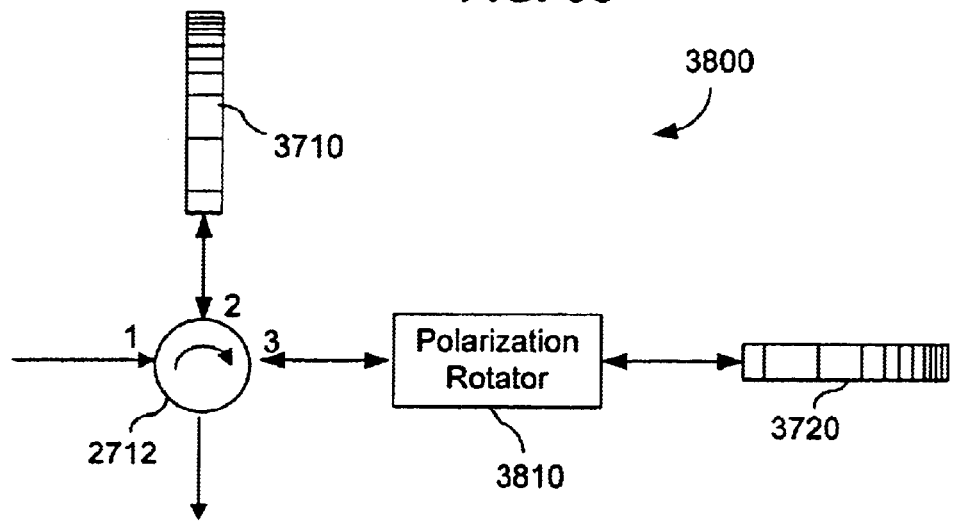

FIGS. 37 and 38 show grating pairs formed of birefringent nonlinearly-chirped fiber gratings 3710 and 3720 or gratings with nonlinear group delays for compensating or controlling polarization-mode dispersion (PMD). A polarization rotator 3740 or 3810, such as a polarization controller, is disposed in the optical path from the grating 3710 to the grating 3720 to rotate the polarization of light. The principal axes of polarization of the gratings 3710 and 3720 are arranged so that the polarization along the fast axis of the grating 3710 is rotated to polarize along the slow axis of the grating 3720 and the polarization along the slow axis of the grating 3710 is rotated to polarize along the fast axis of the grating 3720. The systems 3700 and 3800 can compensate for first order and second order PMD while minimizing the higher-order chromatic dispersion caused by the nonlinear chirps in the gratings 3710 and 3720.

In the system 3700 in FIG. 37, the two gratings are located at the opposite ends of the fiber link 3730 which may have PMD that fluctuates with time. Hence, the polarization rotator 3740 may be the adjustable type to maintain the above desired polarization condition. The rotator 3740 may be located near the coupler 3722 to reduce the perturbation in the output polarization from the rotator 3740 by the fiber link 3730. In FIG. 38, the polarization rotator 3810 may be designed to rotate the polarization by 90 degrees since both gratings 3710 and 3720 are at the same location of a link. Alternatively, the system 3800 may eliminate the rotator 3810 by arranging the orientations of the gratings 3710 and 3720 so that principal axes of polarization of the grating 3710 are rotated 90 degrees with respect to those of the grating 3720.

The polarization rotator 3740 or 3810 may also be used so that the polarization along the fast axis of the grating 3710 is rotated by an amount less than an angle to polarize along the slow axis of the grating 3720 and the amount of the polarization rotation is used control the amount of PMD in the output signal from the grating pair. Certainly, in this context, the polarization rotator 3740 or 3810 may be eliminated by orienting the principal axes of the gratings 3710 and 3720 at a desired angle to control the amount of PMD in the output signal from the grating pair.

In each of above twin-grating configurations, the two fiber Bragg gratings with nonlinear group delays may also be designed to exhibit an additional higher-order dispersion term, the fourth-order dispersion $D^{(4)}$, in addition to the third-order dispersion term $D^{(3)}$. Such a grating pair allows for separate adjustments of the grating dispersion and the rate of change in the grating dispersion with respect to wavelength (i.e., grating dispersion slope). The following describes the designs and operations of several examples of such grating pairs.

The dispersions of the two generally distinct FBGs may be written as follows:

$$D_1^{(2)}(\lambda) = D_{01}^{(2)} + D_{01}^{(3)}\lambda + D_1^{(4)}\lambda^2/2 \tag{11}$$

$$D_2^{(2)}(\lambda) = D_{02}^{(2)} + D_{02}^{(3)}\lambda + D_2^{(4)}\lambda^2/2 \tag{12}$$

where the wavelength $\lambda$ is measured relative to a center wavelength of the respective Bragg reflection band. Assume each grating can be independently tuned by uniform stretching or compressing. Such tuning can be used to independently shift the effective center wavelength of the Bragg reflection band of each grating so that the dispersion at the operating wavelength is adjustable according to the following functions:

$$D_1^{(2)}(\lambda) = D_{01}^{(2)} + D_{01}^{(3)}(\lambda + \lambda_1) + D_1^{(4)}(\lambda + \lambda_1)^2/2, \text{ and} \tag{13}$$

$$D_2^{(2)}(\lambda) = D_{02}^{(2)} + D_{02}^{(3)}(\lambda + \lambda_2) + D_2^{(4)}(\lambda + \lambda_2)^2/2, \tag{14}$$

where $\lambda_1$ and $\lambda_2$ are the shifts in their respective center wavelengths of the gratings from the stretches. Such stretches may be generally independent and unequal. In particular, the wavelength shifts $\lambda_1$ and $\lambda_2$ can be represented by the following:

$$\lambda_1 = \lambda_p + \lambda_n, \text{ and} \quad (15)$$

$$\lambda_2 = \lambda_p - \lambda_n,$$

where $\lambda_p$ is the portion of the shift in the same direction in both FBGs by simultaneously stretching or compressing both FBGs, and $\lambda_n$ is the portion of the shift in opposite directions in the two FBGs by stretching one FBG while compressing the other FBG. That is, $\lambda_p$ is associated with a symmetric stretching or compression of the two gratings while $\lambda_n$ is associated with an anti-symmetric stretch or compression of the two gratings.

In order to independently tune both the $D^{(3)}$ and $D^{(2)}$, the gratings are designed such that the fourth order coefficients $D_{01}^{(4)}$ and $D_{02}^{(4)}$ are equal and have opposite signs and the third order coefficients $D_{01}^{(3)}$ and $D_{02}^{(3)}$ are equal and of the same sign. This design can not only cancel out the fourth-order dispersion in the net grating dispersion of the two grating dispersions but also allow for the effect of $\lambda_n$ and $\lambda_p$ to act nearly independently on $D^{(3)}$ and $D^{(2)}$. The net grating dispersion of the two FBGs as the sum of Eqs. (13) and (14) can be expressed as:

$$D^{(2)}(\lambda) = D_0^{(2)} + D_0^{(3)}(2\lambda + \lambda_1 + \lambda_2) + D_0^{(4)}((\lambda+\lambda_1)^2 - (\lambda+\lambda_2)^2)/2 \quad (17)$$

where the sum of $D_{01}^{(2)}$ and $D_{02}^{(2)}$ has been abbreviated as $D_0^{(2)}$, $D_0^{(3)} = D_{01}^{(3)} = D_{02}^{(3)}$, and $D_0^{(4)} = D_1^{(4)} = -D_2^{(4)}$. Substituting Eqs. (15) and (16) into Eq. (17) yields $$D^{(2)}(\lambda) = D_0^{(2)} + 2D_0^{(3)}(\lambda + \lambda_p) + 2D_0^{(4)}\lambda_n(\lambda + \lambda_p) \quad (18)$$
$$= D_0^{(2)} + (2D_0^{(3)} + 2D_0^{(4)}\lambda_n)(\lambda + \lambda_p)$$

Hence, the total effective dispersion at the operating wavelength where $\lambda=0$ is given by $$D^{(2)}(0) = D_0^{(2)} + (2D_0^{(3)} + 2D_0^{(4)}\lambda_n)\lambda_p. \quad (19)$$

The expression in the parentheses in Eq. (19) is the total effective third-order dispersion at $\lambda=0$ that represents the rate of change in the dispersion with respect to the wavelength, i.e., the dispersion slope:

$$D^{(3)}(0) = 2D_0^{(3)} + 2D_0^{(4)}\lambda_n \quad (20)$$

Eqs. (18)–(20) suggest that, $\lambda_n$ can be adjusted to tune $D^{(3)}$ and $\lambda_p$ can be adjusted to tune $D^{(2)}$. The adjustment in $\lambda_n$ changes not only the value of $D^{(3)}$ but also the value of $D^{(2)}$ since it is dependent on the value of $D^{(3)}$ and hence $\lambda_n$. Despite such interdependency, the above symmetric and anti-symmetric stretching or compression of the properly-chirped fiber gratings can provide separate tuning mechanisms for the net grating dispersion and the grating dispersion slope.

Notably, the above symmetric and anti-symmetric stretching or compression of the properly-designed fiber gratings, e.g., proper nonlinear chirping, may be used to separately tune the dispersion and dispersion slope in multiple optical channels that are evenly spaced from one another as in a WDM system. Each fiber Bragg grating in the grating pair may be sampled by a spatial sampling pattern to produce multiple evenly-spaced Bragg reflection bands centered at different wavelengths. The sampling period P is selected to be greater than the underlying grating period. Such a sampled grating with a nonlinear group delay can be used to provide simultaneous and tunable dispersion compensation in multiple WDM channels. See, U.S. Pat. No. 6,330,383 issued to Cai et al. on Dec. 11, 2001.

In particular, the sampling period P is designed such that the grating channel spacing is slightly offset by an incremental wavelength $\delta$ from the ITU grid spacing between adjacent channels in a WDM signal. Thus, N channels away from the center channel of the band, the wavelength offset accumulates to a value of N$\delta$. Therefore, if both FBGs are designed to have the same offset $\delta_p$ in wavelength with the same sign, the dispersion of the Nth channel is given by Eq. (18), $$D^{(2)}(0+N\delta) = D_0^{(2)} + (2D_0^{(3)} + 2D_0^{(4)}\lambda_n)(\lambda_p + N\delta_p) \quad (21)$$

Thus, the variation or change in dispersion from one channel to an adjacent channel (i.e., dispersion slope) produced by each grating is given by the change in dispersion divided by the wavelength separation of the Nth channel, i.e., $$s = \Delta D^{(2)}/\Delta\lambda = (2D_0^{(3)} + 2D_0^{(4)}\lambda_n)(\delta_p/\lambda_{ch}) \quad (22)$$

where $\lambda_{ch}$ is the separation between two adjacent channels. For a sampled grating having an effective average group index $n_g = n_{eff} - \lambda_0 dn_{eff}/d\lambda|_{\lambda=\lambda_0}$, the channel spacing is $\lambda_{ch} = \lambda_0^2/2n_g P$.

Eqs. (19)–(22) suggest that both the dispersion and the slope of the dispersion are now tunable. According to Eq. (20), changing an asymmetric stretch of the two gratings $\lambda_n$ tunes the central value of $D^{(3)}$ and thus, as shown in Eq. (22), the slope of the dispersion over many channels. Eq. (19) shows that for a given value of $D^{(3)}$ (and $\lambda_n$), changing $\lambda_p$ by a symmetric stretch tunes the central value of dispersion. Thus, although not completely independent, it is now possible to tune both the dispersion and dispersion slope by proper values of $\lambda_n$ and $\lambda_p$. The proper amounts of stretches, $\lambda_1$ and $\lambda_2$, for the two gratings may be determined by Eqs. (15) and (16) with the values of $\lambda_n$ and $\lambda_p$.

The dispersion tuning by using the grating pair under the analysis of Eqs. (18)–(22) is fully applicable when only one of the two gratings is tunable by, e.g., being stretched or compressed. In this case, assume, for example, that the second grating is not stretched or compressed, i.e. $\lambda_2=0$. Eqs. (15) and (16) provide that $\lambda_p=\lambda_n=\lambda_1/2$. These values for $\lambda_p$ and $\lambda_n$ can be substituted into Eqs. (18)–(22) to find that $D^{(2)}$, $D^{(3)}$, and the WDM slope defined in Eq. (22), i.e., change in the total induced dispersion from one channel to an adjacent channel when two gratings are sampled, can all be tuned by the stretching or compression of a single grating, albeit not independently. This embodiment may be used in applications where only a single stretching or compression mechanism is desired. The stretching or compression of a single grating in the grating pair may be used in other designs of the grating pair disclosed in this application.

In the above scheme, the signs of $D^{(3)}$ are the same in both gratings. As a result, the third-order dispersions of the two gratings add up to produce a net third-order dispersion. For some applications, the third-order dispersion may be undesirable. Hence, alternative to the above scheme, the gratings may be designed to have the opposite signs for both $D^{(3)}$ and $D^{(4)}$ coefficients to cancel the third-order dispersion in the net dispersion produced by the grating pair. Under this design, the net grating dispersion produced by the grating pair can be written as:

$$D^{(2)}(\lambda) = D_0^{(2)} + D_0^{(3)}(\lambda_1 - \lambda_2) + D_0^{(4)}((\lambda+\lambda_1)^2 - (\lambda+\lambda_2)^2)/2. \quad (23)$$

Substituting Eqs. (15) and (16) into Eq. (23) yields $$D^{(2)}(\lambda) = D_0^{(2)} + 2D_0^{(3)}\lambda_n + 2D_0^{(4)}\lambda_n(\lambda + \lambda_p) \quad (24)$$
$$= D_0^{(2)} + (2D_0^{(3)} + 2D_0^{(4)}(\lambda + \lambda_p))\lambda_n$$

Hence, the total effective dispersion at the operating wavelength where $\lambda=0$ is given by $$D^{(2)}(0)=D_0^{(2)}+(2D_0^{(3)}+2D_0^{(4)}\lambda_p)\lambda_n. \quad (25)$$

The total effective third-order dispersion can be computed by the derivative of Eq. (24) with respect to $\lambda$, $$D^{(3)}(\lambda)=2D_0^{(4)}\lambda_n \quad (26)$$

Therefore, in the absence of the anti-symmetric stretching or compression ($\lambda_n=0$), the effective third-order dispersion is essentially zero. Similar to the above scheme, the two sampled gratings are designed to have the same frequency offset $\delta_n$ between the frequency spacing of the Bragg reflection bands produced by each sampled grating and the input channel spacing of the WDM signals on the ITU grid. Different from the above scheme, the frequency offsets in the two sampled gratings have opposite signs. Under this condition, the effective dispersion of the Nth channel from the band center produced by the two gratings is $$D_1^{(2)}(0+N\delta_n)+D_2^{(2)}(0-N\delta_n)=D_0^{(2)}+(2D_0^{(3)}+2D_0^{(4)}\lambda_p)(\lambda_n+N\delta_n), \quad (27)$$

and the associated dispersion slope produced by the two gratings is $$s=\Delta D^{(2)}/\Delta\lambda=(2D_0^{(3)}+2D_0^{(4)}\lambda_p)(\delta_n/\lambda_{ch}). \quad (28)$$

According to Eqs. (25)–(28), the anti-symmetric stretch $\lambda_n$ tunes the total effective dispersion of the two gratings, although the rate of tuning will depend on the symmetric stretch $\lambda_p$. In addition, the $3^{rd}$ order dispersion is zero when $\lambda_n=0$, but varies with $\lambda_n$ according to Eq. (26). Applying the symmetric stretch $\lambda_p$ changes the dispersion slope according to Eq. (28), when the incremental channel spacing offset $\pm\delta_n$ is designed to be of opposite signs in the two gratings. If $\lambda_n=0$, the dispersion slope is tuned by changing $\lambda_p$ without varying the second-order dispersion or introducing any $3^{rd}$ order dispersion. Thus, this arrangement may be preferred in some applications because it can independently tune the dispersion slope without introducing any other adverse effects.

The above description discloses two possibilities for the signs of $D^{(3)}$ and $D^{(4)}$ in designing the grating pair with two nonlinearly-chirped fiber Bragg gratings. Two additional possibilities are cases where both gratings have the same sign in their $D^{(4)}$ coefficients, and their $D^{(3)}$ coefficients have either the same or opposite signs. If the $D^{(4)}$ have the same sign, the quadratic terms in Eqs. (19) and (20) do not cancel out. Such arrangements may be advantageous in some applications.

Consider the case where both $D^{(3)}$ and $D^{(4)}$ have the same sign in both gratings. The total dispersion of the two gratings is $$D^{(2)}(\lambda)=D_0^{(2)}+D_0^{(3)}(2\lambda+\lambda_1+\lambda_2)+D_0^{(4)}((\lambda+\lambda_1)^2+(\lambda+\lambda_2)^2)/2 \quad (29)$$

Substitution of Eqs. (15) and (16) into Eq. (29) yields $$D^{(2)}(\lambda)=D_0^{(2)}+2D_0^{(3)}(\lambda+\lambda_p)+D_0^{(4)}(\lambda^2+\lambda_n^2+\lambda_p^2+2\lambda\lambda_p) \quad (30)$$

The dispersion at band center ($\lambda=0$) is $$D^{(2)}(0)=D_0^{(2)}+2D_0^{(3)}\lambda_p+D_0^{(4)}(\lambda_n^2+\lambda_p^2) \quad (31)$$

Thus the total dispersion may be tuned by adjusting $\lambda_p$, but there are also components quadratic in $\lambda_p$ and $\lambda_n$. The third order dispersion is given by $$D^{(3)}(\lambda)=2D_0^{(3)}+2D_0^{(4)}(\lambda+\lambda_p). \quad (32)$$

Assume the two fiber gratings are sampled and have opposite sign offsets $\pm\delta_n$ with respect to the input WDM channels. The dispersion of the Nth channel is given by $$D_1^{(2)}(0+N\delta_n) + D_2^{(2)}(0 - N\delta_n) = \quad (33)$$
$$D_0^{(2)} + 2D_0^{(3)}\lambda_p + D_0^{(4)}(\lambda_n^2 + \lambda_p^2 + (N\delta_n)^2 + 2N\lambda_n\delta_n)$$

Thus the dispersion slope can be tuned by a combination of $\lambda_n$ and $\delta_n$, and is independent of $\lambda_p$. Notably, the dispersion slope varies from channel to channel due to the quadratic terms in Eqs. (24)–(25):

$$s(N\lambda_{ch})=\Delta D^{(2)}/\Delta\lambda=2D_0^{(4)}(\lambda_n+N\delta_n)(\delta_n/\lambda_{ch}) \quad (34)$$

A similar type of behavior can be achieved in the case where the signs of $D^{(4)}$ coefficients of the two gratings are the same, but the signs of $D^{(3)}$ coefficients are opposite. In this arrangement, $D^{(2)}$ may be tuned by $\lambda_n$ and the slope may be tuned by a combination of $\lambda_p$ and $\delta_p$:

$$D^{(2)}(\lambda)=D_0^{(2)}+2D_0^{(3)}\lambda_n+D_0^{(4)}(\lambda^2+\lambda_n^2+\lambda_p^2+2\lambda\lambda_p), \quad (35)$$

$$D^{(2)}(0)=D_0^{(2)}+2D_0^{(3)}\lambda_n+D_0^{(4)}(\lambda_n^2+\lambda_p^2), \quad (36)$$

$$D^{(3)}(\lambda)=2D_0^{(4)}(\lambda+\lambda_p), \quad (37)$$

$$D_1^{(2)}(0+N\delta_p) + D_2^{(2)}(0+N\delta_p) = \quad (38)$$
$$D_0^{(2)} + 2D_0^{(3)}\lambda_n + D_0^{(4)}(\lambda_n^2 + \lambda_p^2 + (N\delta_p)^2 + 2N\lambda_p\delta_p)$$

$$s(N\lambda_{ch})=\Delta D^{(2)}/\Delta\lambda=2D_0^{(4)}(\lambda_p+N\delta_p)(\delta_p/\lambda_{ch}). \quad (39)$$

Hence, the dispersion slope is independent of $\lambda_n$, but varies with the channel number. For both cases with the same sign $D^{(4)}$, the size of $\delta$ can be reduced or minimized in order to reduce the variation of the slope with channel across the band.

The coefficients $D^{(3)}$ and $D^{(4)}$ may also have arbitrary magnitudes and signs. The tuning behavior of the grating pair is then a superposition of the cases described above.

In addition to the tuning of the dispersion slope described by Eqs. (22), (28), (34), and (39), stretching the sampled gratings has a small effect on the spacing of the channels $\lambda_{ch}$. This effect should be included in determining the appropriate stretch for a desired dispersion slope. For example, if each sampled grating is stretched to produce a fractional change $\Delta\lambda$ in the Bragg wavelength given by $$\gamma=\Delta\lambda/\lambda_0 \quad (40)$$

where $\lambda_0$ is the wavelength of the central channel, the $N^{th}$ channel would then be shifted from $\lambda_0+N\lambda_{ch}$ to $(\lambda_0+N\lambda_{ch})(1+\gamma)=\lambda_0+\Delta\lambda+N(\lambda_{ch}+\gamma\lambda_{ch})$. Therefore, the channel spacing changes incrementally from $\lambda_{ch}$ by $\gamma\lambda_{ch}$. This incremental change in the channel spacing in turn causes an incremental change in the dispersion slope. To quantify this effect, fractional changes in wavelength associated with Eqs. (15) and (16) may be defined as follows, $$\lambda_1=\gamma_1\lambda_0=\lambda_p+\lambda_n=(\gamma_p+\gamma_n)\lambda_0 \quad (41)$$

$$\lambda_2=\gamma_2\lambda_0=\lambda_p-\lambda_n=(\gamma_p-\gamma_n)\lambda_0, \quad (42)$$

where $\lambda_p \equiv \gamma_p \lambda_0$ and $\lambda_n \equiv \gamma_n \lambda_0$ represent fractional changes in the center wavelengths caused by stretches or compressions of the two fiber gratings in the same and opposite directions, respectively.

The dispersion slope of Eq. (22) for the case where $D^{(4)}$ coefficients have opposite signs but $D^{(3)}$ coefficients have same signs in the two gratings are then modified as:

$$s = \Delta D^{(2)}/\Delta\lambda = (2D_0^{(3)} + 2D_0^{(4)}(\gamma_n(\lambda_0 + N\lambda_{ch})))(\delta_p/\lambda_{ch} + \gamma_p) \quad (43)$$

Similarly, the dispersion slope of Eq. (28) for the case where both $D^{(3)}$ and $D^{(4)}$ coefficients have opposite signs in both gratings becomes:

$$s = \Delta D^{(2)}/\Delta\lambda = (2D_0^{(3)} + 2D_0^{(4)}(\gamma_p(\lambda_0 + N\lambda_{ch})))(\delta_n/\lambda_{ch} + \gamma_n). \quad (44)$$

The dispersion slope in Eq. (28) for the case where both $D^{(3)}$ and $D^{(4)}$ coefficients have the same signs in both gratings is modified to $$s(N\lambda_{ch}) = \Delta D^{(2)}/\Delta\lambda = 2D_0^{(4)}(\gamma_n(\lambda_0 + 2N\lambda_{ch}) + N\delta_n)(\delta_n/\lambda_{ch} + \gamma_n). \quad (45)$$

The dispersion slope in Eq. (33) for the case where $D^{(3)}$ coefficients in the two gratings have opposite signs but $D^{(4)}$ coefficients in the two gratings have same signs is modified to $$s(N\lambda_{ch}) = \Delta D^{(2)}/\Delta\lambda = 2D_0^{(4)}(\gamma_p(\lambda_0 + 2N\lambda_{ch}) + N\delta_p)(\delta_p/\lambda_{ch} + \gamma_p). \quad (46)$$

The above equations suggest two additional effects of the stretch. First, the tuning of the value of the expression in the first set of parentheses in Eqs. (43)–(46) is slightly modified because the effective wavelength shift varies with the channel N. In general, this effect is relatively small in actual implementations and is $\pm N\lambda_{ch}/\lambda_0 \sim \pm 1\%$ for a wavelength range of about ±16 nm over the C band from 1530 nm to 1565 nm used by many conventional optical telecommunication systems.

Another effect is the additional incremental change in the mismatch between the ITU grid and sampled channel center wavelengths as represented by the last term in Eqs. (43)–(46). For the typical stretching values for these gratings, this effect may produce a 10% variation in the dispersion slope. The grating pair may be used to tune the effective value of the dispersion slope such that when this small effect of the stretch on channel spacing is accounted for, the net effect of the variation of channel spacing plus the tuning of $D^{(3)}$ yields the desired dispersion slope.

As an example of the relative magnitudes of these effects, consider a sampled grating operating over C-band (±16 nm) on the ITU 100 Grid (±20 channels with $\lambda_{ch}=0.8$ nm) with $D^{(3)} = \pm 2000$ ps/nm$^2$ and a stretching (tuning) range of ±0.2 nm. Let the dispersion slope of the fiber be 0.0625 ps/nm$^2$ and the length of fiber be 100 km. When the $D^{(2)}$ at the C-band center is to be compensated for, the residual dispersion at the ends of the band would be ±100×0.0625×16= ±100 ps/nm. The effective slope quantity in the first set of parentheses in Eqs. (43) and (44) is given by $2D^{(3)} = \pm 4000$ ps/nm$^2$ plus the tuning term proportional to D Assuming the central value of ±4000 ps/nm$^2$, the ITU mismatch required at the ends of the C-band to compensate for the ±100 ps/nm residual dispersion is given by the fraction $\pm 100/4000 = \pm 1/40$ of the 0.8 nm channel spacing. Thus, the required effective ITU grid mismatch is ±20 pm at the band ends or ±1.25 pm per channel. If one sets $N\delta = 20$ pm in an attempt to obtain exact slope compensation, there would be a residual error, $\gamma\lambda_{ch}$, in the required ITU mismatch from the stretching term in the last in Eqs. (43) and (44). For the ±0.2 nm assumed tuning range, $\gamma = \pm 1.3 \times 10^{-4}$ and thus this error effectively is at most 0.10 pm, which is less than 10% of the required mismatch. To correct for this term one could either tune the 4000 ps/nm$^2$ slope quantity with the appropriate stretch, or eliminate the stretch that leads to the error. For the case of Eq. (44), this error may be eliminated by setting $\lambda_n$ and $\gamma_n = 0$. This setting, however, also eliminates the possibility of tuning $D^{(2)}$ so that the grating pair provides tunable dispersion slope without a net $D^{(3)}$. Alternately, in either Eq. (43) or (44), one could simultaneously adjust both the same- and opposite-sense stretches in the two gratings to achieve the desired tunable slope and dispersion compensation. This adjustment would likely produce nonzero $D^{(3)}$.

In another example, consider the cases with $D^{(4)}$ of the same sign in the FBGs. In some applications, it may be desirable to keep the variation of slope with channel number owing to the quadratic tuning terms at a minimum. Assume this effect is desired to be less than 10% of the slope over the C-band. This can be achieved based on Eq. (46) when $N\delta_p < 0.1\lambda_p$ for N<20. To achieve the same slope compensation with the parameters discussed above, this requires a value of $D^{(4)} = 10000$ ps/nm$^3$, $\delta_p = 1.25$ pm and $\lambda_p = 0.2$ nm. According to Eq. (37), the net value of $D^{(3)}$ is tuned to a value of 4000 ps/nm$^2$. However, an appropriate choice of $D_0^{(3)}$ can be designed to fully or partially cancel out this value of $D^{(3)}$. In addition, the nonlinear overshoot of the slope at the end of the band may be further reduced by reducing the designed slope value (e.g. by reducing $\delta_p$) so that the net overshoot at the band end is also reduced. This can also have the effect of under compensating the slope near the band center, where slope compensation is less important, but would increase the overall accuracy of slope compensation over the entire band.

TABLE 1 summarizes the tuning operations of the grating pair with two nonlinearly-chirped fiber Bragg gratings in four different configurations. The stretches of the two gratings are given in components of equal ($\lambda_p$) and opposite stretches ($\lambda_n$) [see Eqs. (15) and (16)]. The parameter $\gamma_{n,p} = \lambda_{n,p}/\lambda_0$, $\lambda_0$ is the central channel wavelength, $\lambda_N = \lambda_0 + N\lambda_{ch}$ is the center wavelength of the Nth channel from band center, $\lambda_{ch}$ is the channel separation, and $\delta$ is the incremental difference between the ITU grid channel spacing and the channel separation in the sampled FBG. Parameters $\delta_p$ and $\delta_n$ represent incremental channel spacings, which are of the same and opposite sign in the two gratings, respectively. The formulae for $D^{(2)}$ and $D^{(3)}$ can be extended to the Nth channel from band center by replacing $\lambda_{n,p}$ by $\gamma_{n,p}\lambda_N$.

In addition, the magnitudes of $D^{(3)}$ or $D^{(4)}$ coefficients in the two gratings may be different in the four different configurations listed in TABLE 1. Accordingly, the amounts of tuning in $\lambda_1$ and $\lambda_2$ in the two gratings are not symmetric in that the anti-symmetric stretches $\lambda_n$ and the symmetric stretches $\lambda_p$ are different in magnitude in the two gratings.

TABLE 1

TUNING OF GRATING PAIR

| | Same $D^{(3)}$ and opposite $D^{(4)}$ in both gratings | Opposite $D^{(3)}$ and $D^{(4)}$ in both gratings |
|---|---|---|
| Primary Tuning Mechanism for $D^{(2)}$ | $\lambda_p$ | $\lambda_n$ |
| Primary Tuning Mechanism for $D^{(3)}$ | $\lambda_n$ | $\lambda_n$ |
| Primary Tuning Mechanisms for slope s | $\lambda_n, \delta_p$ | $\lambda_p, \delta_n$ |
| Formula for $D^{(2)}$ at the center of the center channel | $D_0^{(2)} + (2D_0^{(3)} + 2D_0^{(4)}\lambda_n)\lambda_p$ | $D_0^{(2)} + (2D_0^{(3)} + 2D_0^{(4)}\lambda_p)\lambda_n$ |
| Formula for $D^{(3)}$ at the center of the center channel | $2D_0^{(3)} + 2D_0^{(4)}\lambda_n$ | $2D_0^{(4)}\lambda_n$ |
| Formula for slope s at Nth channel from band center | $(2D_0^{(3)} + 2D_0^{(4)}\gamma_n\lambda_N)(\delta_p/\lambda_{ch} + \gamma_p)$ | $(2D_0^{(3)} + 2D_0^{(4)}\gamma_p\lambda_N)(\delta_n/\lambda_{ch} + \gamma_n)$ |

| | Same $D^{(3)}$ and $D^{(4)}$ in both gratings | Opposite $D^{(3)}$ and same $D^{(4)}$ in both gratings |
|---|---|---|
| Primary Tuning Mechanism for $D^{(2)}$ | $\lambda_p$ | $\lambda_n$ |
| Primary Tuning Mechanism for $D^{(3)}$ | $\lambda_p$ | $\lambda_p$ |
| Primary Tuning Mechanisms for slope s | $\lambda_n, \delta_n$ | $\lambda_p, \delta_p$ |
| Formula for $D^{(2)}$ at the center of the center channel | $D_0^{(2)} + 2D_0^{(3)}\lambda_p + D_0^{(4)}(\lambda_n^2 + \lambda_p^2)$ | $D_0^{(2)} + 2D_0^{(3)}\lambda_n + D_0^{(4)}(\lambda_n^2 + \lambda_p^2)$ |
| Formula for $D^{(3)}$ at the center of the center channel | $2D_0^{(3)} + 2D_0^{(4)}\lambda_p$ | $2D_0^{(4)}\lambda_p$ |
| Formula for slope s at Nth channel from band center | $2D_0^{(4)}(\gamma_n(\lambda_0 + 2N\lambda_{ch}) + N\delta_n) \times (\delta_n/\lambda_{ch} + \gamma_n)$ | $2D_0^{(4)}(\gamma_p(\lambda_0 + 2N\lambda_{ch}) + N\delta_p) \times (\delta_p/\lambda_{ch} + \gamma_p)$ |

The above description uses nonlinearly-chirped fiber Bragg gratings as examples for implementing tunable fiber Bragg gratings capable of producing tunable nonlinear group delays. Other types of fiber Bragg gratings may also be used to form a desired grating pair. For example, a non-chirped fiber grating with a grating parameter $n_{eff}(z)\Lambda(z)$ that is independent of position z along the fiber may be designed to have a spatial-varying grating strength or phase shift to produce a nonlinear group delay with the $D^{(3)}$ term only. Feced et al. disclose such a dispersion-compensating fiber Bragg grating without chirping in which $D_0^{(3)}\neq 0$ and $D_0^{(2)}=0$ in "An Efficient Inverse Scattering Algorithm for the Design of Nonuniform Fiber Bragg Gratings," IEEE Journal of Quantum Electronics, Vol. 35, No. 8, pp. 1105–1115 (August 1999). Feced et al show in FIG. 12 an example of the amplitude of the spatially-varying grating strength in a grating which produces nonlinear group delay. At locations where the amplitude function passes through zero, the phase of the grating index modulation experiences a phase shift of 180 degrees. That is, the periodicity of the grating is interrupted by a half-period shift at each zero location. Similarly to a nonlinearly-chirped fiber Bragg grating, a grating sampling pattern may be fabricated in the fiber grating to overlap the underlying grating so that multiple Bragg reflection bands can be produced. Such a fiber Bragg grating with a constant grating period may be engaged to a fiber control unit to form a tunable dispersion element with or without other gratings. One or more aspects of the dispersion produced by this grating, such as the dispersion, the rate of change in the dispersion with respect to wavelength, or the change of the dispersion from one WDM channel to an adjacent WDM channel can be tuned by, e.g., mechanically stretching or compressing the fiber grating, or controlling the temperature of the fiber grating.

In the various grating pairs discussed in this application, the two gratings capable of producing nonlinear group delays may be of the same type, e.g., both are nonlinearly-chirped gratings or non-chirped gratings. In addition, the two gratings may be different types in that one grating may be a nonlinearly-chirped fiber Bragg grating while the other may be a non-chirped fiber Bragg grating. For example, when two different types of gratings are combined in a pair to produce a tunable total induced dispersion independent of wavelength as shown in FIGS. 34A–34D by tuning only one fiber grating, the tunable grating may be the non-chirped grating and the nonlinearly-chirped grating may have a fixed overall length to produce a fixed nonlinear group delay.

As described above, a fiber Bragg grating operable to produce a nonlinear group delay, either chirped or not, may be configured as a tunable grating by uniformly changing the length of the underlying fiber. This uniform change in the fiber length causes a shift in the center wavelength of each Bragg reflection band and hence the frequency detuning of an input optical signal relative to the center wavelength. Hence, the group delay can be tuned. A grating control device may be engaged to the fiber grating to change the fiber length for this tuning operation. A mechanical fiber stretcher, for example, may be used to apply a uniform stretch or compression to tune the nonlinear group delay. In addition, a thermal device may be used to uniformly control the temperature of the fiber grating to effectuate the tuning operation by changing both the length and the refractive index of the fiber grating.

In WDM applications, dispersions in different WDM channels received in a fiber may be different and hence should be compensated differently. The above sampled wave-guiding Bragg gratings may be used to generate multiple Bragg reflection bands to respectively reflect the WDM channels. Hence, each Bragg reflection band is used to reflect a single WDM channel. See, FIGS. 19A, 19B, and 24–27. Alternatively, a wave-guiding Bragg grating may be designed without the sampling pattern to produce a single Bragg reflection band with a sufficiently wide spectral bandwidth to reflect two or more WDM channels.

Figure 39:
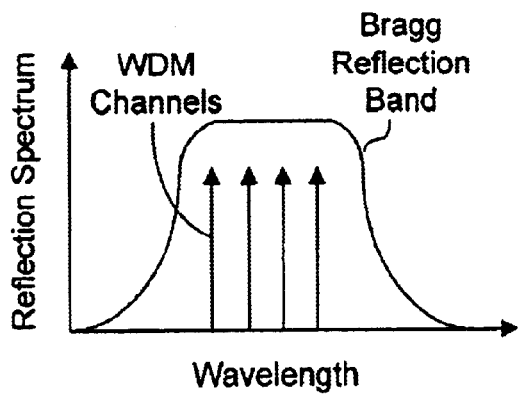
FIG. 39 shows a reflection spectrum of a tunable Bragg grating with a bandwidth to cover two or more WDM channels according to one embodiment.

FIG. 39 illustrates a single Bragg reflection band of a Bragg grating and 4 WDM channels positioned within the band. The Bragg grating is a tunable grating as described above. The bandwidth of the Bragg reflection band is sufficiently large to maintain the 4 WDM channels inside the band within the tuning spectral range of the band. Since different WDM channels experience different amounts of dispersion, it is desirable to design the grating to have a tunable dispersion slope for effective compensation. As described above, the spatial grating pattern should be designed to have at least the fourth-order nonlinear dispersion term $D_0^{(4)}(\lambda_0)$ as shown in Eq. (3) so that the dispersion slope is linearly tunable with respect to wavelength.

Notably, the dispersion slope based on the fourth-order nonlinear dispersion term $D_0^{(4)}(\lambda_0)$ may be used to compensate for both intra-channel dispersion in which different spectral components within one channel experience different dispersions (in particular, at high bit rates such as 40 Gb/s), and inter-channel dispersion in which different channels travel at different group velocities to experience different dispersions. The following sections first describe one embodiment of a nonlinearly-chirped fiber grating and then one embodiment of a dual fiber grating system based on the above single Bragg reflection band design for multiple WDM channels.

Figure 40A:
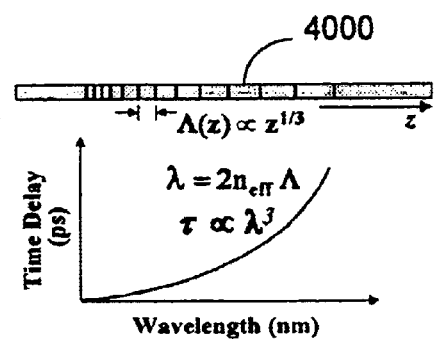
FIGS. 40A, 40B, and 40C show a design of a fourth-order nonlinearly-chirped FBG and corresponding dispersion and dispersion slope characteristics of the grating when the grating is tuned.
Figure 40B:
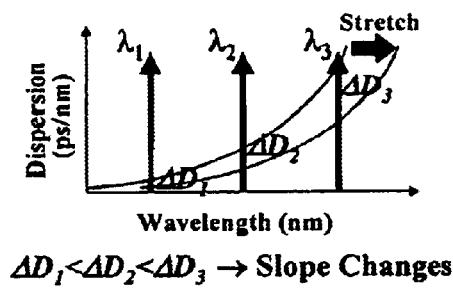
Figure 40C:
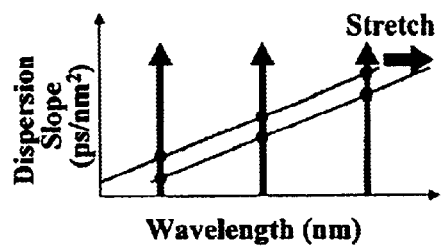

FIG. 40A illustrates a nonlinearly-chirped fiber grating 4000 for a tunable chromatic dispersion slope compensator capable of providing both inter- and intra-channel dispersion slope compensation. Referring to FIG. 1, a grating control 120 is used to interact with the grating 4000 to tune the dispersion. The grating 4000 has a fourth-order chirp profile along the fiber axis where the grating pitch varies along the grating length according to the third order of the Bragg wavelength, that is, $z \propto \lambda^3$, where z is the position along the fiber grating and $\lambda$ is the Bragg wavelength. Since the variation in the position is directly related to the time delay ($\tau$) that a signal at $\lambda$ will experience when reflecting off the grating, the time delay is also a third-order function of the wavelength ($\tau \propto \lambda^3$). Also, see Eq. (1). Referring to Eq. (2), the dispersion of the grating varies quadratically ($D \propto \lambda^2$) as illustrated in FIG. 40B. Accordingly, the slope of the dispersion curve varies linearly with wavelength (FIG. 40C). Therefore, as the grating is stretched, the dispersion curve shifts towards longer wavelengths and each channel "sees" a different amount of change in dispersion ($\Delta D$) that increases with longer wavelengths. Thus, in FIG. 40B, $\Delta D_1$, $\Delta D_2$, and $\Delta D_3$ are different after stretching the grating.

Figure 41:
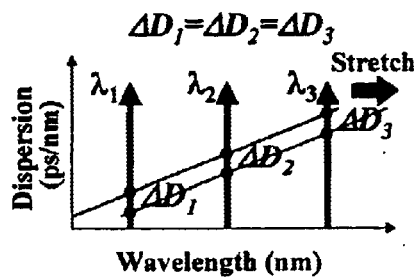
FIG. 41 shows dispersion curves for a third-order nonlinearly-chirped FBG.

In comparison, FIG. 41 shows a third-order nonlinearly-chirped FBG in which the dispersion varies linearly with wavelength. The dispersion slope, based on Eq. (3), is a constant with respect to different wavelengths. Therefore, although the dispersion can be tuned, there is no variation in $\Delta D$ for different wavelengths as the grating is stretched.

The above fourth-order nonlinearly-chirped grating can be used to compensate for the varying amounts of residual dispersion of each WDM channel in an actual transmission system that is optimized to fully compensate for the dispersion of a selected channel, e.g., the first channel at the shortest wavelength. This device has a simple structure, can be made at low cost, and provides a tunable dispersion slope compensation.

Figure 42:
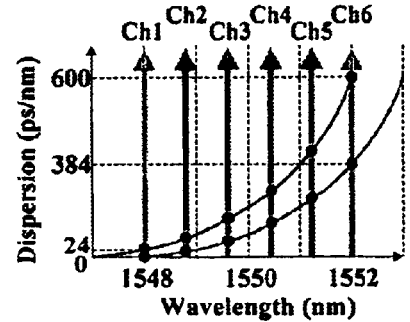
FIG. 42 shows calculated dispersion values in six channels before and after the shifting the grating with 10 cm length and 5 nm bandwidth.

FIG. 42 shows different dispersion values obtained for six WDM channels before and after stretching using a 10-cm long grating with a 5-nm bandwidth. The initial dispersion difference of the grating between channels 1 and 6 is about 600 ps/nm. This corresponds to the dispersion mismatch that would result after 2000 km of transmission through SMF with a dispersion slope of 0.07 ps/nm$^2$. After stretching, the difference is reduced to 384 ps/nm (to compensate for shorter transmission lengths for fibers with smaller slopes). This 10-cm grating, with a 5-nm bandwidth, a 1-nm shifting range, and 4-nm of usable bandwidth has a tunable dispersion slope range about 54 ps/nm$^2$. This range can be increased by using a longer grating.

Notably, the above fourth-order nonlinearly-chirped fiber grating may be replaced by a fiber grating that combines a spatial chirp and a spatially-varying amplitude with discrete phase shifts to produce the fourth order nonlinear group delay which varies with $\lambda^3$. This may be achieved by forming a complex amplitude dependence in a—Bragg grating because the amplitude crosses through zero repeatedly and the phase changes by $\pi$ at each zero crossing. This is similar to the non-chirped grating with a nonlinear dispersion term $D^{(3)}$ described previously. This technique of combining a grating chirp and a spatially-varying amplitude with discrete phase shifts to produce different nonlinear group delays may be used to design Bragg gratings with nonlinear group delays other than $D^{(3)}$ and $D^{(4)}$.

Figure 43A:
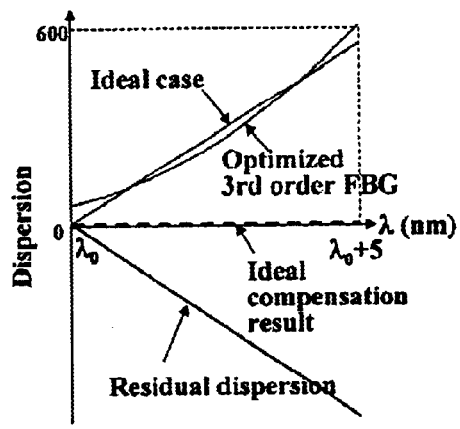
FIGS. 43A and 43B show the deviation from ideal dispersion slope compensation with the grating in FIG. 40A and maximum deviation values with respect to the length and bandwidth (W) of the FBG.
Figure 43B:
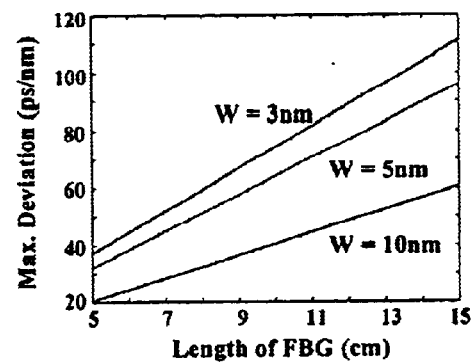

Ideally, the dispersion curve for the slope-compensated channels should be a flat line that lies along the wavelength axis at zero dispersion. However, because the dispersion curve of this compensator is quadratic, whereas the dispersion curve for the incoming channels is generally linear, there will be a slight deviation from the ideal case. FIG. 43A shows that, if the compensator's quadratic curve is added to the linear "residual dispersion" curve of the WDM channels, the resulting curve will slightly deviate from a flat line along zero. As shown in FIG. 43B, this deviation is less than 65 ps/nm for a 10-cm grating with a 5-nm bandwidth and corresponds to the dispersion accrued in about 4 km of transmission which may be insignificant when compared to the 2000-km transmission distance that produced the initial dispersion. TABLE 2 further lists the dispersion values of the six different channels before and after stretching the fiber grating as plotted in FIG. 43B.

TABLE 2

| Wavelength (nm) | Ch. 1 1548.0 | Ch. 2 1548.8 | Ch. 3 1549.6 | Ch. 4 1550.4 | Ch. 5 1551.2 | Ch. 6 1552.0 |
|---|---|---|---|---|---|---|
| Before Shift | 24 | 78 | 162 | 277 | 423 | 600 |
| After Shift | 0 | 15 | 61 | 138 | 246 | 384 |

Figure 44:
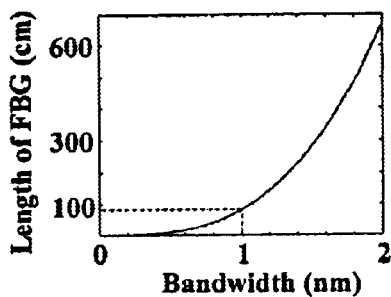
FIG. 44 shows the relationship between the length and bandwidth of the grating for 1-dB power penalty compensation in intra-channel dispersion slope compensation

The fiber grating 4000 may also be used for intra-channel dispersion slope compensation in ultra-high bit-rate systems. FIG. 44 shows the relationship between the grating length and bandwidth necessary to achieve a 1-dB power penalty compensation. Reverse dispersion slope values can therefore be achieved by using long gratings with lengths of several tens of cm or even a few meters. The tuning may be achieved by, e.g., among other methods as described, stretching the grating.

Figure 45:
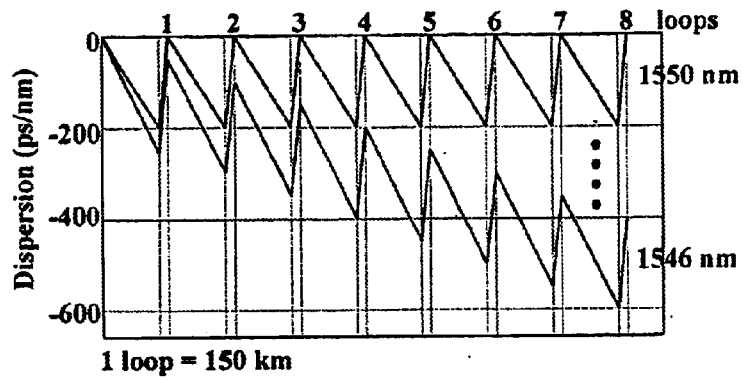
FIG. 45 shows a dispersion map of an actual demonstration setup using a recirculating loop.

FIG. 45 depicts the dispersion map for a WDM system demonstration using a recirculating loop testbed. The system is comprised of Corning SMF-LS fiber to attain a large negative dispersion slope value and conventional SMF fiber for periodic dispersion compensation. After 1200 km of transmission there is residual dispersion difference of 400 ps/nm between the two end channels that are 4-nm apart. The dispersion mismatch between these two channels can be compensated for by using the proposed grating with a 10-cm length and a 5-nm bandwidth.

The above fiber grating design with a single Bragg reflection band may be combined with the dual grating systems described in the previous sections to achieve a tunable linear dispersion compensator with two fiber gratings with nonlinear group delays. Each of the two gratings has a single Bragg reflection band which is sufficiently broad to cover two or more WDM channels to be processed. Under this design, two or more WDM channels within the bandwidth of the fiber gratings can be processed by the dual grating system to reduce the dispersion. The dual grating arrangement allows tuning of both slope and dispersion. Notably, both the slope and the dispersion shift are constant over the bandwidth. This aspect of this application is described as follows.

Figure 46:
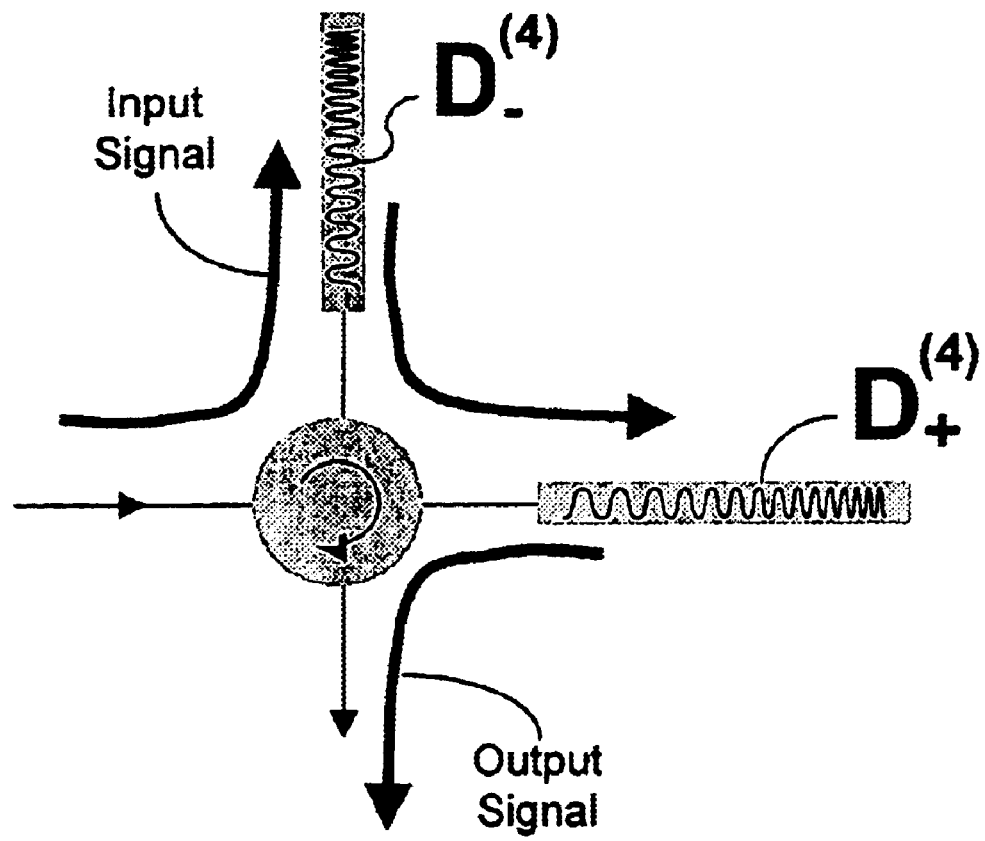
FIG. 46 shows a dual grating system for producing a tunable dispersion slope according to one embodiment.
Figure 47A:
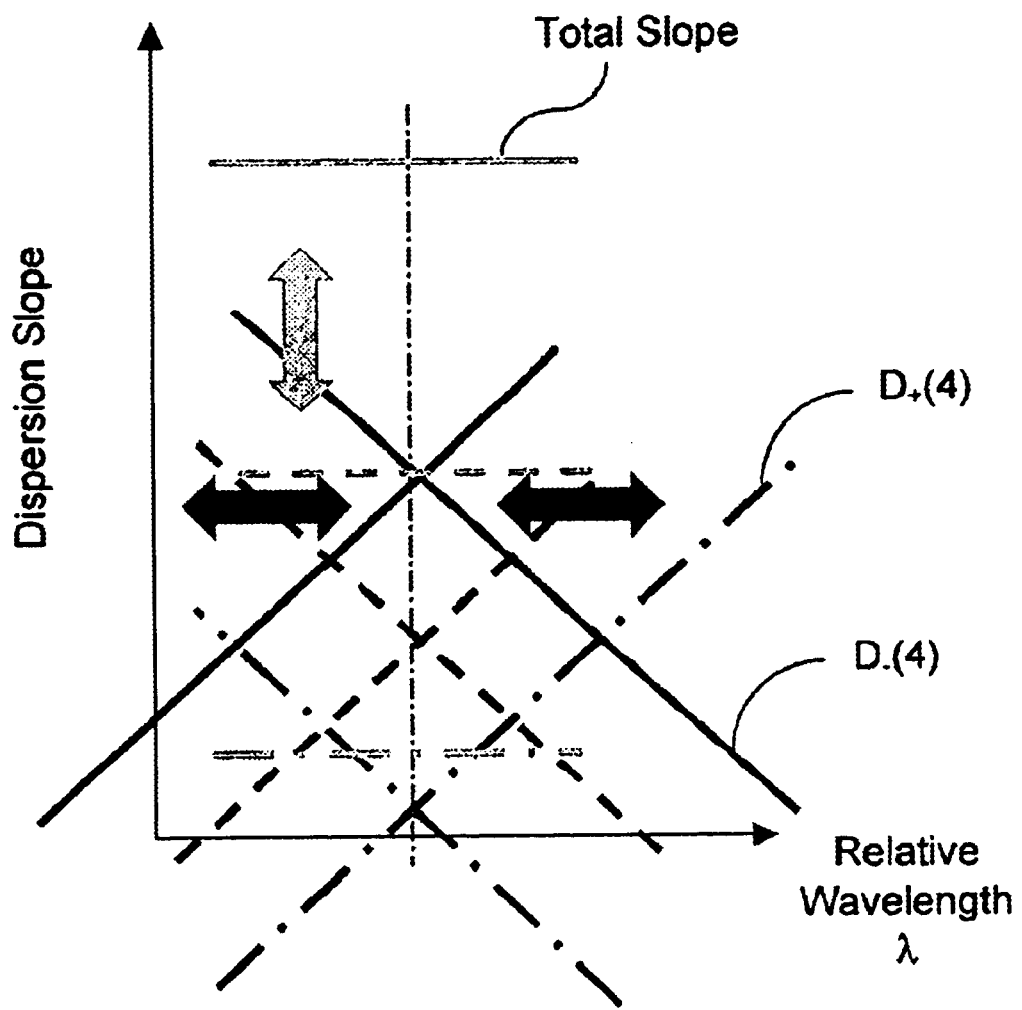
FIGS. 47A and 47B illustrate dispersion slop and dispersion as a function of the relative wavelength with respect to the center wavelength of the Bragg reflection band for the system in FIG. 46.
Figure 47B:
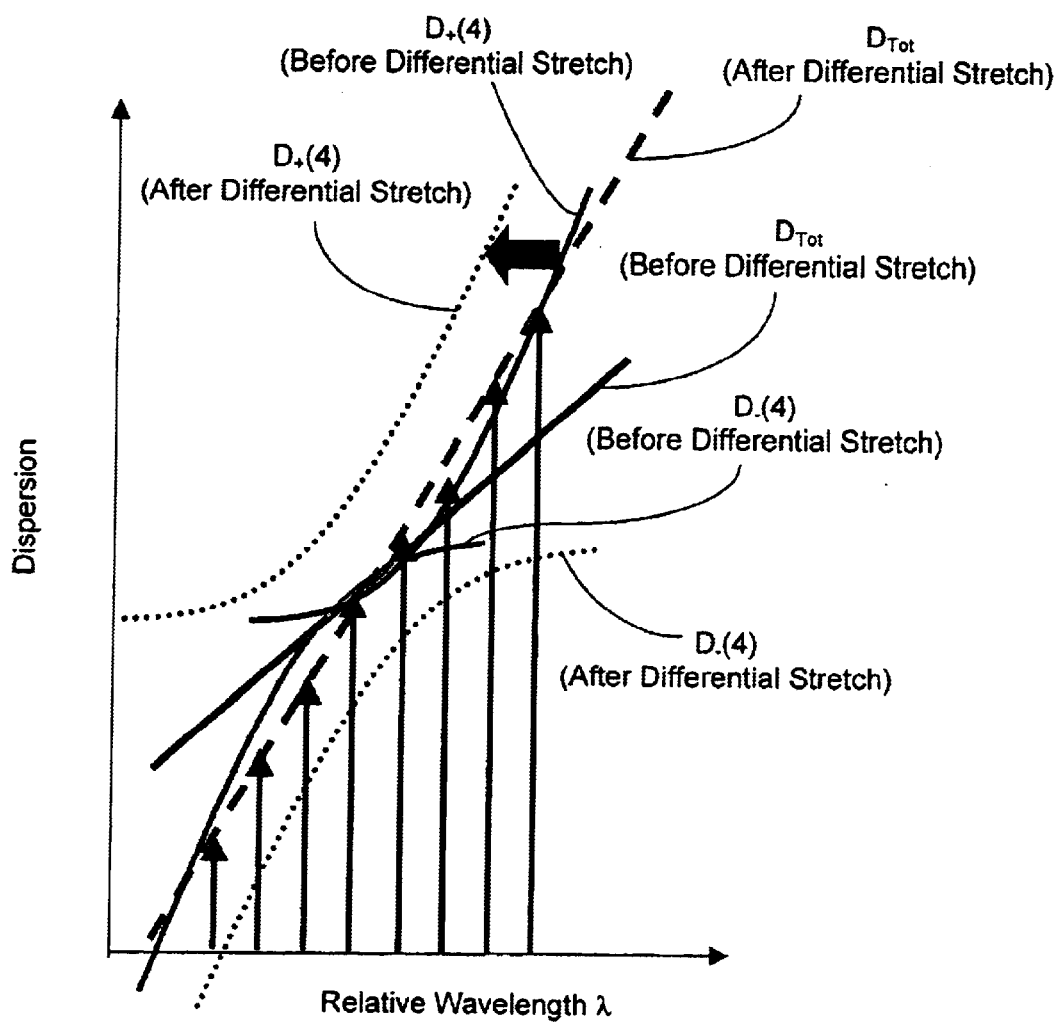

Referring back to Eq. (18), the dual grating system may be specifically configured to produce a constant dispersion slope over the entire useable bandwidth of the grating by choosing equal and opposite values for the quadratic dispersion terms represented by the $D^{(4)}$ coefficients of the two gratings. FIG. 46 shows a dual grating system for producing a tunable dispersion slope according to one embodiment based on the design shown in FIG. 35. The grating with the positive $D^{(4)}$ coefficient may be oriented in the same direction as the other fiber grating with the negative $D^{(4)}$ coefficient shown in FIG. 46 to use the long-long wavelength end to receive the input. Alternatively, the grating with the positive $D^{(4)}$ coefficient may be oriented in the opposite direction to use the short-wavelength end to receive the input from the other grating. Designs for the dual grating systems shown in FIGS. 36–38 may also be used to form a slope-tunable dual grating system. FIGS. 47A and 47B illustrate dispersion slope and dispersion as a function of the relative wavelength with respect to the center wavelength of the Bragg reflection band for the system in FIG. 46.

In operation, the dispersion of the dual grating system in FIG. 46 varies linearly over the entire bandwidth (see FIG. 47B) while the dispersion produced by each individual grating is nonlinear with respect to the wavelength. In addition, the anti-symmetric parameter $\lambda_n$ may be adjusted to tune the dispersion slope $D^{(3)}$ by a differential stretch, i.e., stretching one fiber grating while compressing the other. Once the desired value of slope has been selected, Eq. (18) shows that changing the symmetric stretch parameter $\lambda_p$ can be used to tune $D^{(2)}$ by a constant value over the entire bandwidth.

This constant change $\Delta D^{(2)}$ of the dispersion over the entire bandwidth is simply given by the value of slope which has been selected by tuning anti-symmetric stretch $\lambda_n$, multiplied by the common shift $\lambda_p$, as expressed in the following:

$$\Delta D^{(2)} = (2D_0^{(3)} + 2D_0^{(4)}\lambda_n)\lambda_p \quad (47)$$

Such a tunable shift over the entire bandwidth (which may comprise many WDM channels) may be useful in compensating for changes in the dispersion of fiber optic cables due to temperature variation, for example.

If arbitrary values of the values of $D_{01}^{(3)}$ and $D_{02}^{(3)}$ are chosen, the slope can still be constant over the entire bandwidth and tuned by $\lambda_n$, $$D^{(3)}(\lambda) = dD^{(2)}/d\lambda = D_{01}^{(3)} + D_{02}^{(3)} + 2D_0^{(4)}\lambda_n. \quad (48)$$

The net dispersion change is also constant over the FBGs bandwidth and is now given by $$\Delta D^{(2)} = (D_{01}^{(3)} + D_{02}^{(3)} + 2D_0^{(4)}\lambda_n)\lambda_p + (D_{01}^{(3)} - D_{02}^{(3)})\lambda_n. \quad (49)$$

Under this condition, varying $\lambda_n$ cause the slope to change and also causes a dispersion shift. However, once the slope is chosen by selecting anti-symmetric stretch $\lambda_n$, the symmetric stretching $\lambda_p$ can then be selected to obtain the correct net shift of the dispersion over the entire bandwidth. In contrast, if $D_{01}^{(3)} = D_{02}^{(3)}$, this term vanishes and the anti-symmetric stretch $\lambda_n$ only determines the net slope, and the symmetric stretch $\lambda_p$ determines the net dispersion shift, as given by Eq. (47). In either case, both the net slope and the net dispersion shift are tunable, and both are constant over the entire FBG bandwidth.

Therefore, the use of two gratings with equal and opposite values of quadratic dispersion terms represented by the $D^{(4)}$ coefficients allows tuning of the values of a uniform dispersion slope, and tuning of the dispersion shift over the entire useable bandwidth of the gratings.

Although only limited embodiments are disclosed, it is understood that various modifications and enhancements may be made without departing from the following claims.

What is claimed is:

1. A device for processing two or more optical WDM channels, comprising:

an optical fiber having an optic axis along said fiber to guide two or more WDM channels;

a fiber grating formed in said fiber to have a spatial grating pattern that has a Bragg reflection band that spectrally covers at least two adjacent WDM channels and reflects received optical spectral components within said Bragg reflection band to produce time delays in different reflected optical spectral components in said two adjacent WDM channels as a nonlinear function of wavelength; and a grating control unit coupled to interact with said fiber grating to tune at least dispersion of said different reflected optical spectral components.

2. The device as in claim 1, wherein said fiber grating is a nonlinearly-chirped fiber grating in which a product of an effective refractive index and a grating period of said fiber grating varies nonlinearly along said optic axis.

3. The device as in claim 2, wherein said grating period changes nonlinearly along said optic axis.

4. The device as in claim 2, wherein said fiber has a refractive index that changes nonlinearly along said optic axis.

5. The device as in claim 2, wherein said nonlinear function includes a cubic dependence on wavelength to produce a tunable dispersion slope.

6. The device as in claim 1, wherein said grating control unit includes a fiber stretcher that controls and adjusts at least a length of said fiber grating to tune said dispersion.

7. The device as in claim 6, wherein said fiber stretcher includes a piezoelectric element.

8. The device as in claim 6 wherein said fiber stretcher includes a magnetostrictive element that operates in response to a control magnetic field.

9. The device as in claim 1, wherein said grating control unit controls and adjusts a refractive index of said fiber grating for tuning.

10. The device as in claim 9, wherein said refractive index changes in response to an electrical field, and wherein said grating control unit is configured to generate and adjust a varying control electrical field along said optic axis for tuning.

11. The device as in as in claim 9, wherein said refractive index changes in response to an electromagnetic radiation field, and wherein said grating control unit is configured to generate a varying control electromagnetic radiation field along said optic axis for tuning.

12. The device as in claim 1, wherein said spatial grating pattern is configured to produce a spatial-varying grating strength to produce said nonlinear function.

13. The device as in claim 1, wherein said spatial grating pattern includes a quadratic dependence on wavelength in said nonlinear function-.

14. The device as in claim 1, wherein said grating control unit includes an acoustic wave generator configured and coupled to produce a frequency-tunable acoustic wave along said optic axis so that said acoustic wave alters a frequency response of said fiber grating for tuning.

15. The device as in claim 1, wherein said grating control unit is configured to control both a length and a refractive index of said fiber along said optic axis.

16. The device as in claim 1, wherein said fiber is formed of an optical birefringent material to have two orthogonal principal polarization axes that are substantially perpendicular to said optic axis.

17. A device for processing two or more optical WDM channels, comprising:
an optical fiber having an optic axis along said fiber to guide two or more WDM channels;
a fiber grating formed in said fiber and configured to have a spatial grating pattern that has a Bragg reflection band spectrally covering at least two adjacent WDM channels and is configured to produce a time delay in a reflected signal which depends nonlinearly on wavelength and includes at least a cubic function of the wavelength; and
a grating control unit coupled to interact with said fiber grating to tune both dispersion and dispersion slope produced by said fiber grating in each reflected optical spectral component.

18. The device as in claim 17, wherein said fiber grating is a nonlinearly-chirped fiber grating in which said spatial grating pattern changes nonlinearly along said optic axis.

19. The device as in claim 18, wherein said spatial grating pattern includes a spatial-varying amplitude pattern along said optic axis.

20. The device as in claim 17, wherein said time delay further includes a quadratic dependence on the wavelength.

21. The device as in claim 17, wherein said grating control unit controls and adjusts a length of said fiber grating for tuning.

22. The device as in claim 17, wherein said grating control unit controls and adjusts a refractive index of said fiber grating for tuning.

23. The device as in claim 17, wherein said grating control unit controls and adjusts both a length and a refractive index of said fiber grating for tuning.

* * * * *